United States Patent
Nobukawa et al.

(10) Patent No.: US 11,036,238 B2
(45) Date of Patent: Jun. 15, 2021

(54) POSITIONING SYSTEM BASED ON GEOFENCING FRAMEWORK

(71) Applicant: Harman International Industries, Incorporated, Stamford, CT (US)

(72) Inventors: Kazutoshi Nobukawa, Ann Arbor, MI (US); Faroog Ibrahim, Dearborn Heights, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 475 days.

(21) Appl. No.: 15/879,299

(22) Filed: Jan. 24, 2018

(65) Prior Publication Data

US 2018/0150086 A1     May 31, 2018

Related U.S. Application Data

(63) Continuation-in-part of application No. 15/797,907, filed on Oct. 30, 2017, now Pat. No. 10,591,608, (Continued)

(51) Int. Cl.
*G05D 1/02* (2020.01)
*G01C 21/12* (2006.01)
(Continued)

(52) U.S. Cl.
CPC .......... *G05D 1/0278* (2013.01); *G01C 21/12* (2013.01); *G01C 21/16* (2013.01); *G01C 21/30* (2013.01); *G01S 5/0072* (2013.01); *G01S 5/0263* (2013.01); *G01S 19/42* (2013.01); *G01S 19/49* (2013.01); *G05D 1/027* (2013.01); *G05D 1/0274* (2013.01); *G08G 1/005* (2013.01); *G08G 1/0112* (2013.01); *G08G 1/0129* (2013.01); *G08G 1/0141* (2013.01); *G08G 1/164* (2013.01);
(Continued)

(58) Field of Classification Search
None
See application file for complete search history.

(56) References Cited

U.S. PATENT DOCUMENTS

2009/0089002 A1* 4/2009 Walter ................... B60T 8/172
                                                               702/96
2009/0265054 A1* 10/2009 Basnayake ............. B60W 40/11
                                                               701/31.4
(Continued)

*Primary Examiner* — Kevin P Mahne
(74) *Attorney, Agent, or Firm* — McCoy Russell LLP

(57) ABSTRACT

This provides methods and systems for the global navigation satellite system (GNSS) combined with the dead-reckoning (DR) technique, which is expected to provide a vehicle positioning solution, but it may contain an unacceptable amount of error due to multiple causes, e.g., atmospheric effects, clock timing, and multipath effect. Particularly, the multipath effect is a major issue in the urban canyons. This invention overcomes these and other issues in the DR solution by a geofencing framework based on road geometry information and multiple supplemental kinematic filters. It guarantees a road-level accuracy and enables certain V2X applications which does not require sub-meter accuracy, e.g., signal phase timing, intersection movement assist, curve speed warning, reduced speed zone warning, and red-light violation warning. Automated vehicle is another use case. This is used for autonomous cars and vehicle safety, shown with various examples/variations.

20 Claims, 84 Drawing Sheets

Related U.S. Application Data which is a continuation-in-part of application No. 14/883,633, filed on Oct. 15, 2015, now Pat. No. 9,805,592.

(51) Int. Cl.

| | | |
|---|---|---|
| *G01S 19/40* | (2010.01) | |
| *G01S 19/42* | (2010.01) | |
| *H04W 4/46* | (2018.01) | |
| *H04W 4/021* | (2018.01) | |
| *H04W 4/44* | (2018.01) | |
| *G01C 21/16* | (2006.01) | |
| *G01S 19/49* | (2010.01) | |
| *G01C 21/30* | (2006.01) | |
| *G01S 5/00* | (2006.01) | |
| *G08G 1/01* | (2006.01) | |
| *G08G 1/005* | (2006.01) | |
| *G01S 5/02* | (2010.01) | |
| *G08G 1/16* | (2006.01) | |
| *G08G 1/00* | (2006.01) | |

(52) U.S. Cl.
CPC ............ *G08G 1/207* (2013.01); *H04W 4/021* (2013.01); *H04W 4/44* (2018.02); *H04W 4/46* (2018.02); *G05D 2201/0213* (2013.01)

(56) References Cited

U.S. PATENT DOCUMENTS

| | | | | |
|---|---|---|---|---|
| 2010/0332135 | A1* | 12/2010 | Toda | G01C 21/165 |
| | | | | 701/472 |
| 2013/0024073 | A1* | 1/2013 | Son | G08G 1/166 |
| | | | | 701/45 |
| 2015/0353127 | A1* | 12/2015 | Takeda | B62D 6/008 |
| | | | | 701/41 |
| 2016/0049079 | A1* | 2/2016 | Ibrahim | G08G 1/005 |
| | | | | 340/944 |
| 2016/0091609 | A1* | 3/2016 | Ismail | G01S 19/49 |
| | | | | 702/150 |
| 2016/0146616 | A1* | 5/2016 | Ren | G01C 21/30 |
| | | | | 701/409 |
| 2018/0273031 | A1* | 9/2018 | Fujita | G01C 21/3667 |
| 2018/0347990 | A1* | 12/2018 | Mishina | G01S 19/48 |
| 2019/0143968 | A1* | 5/2019 | Song | B60R 11/04 |
| | | | | 701/301 |

\* cited by examiner

US 11,036,238 B2

POSITIONING SYSTEM BASED ON GEOFENCING FRAMEWORK

RELATED APPLICATIONS

This application is a CIP of another US utility application, namely, Ser. No. 15/797,907, filed 30 Oct. 2017, titled "A positioning quality filter for the V2X technologies", which is a CIP of another US utility application, namely, Ser. No. 14/883,633, filed 15 Oct. 2015, titled "Methods of tracking pedestrian heading angle using smart phones data for pedestrian safety applications", issued on Oct. 31, 2017, as U.S. Pat. No. 9,805,592, which was a CIP of another US utility application, namely, Ser. No. 14/163,478, filed 24 Jan. 2014, now U.S. Pat. No. 9,435,654, issued 6 Sep. 2016, titled "System and method for creating, storing, and updating local dynamic MAP database with safety attribute", which is a CIP of another US utility application, namely, Ser. No. 14/047,157, titled "System and method for map matching", filed 7 Oct. 2013, now a U.S. Pat. No. 9,037,404, issued on May 19, 2015, which in turn is a CIP of two other US utility applications, namely, Ser. No. 13/907,864, titled "System and method for lane boundary estimation and host vehicle position and orientation", filed 1 Jun. 2013, and Ser. No. 13/907,862, titled "System and method for node adaptive filtering and congestion control for safety and mobility applications toward automated vehicles system", filed 1 Jun. 2013. It is also related to another US patent application filed 24 Jan. 2014, Ser. No. 14/163,258, with the same assignee, titled "System and method for road side equipment of interest selection for active safety applications". The teachings of all the above applications are incorporated herein, by reference. The current application claims the priority date of the above applications.

BACKGROUND OF THE INVENTION

Vehicle-to-vehicle (V2V) and vehicle-to-infrastructure (V2I) communication, collectively referred as Vehicle-to-everything (V2X), is a wireless technology for increasing road safety and improving traffic management, with intelligent transport system. It can also include V2P (Vehicle-to-Pedestrian), V2D (Vehicle-to-device), and V2G (Vehicle-to-grid) communications.

The autonomous cars or vehicles are subject of intense research today. The safety is one of the most important issues in this technology. We believe that pedestrians are one of the main actors in this environment. Thus, the pedestrians safety is one of the main issues in our research and development. At Savari, our technology incorporates a platform for pedestrians' safety. The more we guard the pedestrians against the accidents, the less risk is imposed on public, and the more public acceptance for autonomous cars or vehicles is generated.

One aspect of the present invention relates to a system that uses an enhanced positioning system based on a geofencing framework for road vehicle navigation and V2X applications under large satellite signal errors.

There is no prior art or product in the industry that teaches the following features in our disclosure here.

SUMMARY OF THE INVENTION

This disclosure, e.g., adds the following improvements on our platform technologies, as some of the embodiments:

The global navigation satellite system (GNSS) combined with the dead-reckoning (DR) technique is expected to provide a vehicle positioning solution, but it may contain an unacceptable amount of error due to multiple causes, e.g., atmospheric effects, clock timing, and multipath effect. Particularly, the multipath effect is a major issue in the urban canyons because it can create a large bias, e.g., 100 m, which may vary significantly depending on the shapes and sizes of surrounding buildings which are difficult to be quantified (and also the satellite configurations).

In this case, since fusing the GNSS and DR signals would not guarantee an accurate position due to the unpredictable GNSS bias, using the DR without the GNSS is one way to eliminate these GNSS associated issues; however, it would contain position and heading angle errors due to errors from an inaccurate initialization of the DR that is based on the GNSS position and integration errors that accumulate small biases in the speed and yaw rate sensors. This invention overcomes these issues in the DR solution by a geofencing framework based on road geometry information and multiple supplemental kinematic filters. It guarantees a road-level accuracy and enables certain V2X applications which does not require sub-meter accuracy, e.g., signal phase timing, intersection movement assist, curve speed warning, reduced speed zone warning, and red-light violation warning. Automated vehicle is another use case.

DETAILED DESCRIPTION OF THE PREFERRED

Embodiments

Descriptions of the Geofencing Framework for Enhancing Positioning Accuracy:

Overview:

The main processes of this invention are described below, that is, 1) geofencing to correct the vehicle position, when the vehicle has crossed or is predicted to cross the road boundary, 2) yaw rate bias removal, 3) heading angle correction based on the yaw rate error, and 4) retrospective corrections for lane change. A detailed description for each is provided below.

Geofencing:

The geofencing is to limit the location where the vehicle can exist within the road defined between the road boundaries. It is divided into two types: 1) timely geofencing, which occurs on roads distant from intersections and shifts the lateral position of the vehicle to the last lane as soon as the vehicle crosses a road boundary, and 2) predicted geofencing, which occurs at turns at intersections and corrects both the lateral and longitudinal offsets during the turn maneuver, if the error between the predicted turn path and the reference turn path exceeds a tolerance in either direction.

Figure 67:
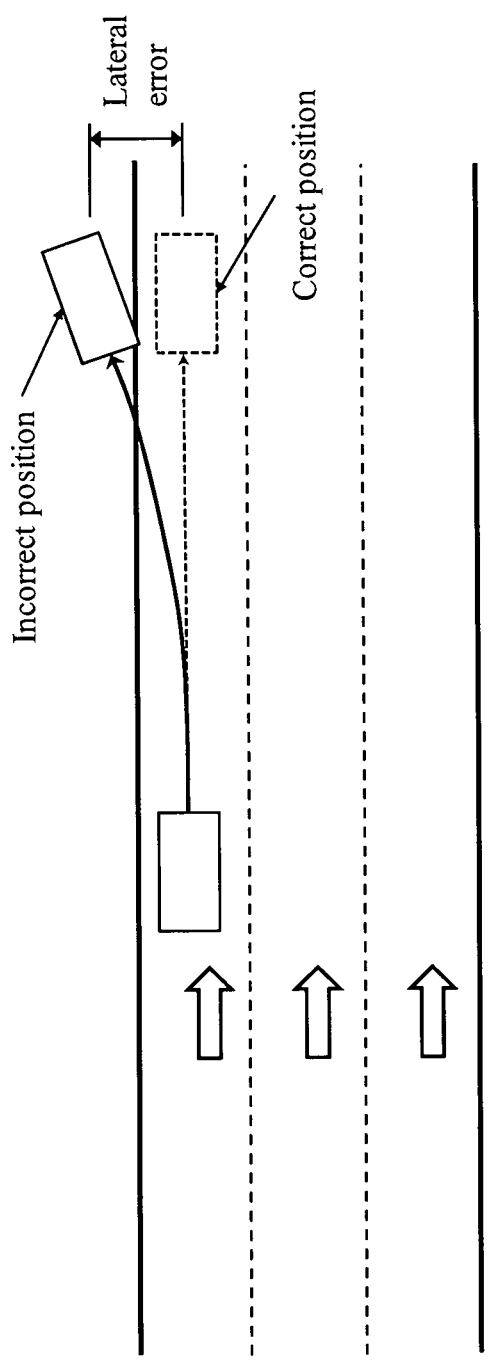
FIG. 67 is for one embodiment of the invention, for timely geofencing.

FIG. 67 describes the timely geofencing strategy. The solid rectangle represents the original vehicle position which is caused by incorrect position and heading angle and/or integration error, and the dashed rectangle shows the corrected position. The timely geofencing is triggered when the conditions below are satisfied:

The vehicle is interior to the reference road

The distance to the next intersection is greater than a threshold

The vehicle yaw rate is less than a threshold

The vehicle speed is greater than a threshold

The absolute value of the difference between the vehicle and road heading angles is not greater than a threshold (note that these are all different thresholds, in general.)

The vehicle crosses the road boundary

Figure 68:
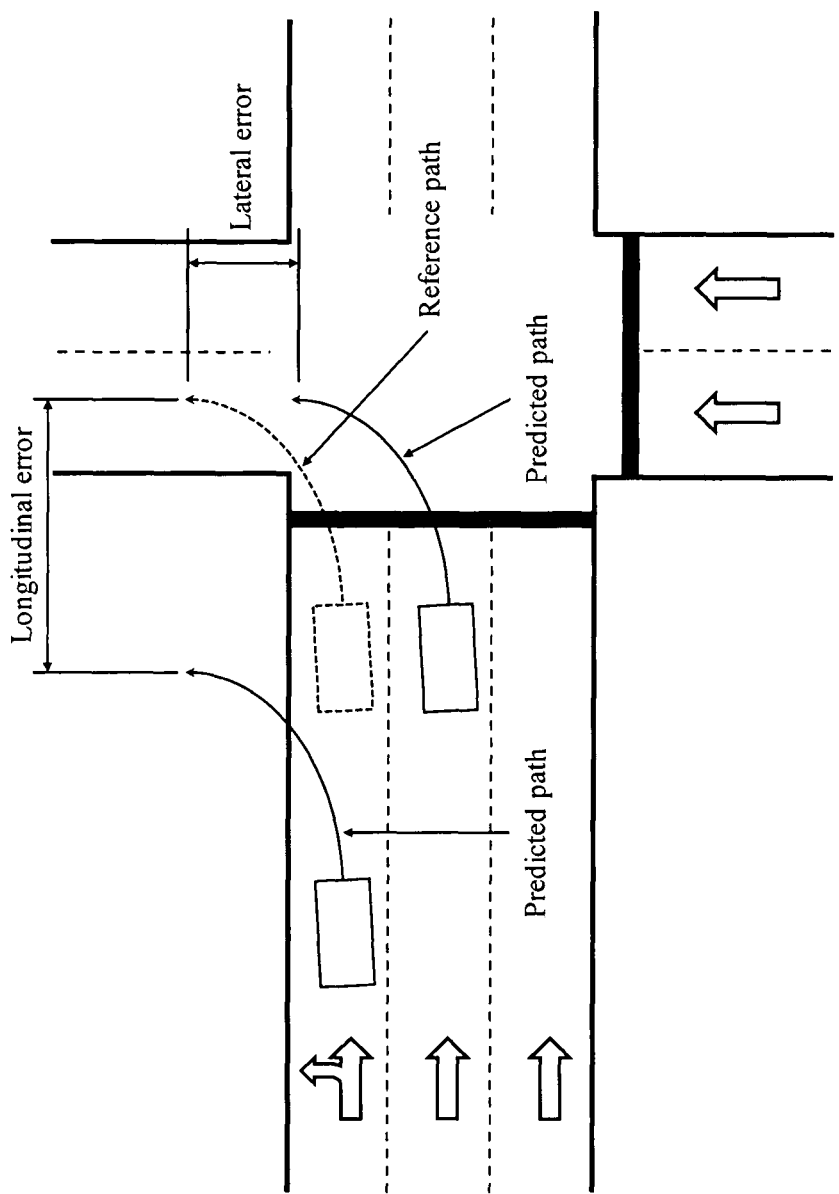
FIG. 68 is for one embodiment of the invention, for predicted geofencing.

FIG. 68 shows a schematic of the predicted geofencing, which assumes that 1) for the lateral correction, the vehicle in the first road before a turn should be in a turn lane, which is close to the inner road boundary, and 2) for the longitudinal correction, the predicted vehicle position after the turn should not be too far from the inner road boundary of the second road. If these are violated, the vehicle will be moved to the middle of the reference lane. A sign of a turn is identified by the vehicle heading offset from the road heading angle exceeding a threshold, and the lateral offset after a turn is estimated by using a typical longitudinal procession along the first road from the detection of a turn.

Figure 69:
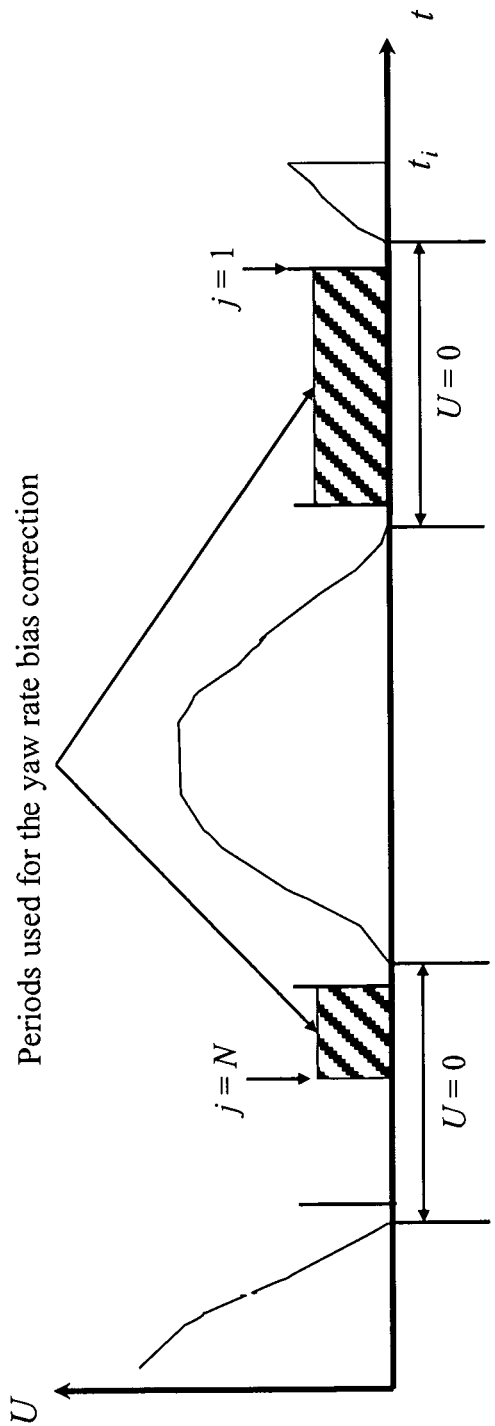
FIG. 69 is for one embodiment of the invention, for time range used in the raw rate bias correction.

Yaw Rate Bias Removal:

The yaw rate sensor contains a bias, and it varies by sensor temperature. It is crucial to minimize such an error for a better heading angle result from the yaw rate integration. This is achieved by calculating the average of the bias within a moving time window when the vehicle is stationary, and subtract the value from the raw value:

$$\bar{r}_i(t_i) = \frac{\sum_{j=1}^{N} r_j(t_j)}{N}$$

$$r_i^{corr}(t_i) = r_i(t_i) - \bar{r}_i(t_i)$$

where $r_i$, $\bar{r}_i$, and $r_i^{corr}$ are the raw yaw rate, average of yaw rate with the vehicle stationary, and the corrected yaw rate, respectively, at time $t_i$, and the subscript j in above formula is an index parameter counting backward in time for a set of the most recent time stamps up to N samples at which the vehicle speed was zero, excluding those close to both the ends of stationary periods to avoid potential errors from remaining vibration and noise (see FIG. 69 for the time range used in the yaw rate bias correction).

Heading Angle Correction Based on Yaw Rate Error

It is assumed that the vehicle is going to remain in the same lane, if the error between the vehicle yaw rate and the reference yaw rate is less than a threshold, or:

$$|r - r_{ref}| \le \Delta r_{th}$$

where $r_{ref} = cU$ (c: road curvature, and U: vehicle speed) and $\Delta r_{th}$ is a threshold. If this condition is met, the vehicle heading angle is set to the road heading angle to eliminate the heading error that is introduced by the yaw rate integration.

Retrospective Integrations

Figure 70:
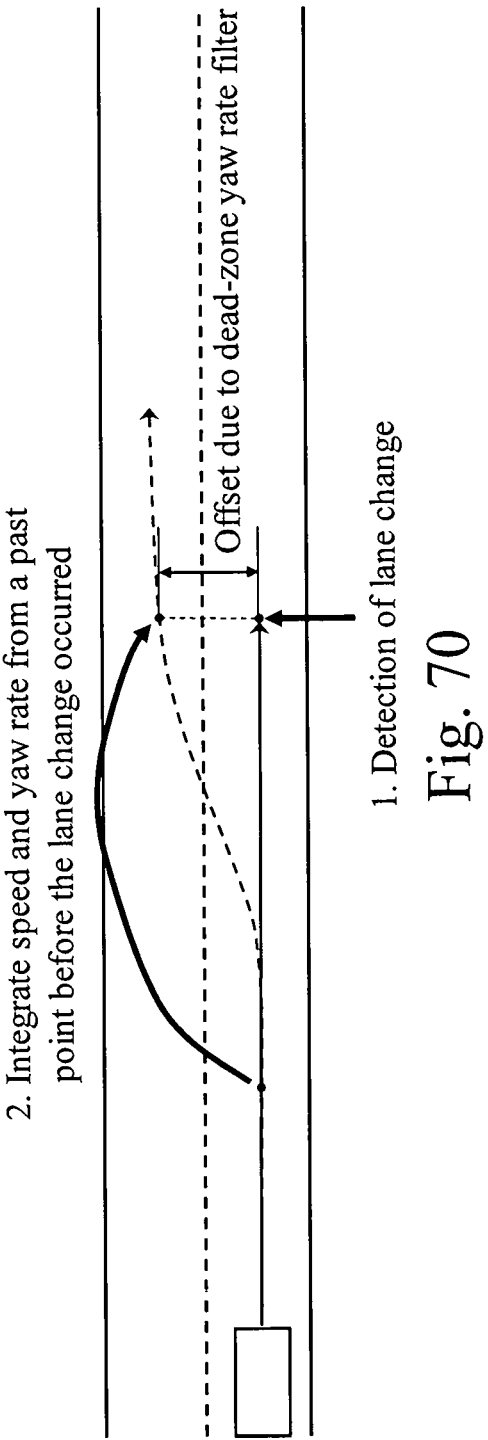
FIG. 70 is for one embodiment of the invention, for retrospective integrations.

A drawback of the heading angle correction in here is that when a lane change occurs the vehicle position would be different from the true position, due to the forced heading angle, which does not allow lateral movement relative to the road and the heading angle offset due to a lack of yaw rate integration. This is corrected by performing a yaw rate integration from a past point before such a maneuver occurred. This is visualized in FIG. 70, for retrospective integrations.

System Structure

Figure 71:
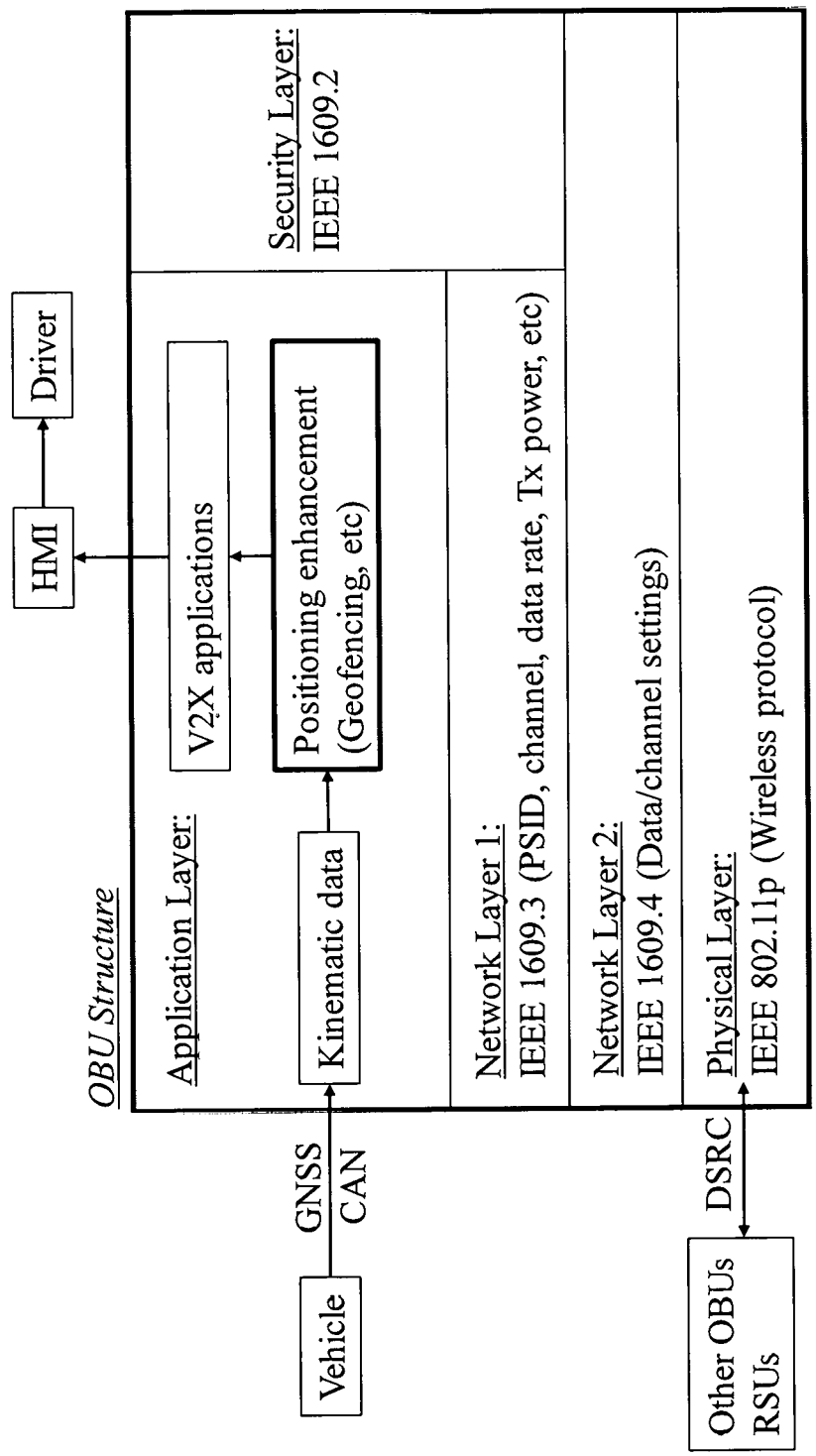
FIG. 71 is for one embodiment of the invention, for system structure.

A system structure augmented by the enhanced positioning system in the onboard unit (OBU) is shown in FIG. 71. As shown in this figure, it can be inserted in an existing positioning system to improve the original navigation system.

Figure 72:
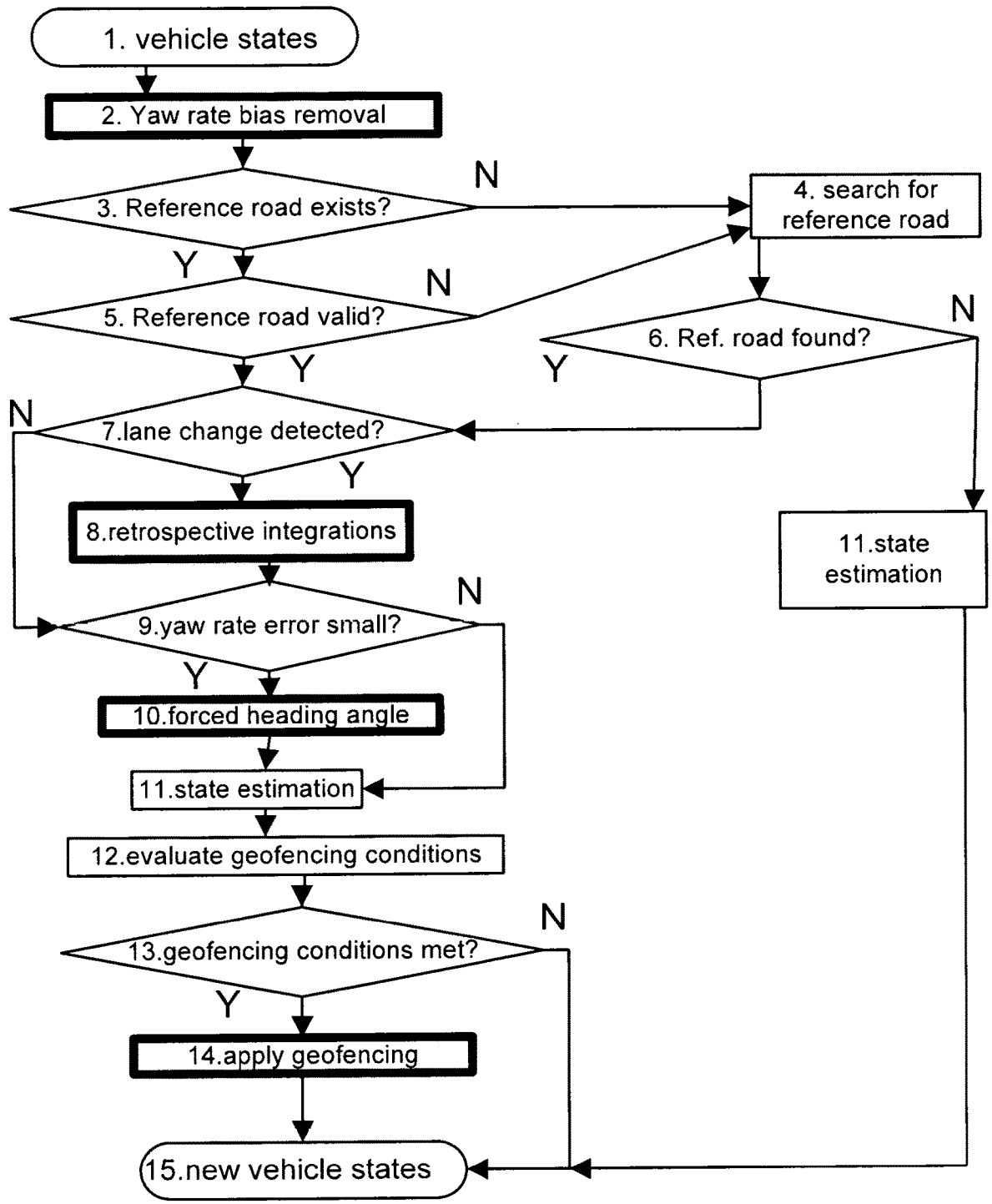
FIG. 72 is for one embodiment of the invention, for flowchart or method of the enhanced positioning system.

FIG. 72 shows a flowchart of the enhanced positioning system. The main components for the positioning improvement are indicated by thick edges. This setup of road navigations assumes that a GNSS, yaw rate sensor, speed sensor, and road geometry database are available. It is noted that the GNSS is used to initialize the DR and find an associated road segment, and the only DR is used afterwards.

Brief descriptions of all blocks in the flowchart are provided below:

Block 1:

The vehicle states of interests are the position, heading angle, speed, and yaw rate. If the vehicle position is in the geographical coordinates, they need to be transformed into Cartesian coordinates for the rest of the procedure.

Block 2:

The yaw rate bias removal explained in section above is performed in this block.

Block 3:

Determine if a reference road is available or not. The reference road is a line or curve connecting two adjacent intersections used to correct the vehicle position and heading, when necessary, providing necessary information for this purpose, such as the coordinates of the end points of the reference road, road heading angle, curvature, and road width.

Block 4:

If there is no reference road is available, one is searched for by the following steps:

Step 1—Find candidates for the reference road where the vehicle position is interior to the end points, with tolerances Step 2—Find the closest candidate among those satisfying a heading error below a threshold Step 3—Adjust the order of the end points to be consistent with the travel direction of the vehicle Whether a point is interior or exterior to the reference road or not is determined by a flag, defined as:

$$\text{flag} = \begin{cases} -1 & \text{if } |\alpha_1| > \frac{\pi}{2} \\ 0 & \text{if } |\alpha_1| \leq \frac{\pi}{2} \text{ and } |\alpha_2| \geq \frac{\pi}{2} \\ 1 & \text{if } |\alpha_2| < \frac{\pi}{2} \end{cases}$$

Figure 73:
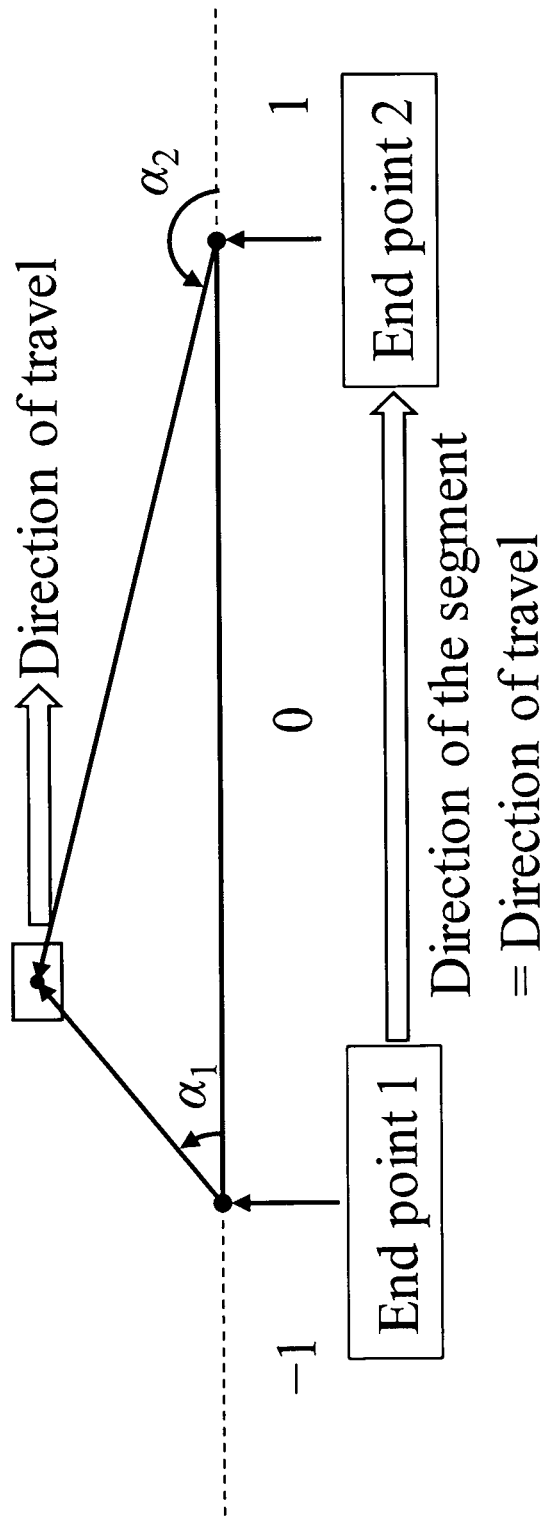
FIG. 73 is for one embodiment of the invention, for reference road.

The geometric interpretation of the flag value is described in FIG. 73 (for reference road). The flag value −1 means that the vehicle is before the first end point of the reference road, 0 between the end points, and 1 after the second end point.

Block 5:

A valid reference road is one with the vehicle is interior to it, and the difference between the vehicle heading and road heading is less than a threshold.

Block 6:

If a reference road is found in Block 4, go to Block 8. Otherwise, the rest of the procedure will be skipped. (See the flowchart in FIG. 72.)

Block 7:

A lane change is detected, if a duration in which the absolute value of the yaw rate continuously exceeds a threshold becomes longer than a specified time, within a time window.

Block 8:

Retrospective integrations of the speed and yaw rate are performed, if a lane change is detected to correct the vehicle position and heading angle, which may contain errors due to the fixed heading angle in Block 10, from the previous time step.

Block 9:

The yaw rate error test described in section above is performed.

Block 10:

Depending on the result from Block 9, the vehicle heading angle is forced to the road heading angle.

Block 11:

Stochastic filters (e.g., Kalman filters) is applied to update the vehicle states, i.e., position, velocity, acceleration, and heading angle. This process involves a sensor fusion between the GNSS and DR, if the GNSS signal error is within a valid range. Otherwise, only DR solution is updated.

Block 12:

Before outputting the vehicle states to the upper layer in the OBU, the validity of the vehicle position is evaluated using the reference road found in Block 4.

Block 13:

The geofencing conditions described in section above are evaluated.

Block 14:

If a geofencing condition is met, the geofencing is performed to correct the vehicle position.

Block 15:

Updated vehicle position data are outputted to the upper layer of the system.

Figure 74:
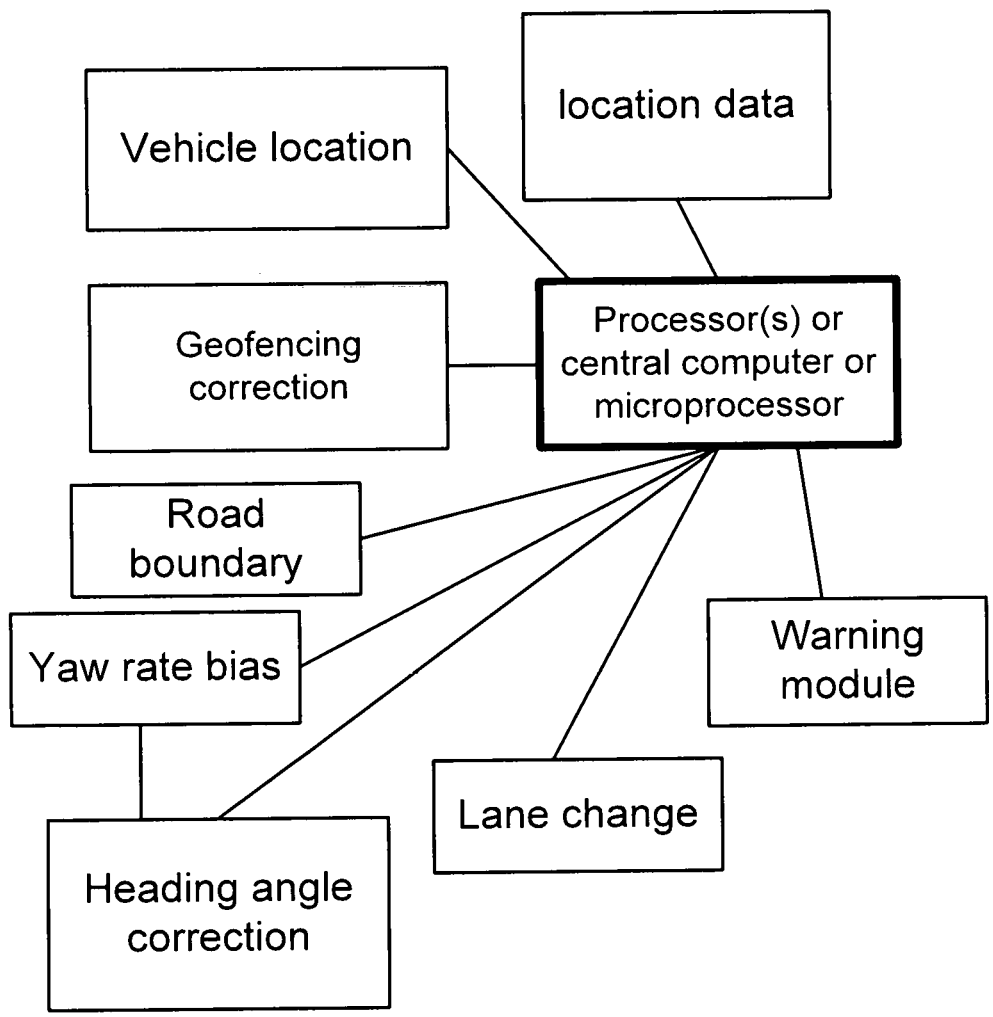
FIG. 74 is for one embodiment of the invention, for the system of geofencing.
Figure 75:
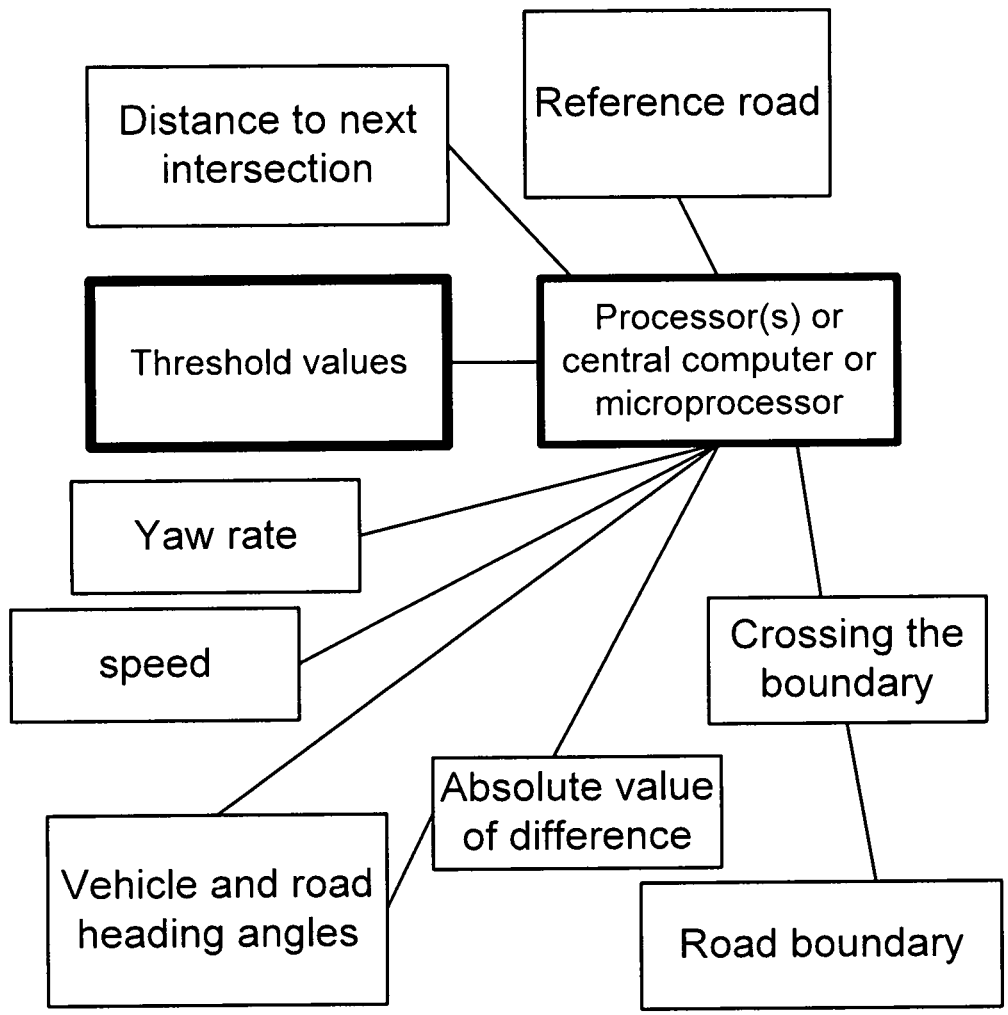
FIG. 75 is for one embodiment of the invention, for the system of geofencing.
Figure 76:
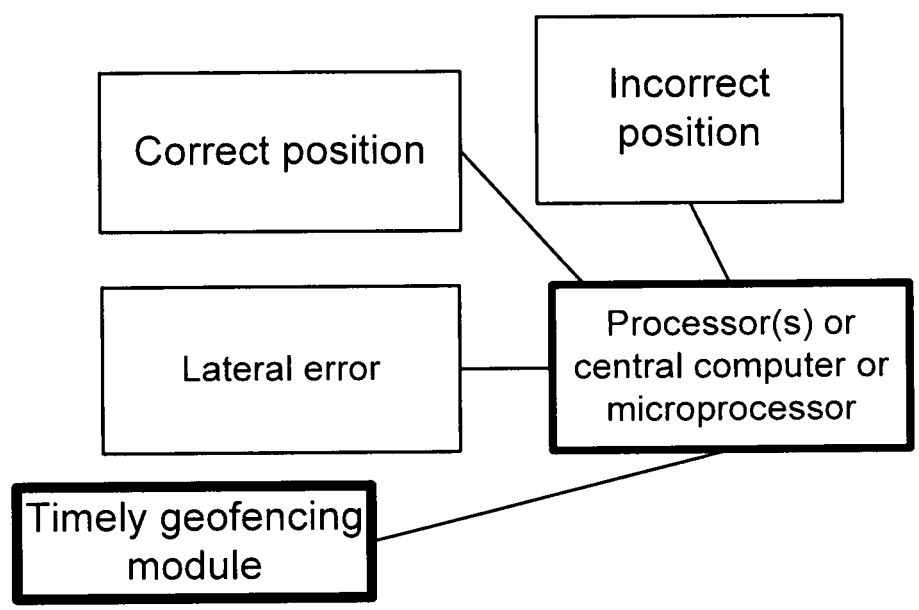
FIG. 76 is for one embodiment of the invention, for the system of geofencing.
Figure 77:
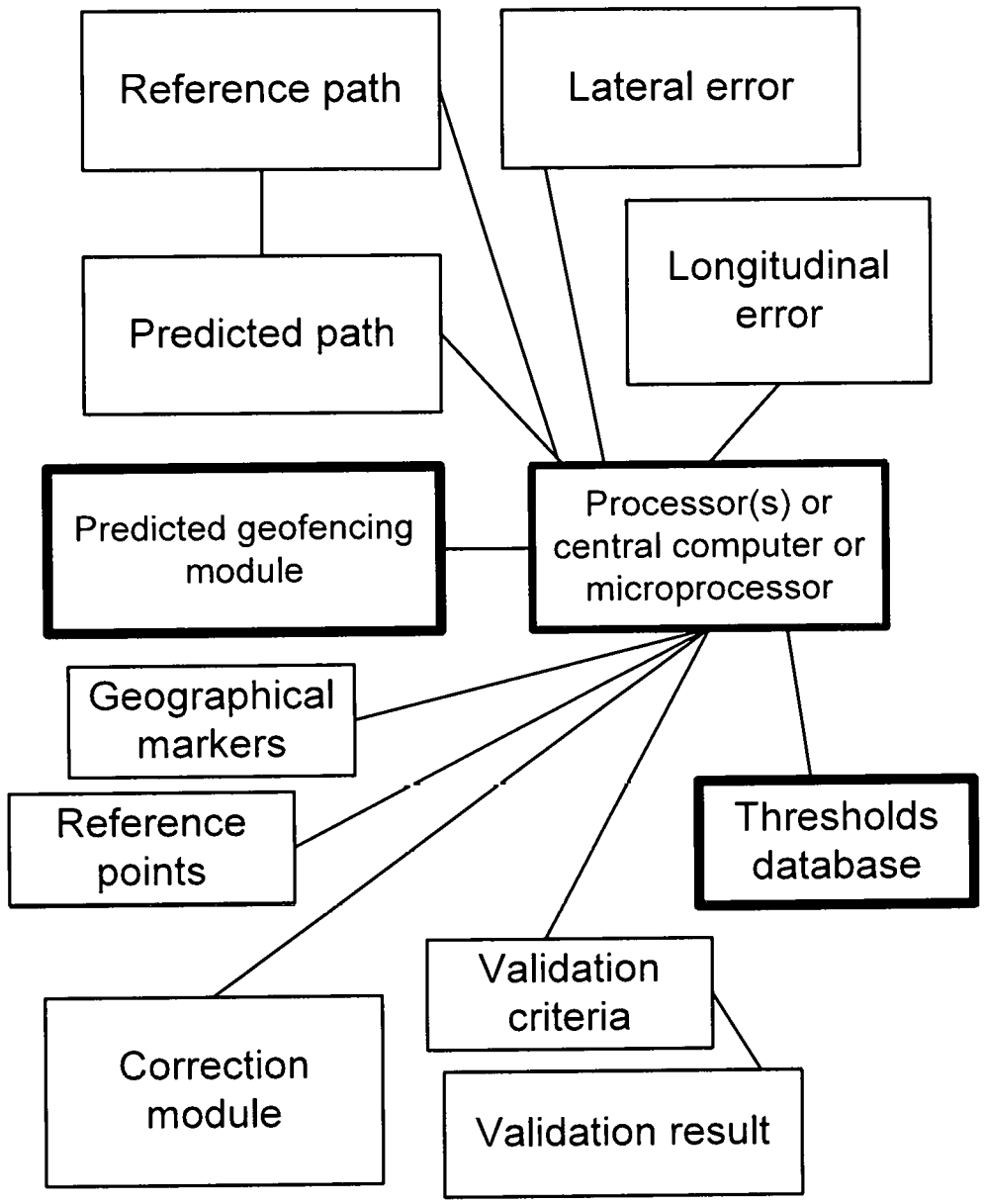
FIG. 77 is for one embodiment of the invention, for the system of geofencing.
Figure 78:
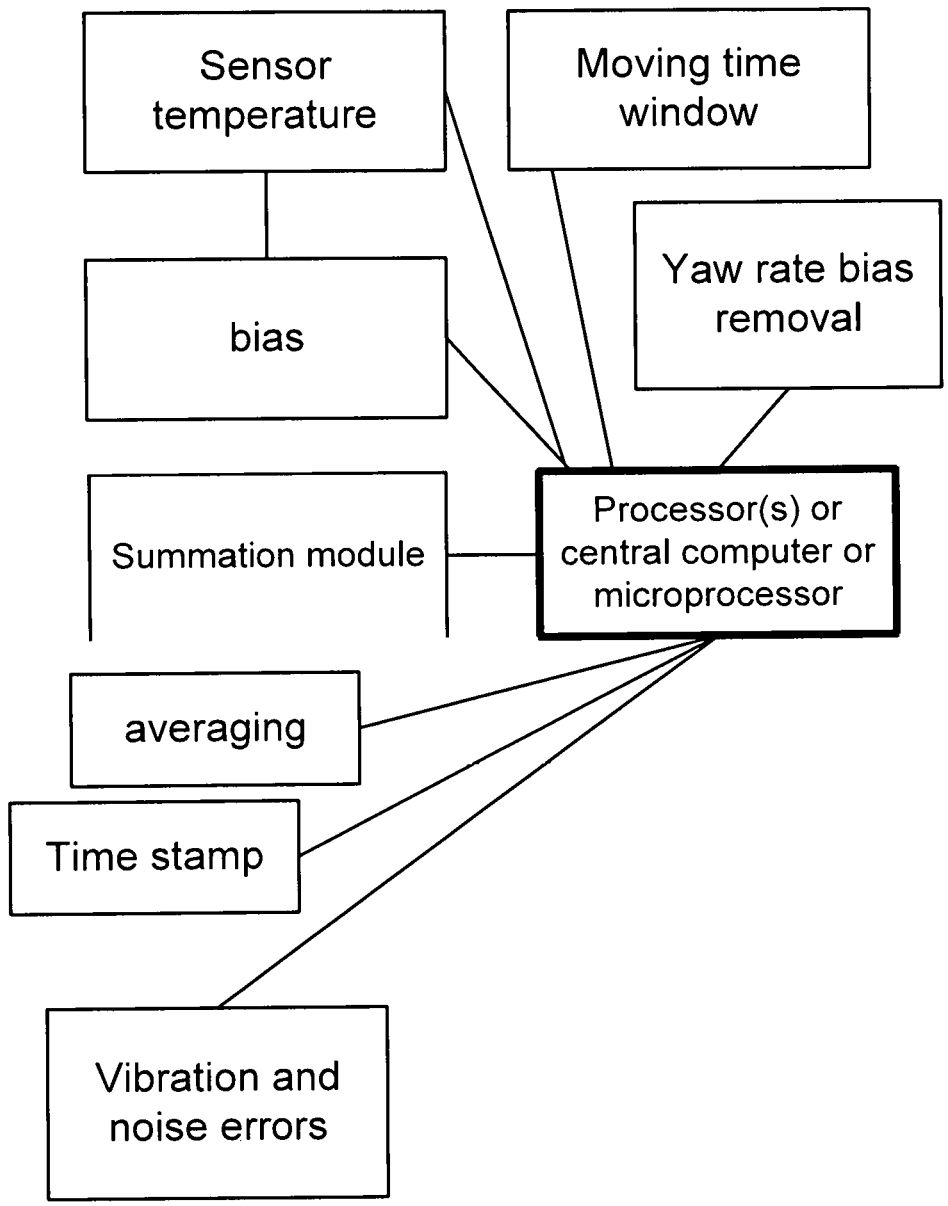
FIG. 78 is for one embodiment of the invention, for the system of geofencing.
Figure 79:
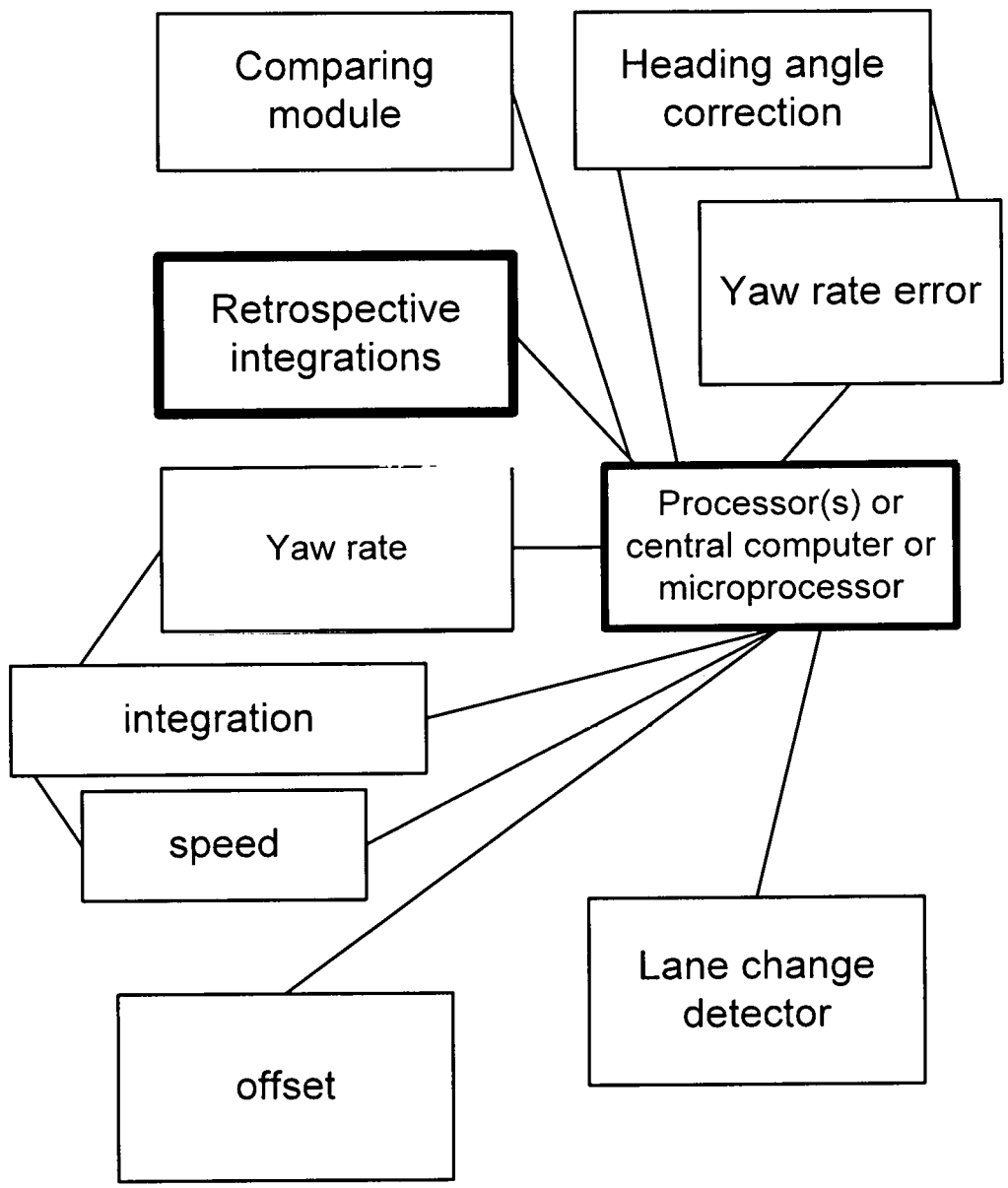
FIG. 79 is for one embodiment of the invention, for the system of geofencing.
Figure 80:
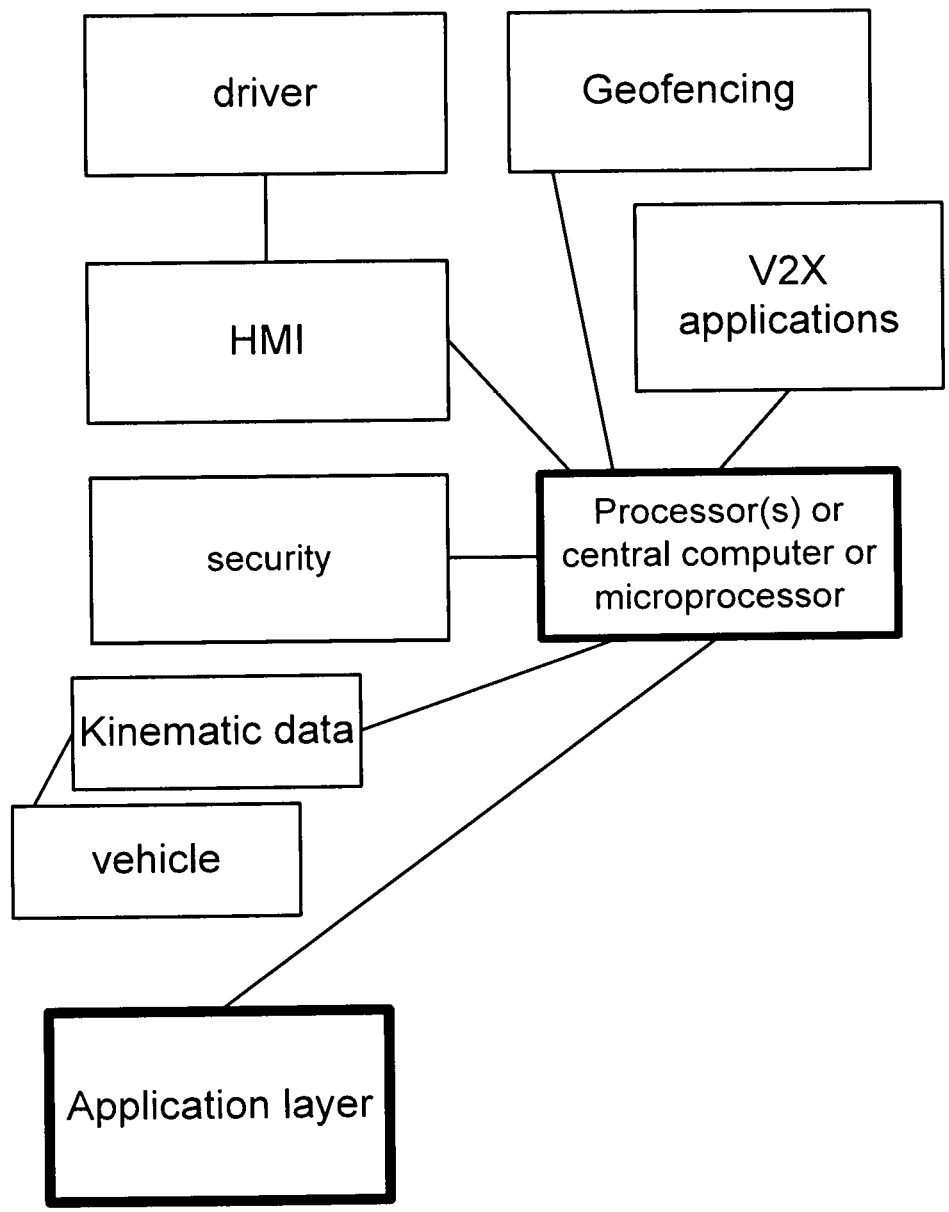
FIG. 80 is for one embodiment of the invention, for the system of geofencing.
Figure 81:
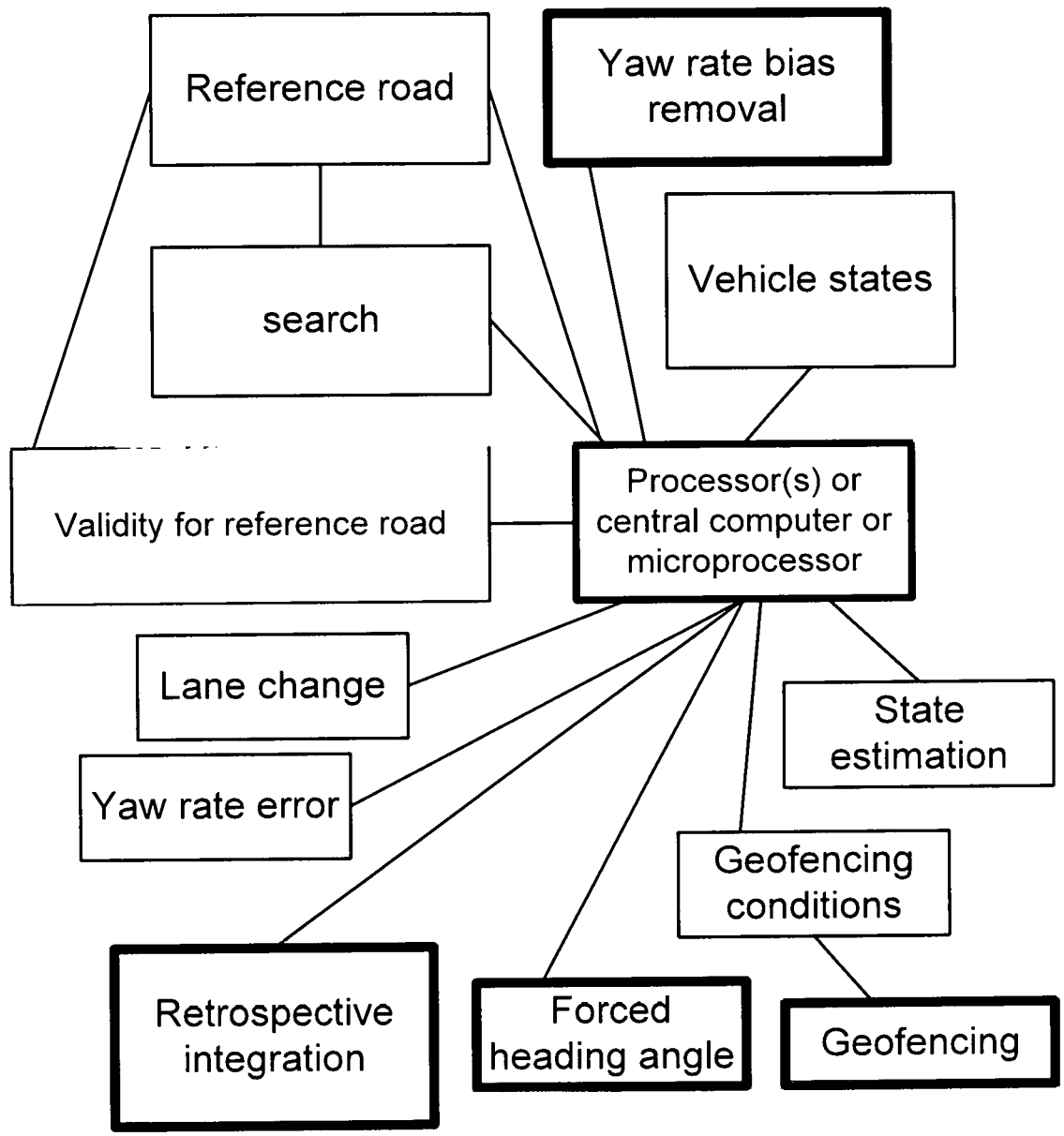
FIG. 81 is for one embodiment of the invention, for the system of geofencing.
Figure 82:
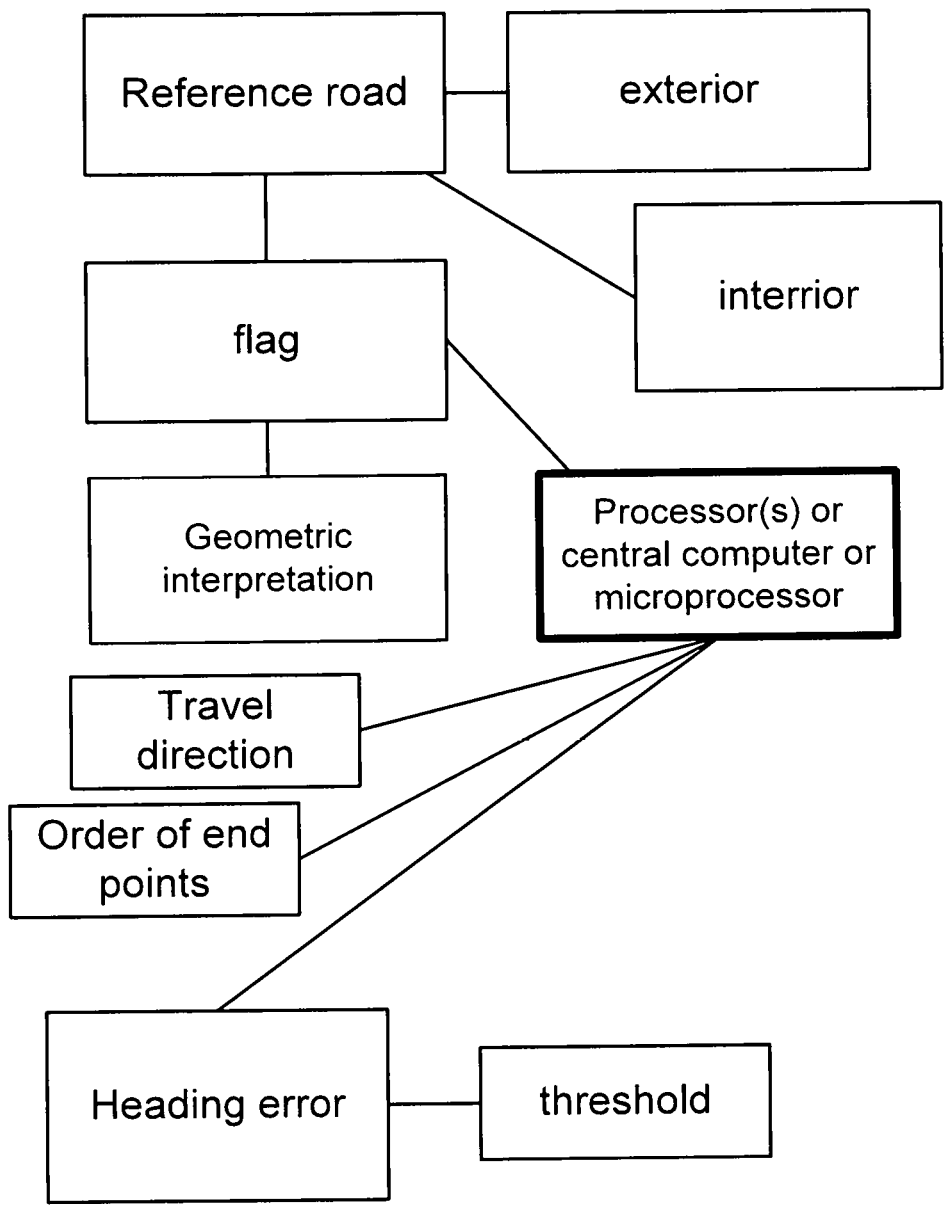
FIG. 82 is for one embodiment of the invention, for the system of geofencing.
Figure 83:
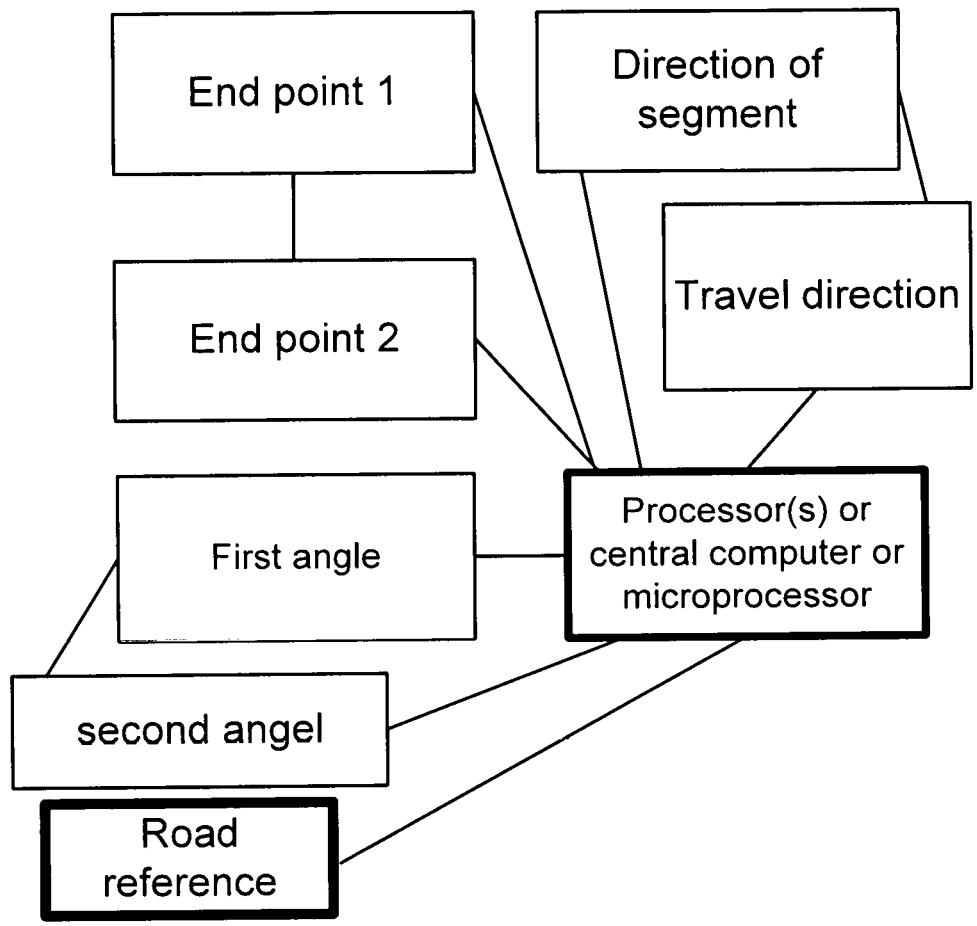
FIG. 83 is for one embodiment of the invention, for the system of geofencing.
Figure 84:
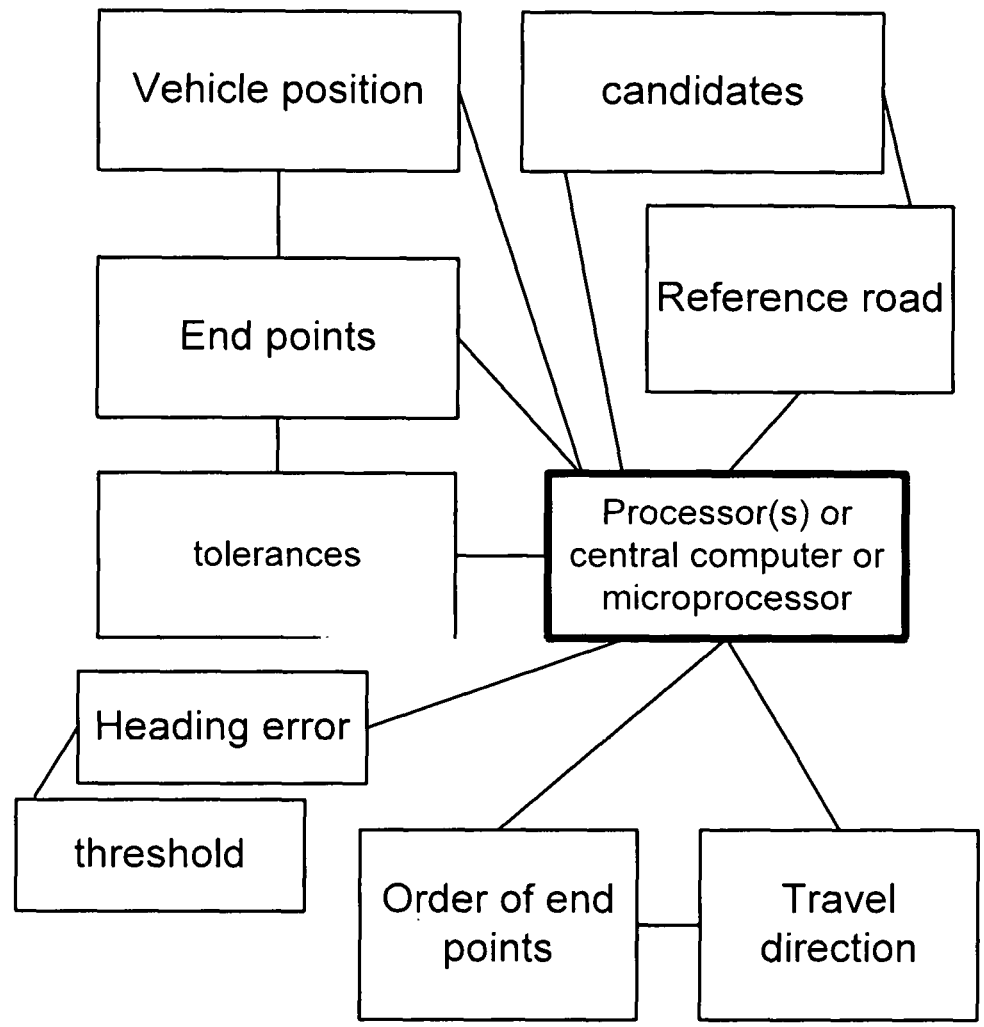
FIG. 84 is for one embodiment of the invention, for the system of geofencing.

As shown below, for other parts of our system/inventions, we can integrate all the components above to make the operation of the vehicle much safer for self-driving or autonomous vehicles, as well as for human-operated cars/vehicles. (FIG. 74 is for one embodiment of the invention, for the system of geofencing, as well as FIGS. 75-84, for different components and variations on sub-systems.)

Prior Embodiments of the Inventions in the Parent Cases

Here are some of the prior embodiments of the inventions in the parent cases:

The V2X applications, such as forward collision warning, electronic emergency brake light, left turn assist, work zone warning, signal phase timing, and others, mainly rely on a GNSS positioning solution transmitted via the Dedicated Short-Range Communications (DSRC) to/from the roadside units and onboard units in other V2X-enabled vehicles. However, the positioning solution from a GNSS may be deteriorated by noise and/or bias due to various error sources, e.g., time delay, atmospheric effect, ephemeris effect, and multipath effect. This invention offers a novel quality filter that can detect noise and the onset of drift in GNSS signals by evaluating up to four metrics that compare the qualities of kinematic variables, speed, heading angle change, curvature, and lateral displacement, obtained directly or derived from GNSS and onboard vehicle sensors.

Here, we describe some of the embodiments of our system and method:

Let's look at the details of one method:

Three metrics are considered every time a new GNSS position estimate is provided, and each metric compares kinematic variables obtained from the GNSS and vehicle sensors. When these metrics appear to be within tolerances, the GNSS signal is considered valid.

Each metric is explained in detail in the following sections:

First Metric:

The first metric, M1, compares speed values from GNSS with that from the vehicle sensor sampled within a moving time window of an interval between a past time and the current time. It is described by the ratio:

$$M_1(t_c) = \frac{n(\{i : |V^i_{GNSS} - V^i_{CAN}| \le \Delta V_{thres}, t_i \in [t_c - \Delta T_1, t_c]\})}{n_1} \quad (1)$$

where the numerator is the number of occurrences that the speed difference between the two sensors is less than a threshold value, $\Delta V_{thres}$, the denominator is the number of time stamps in the moving window, $t_c$ is a current time stamp, and $\Delta T_1$ is the interval of the moving window. The condition that this metric must satisfy for a GNSS signal to be valid is:

$$M_1(t_c) \ge p_1 \quad (2)$$

where p1 is a constant threshold value which is not greater than 1.

Second Metric:

The second metric, M2, compares the changes of the heading angle from the GNSS and that derived from yaw rate sensor signals. This comparison is to be made for all combinations of time pairs within a moving time window. This time window is similar to the one in the first metric, but its window size may be different. This metric accounts for two characteristics: 1) overall heading change (i.e., final offset) and 2) fluctuations (i.e., smoothness).

The GNSS heading change between two time points is calculated by either:

$$\Delta \psi^{i,j}_{GNSS} = \tan^{-1}\left(\frac{E_j - E_i}{N_j - N_i}\right) \quad (3)$$

for geographic coordinates, where λ is latitude and φ is longitude for the geographic coordinate system, and i and j are the indices of two time stamps in the current moving window, i.e., $(t_i, t_j) \in [t_c - \Delta T_2, t_c], t_i < t_j$ where $\Delta T_2$ is the size of the moving window.

Or, on the other hand, a heading change can be calculated by integrating the yaw rate using the trapezoid rule:

$$\Delta \psi^{i,j}_{CAN} = \sum_{k=i+1}^{j} \left(\frac{(r_{k-1} + r_k)}{2} \Delta t_k\right) \quad (4)$$

where rk is the yaw rate at t=tk, and $\Delta t_k = t_k - t_{k-1}$.

As a result, the second metric is defined by:

$$M_2(t_c) = \sum_{\substack{\forall(i,j) \\ i<j}} |\Delta \psi^{i,j}_{GNSS} - \Delta \psi^{i,j}_{CAN}| \quad (5)$$

and for a valid GNSS signal, $$M_2(t_c) \le p_2 \quad (7)$$

where p2 is an angular threshold representing a maximum allowable value for the sum of the absolute values of the heading change differences.

Third Metric:

The third metric, M3, evaluates the positional stability of GNSS data by comparing the curvature of the GNSS trajectory and a derived trajectory from the speed and yaw rate sensors on the vehicle.

The GNSS curvature at time ti is approximated by using heading angles and speeds from two consecutive time stamps:

$$c_{GNSS}^{i-1,i} = \Delta H_{GNSS}^{i-1,i}/L_{GNSS}^{i-1,i} \quad (8)$$

where $c_{GNSS}^{i}$ is the curvature of the GNSS trajectory, $\Delta H_{GNSS}^{i-1,i}$ is the heading change defined by:

$$\Delta H_{GNSS}^{i-1,i} = H_{GNSS}^{i} - H_{GNSS}^{i-1} \quad (9)$$

where $$H_{GNSS}^{i} = \tan^{-1}\left(\frac{E_{GNSS}^{i} - E_{GNSS}^{i-1}}{N_{GNSS}^{i} - N_{GNSS}^{i-1}}\right), \quad (10)$$

and $L_{GNSS}^{i-1,i}$ is the distance traveled in $[t_{i-1}, t_i]$, or $$L_{GNSS}^{i-1,i} = V_{GNSS}^{i-1} \cdot (t_i - t_{i-1}) \quad (11)$$

Applying the above calculations to each time stamp in a target moving window $\Delta T_3$ we can find the average GNSS curvature at the current time for that moving window, i.e., $$\bar{c}_{GNSS}(t_c) = \frac{\sum_{k=3}^{n_3} c_{GNSS}^{k-1,k}}{n_3 - 2} \quad (12)$$

On the other hand, another curvature derived from the vehicle sensors is calculated as follows:

$$\bar{c}_{CAN}(t_c) = \frac{\sum_{k=2}^{n_3}(r_{k-1} + r_k)}{\sum_{k=2}^{n_3}(V_{CAN}^{k-1} + V_{CAN}^{k})} \quad (13)$$

Consequently, the third metric and condition for a valid GNSS signal are described as $$M_3(t_c) = \left|\frac{\overline{c}_{GNSS}(t_c) - \overline{c}_{CAN}(t_c)}{\overline{c}_{CAN}(t_c)}\right| < p_3 \quad (14)$$

where p3 is a threshold for this metric.

Fourth Metric:

The fourth metric also considers positional stability, but is used only if the third metric fails to satisfy its validity condition. It calculates a lateral offset created between the two trajectories in the same moving window for the third metric.

Using the GNSS data, the lateral displacement is calculated by $$y_{GNSS}(t) = x_{GNSS} \sin(\Delta\psi_{GNSS}/2) \quad (15)$$

where $x_{GNSS}$ and $y_{GNSS}$ are the longitudinal and lateral displacements, respectively, and $\Delta\psi_{GNSS}$ is the heading change between the first and last time stamps of the moving time window.

On the other hand, it is calculated using the vehicle sensors by the following equations:

$$y_{CAN}(t_c) = \sum_{k=2}^{n_3} \left(\frac{(V_{CAN}^{k-1} + V_{CAN}^k)}{(r_{CAN}^{k-1} + r_{CAN}^k)}\left(1 - \cos\left(\frac{r_{CAN}^{k-1} + r_{CAN}^k}{2}\right)\right)\right) \quad (16)$$

The offset between these is used as the fourth metric:

$$M_4 = \left|\frac{y_{GNSS}(t_c) - y_{CAN}(t_c)}{y_{CAN}(t_c)}\right| < p_4 \quad (17)$$

where p4 is a threshold that this metric must satisfy for a GNSS signal to be considered valid.

Implementation of the GNSS Quality Filter

Figure 57:
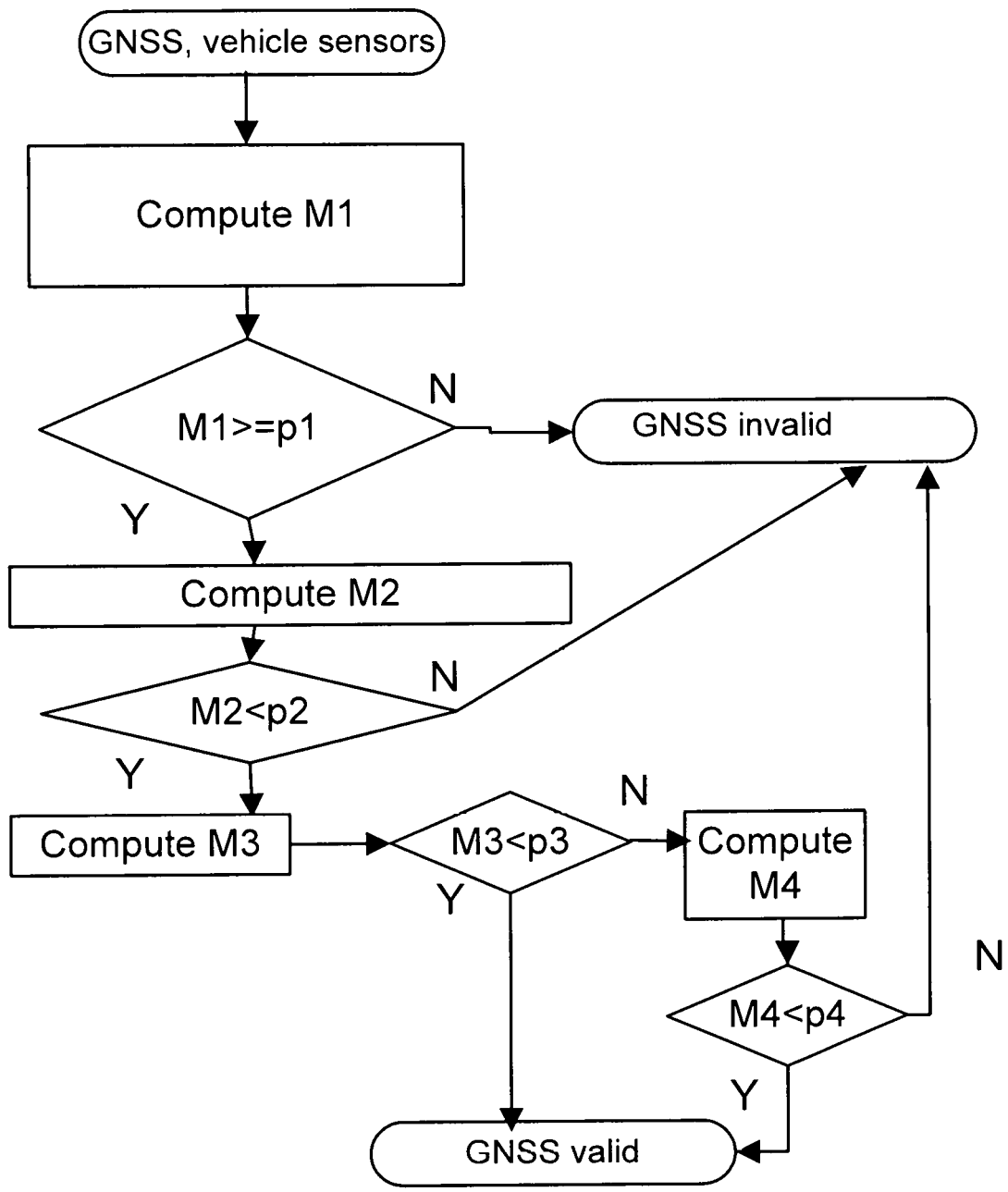
FIG. 57 is for one embodiment of the invention, for a flow chart of the method.

The overall GNSS quality assessment system operates as depicted in FIG. 57. Each metric is evaluated sequentially where if the corresponding condition fails a GNSS signal is considered invalid except for the third metric: If the third metric does not satisfy the condition, the fourth metric is evaluated. This is just one implementation model example, but it can be any combination.

Figure 58:
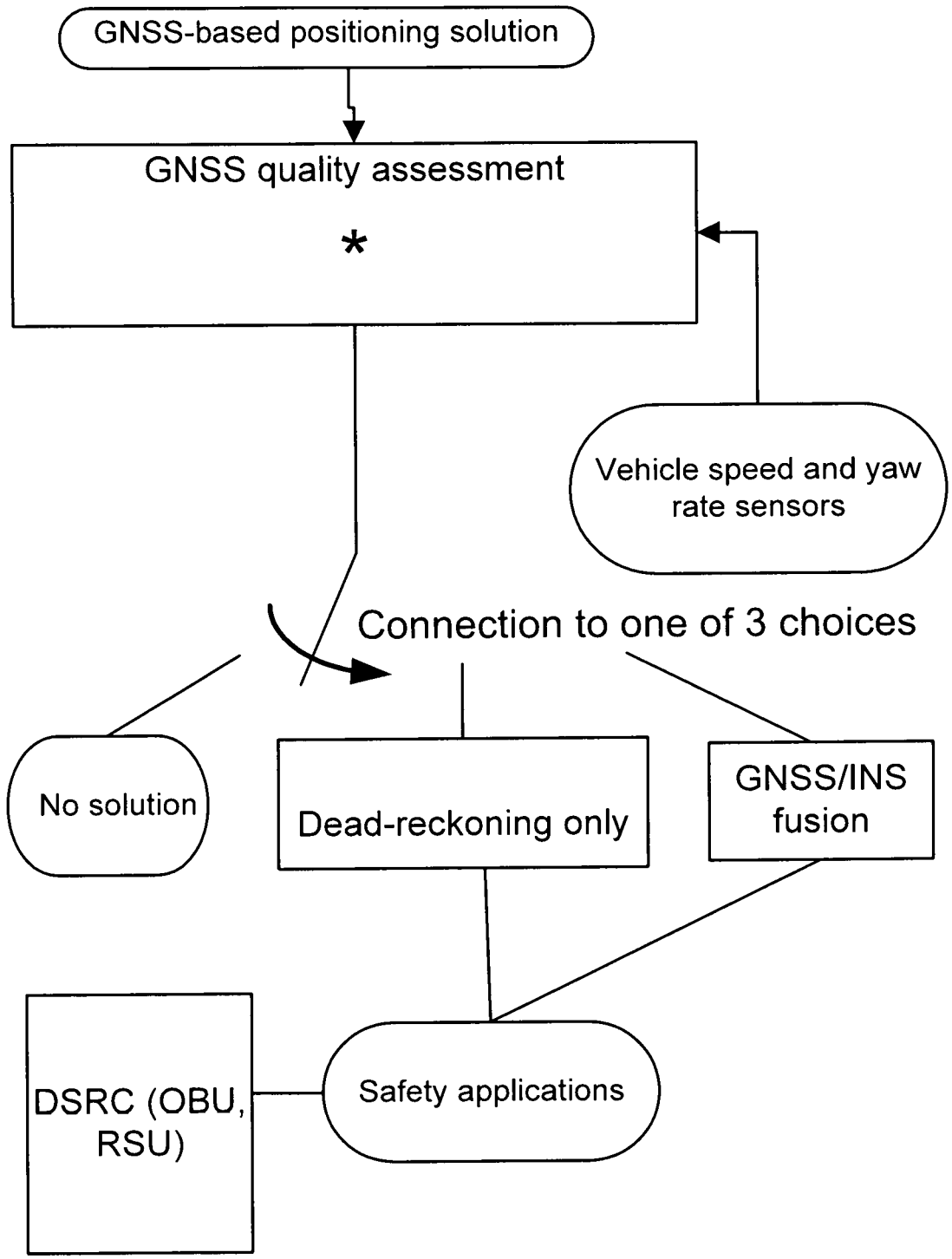
FIG. 58 is for one embodiment of the invention, for a flow chart of the method.

An example situation where this system is useful is driving in a city in which GNSS signals may be corrupted occasionally due to the multipath effect that occurs in the urban canyon. In such a situation, it is important to be able to accept a GNSS signal when it is valid and discard otherwise. FIG. 58 shows a schematic of a prototype in which an existing positioning system in the V2X system is augmented by the methodology explained above. The current invention denoted by * serves as a quality filter for V2X applications to reduce the numbers of false positives and negatives.

Basically, we want to make sure that we do not get erroneous results or get overconfident on some results, by reducing the numbers of false positives and negatives. So, the reliability of result and confidence on system go up together, and we can view the problem and double-check the results in at least 3 ways, with a $4^{th}$ way, as a backup for verification of the $3^{rd}$ method.

This is very important, as any false positives and negatives, with the cars in the road, could be fatal or very expensive, in terms of human well-being and properties. On the other hand, any correction and verification can save lives and properties or reduce damages drastically. In addition, it can supplement the human judgements and response, to correct or reduce the errors, to avoid accidents, as a preventive measure for human driver.

This is based on expectation and prediction of a behavior for a vehicle or the trajectory, to conclude from observations what it should be or do at a given moment. Any help from mathematical modeling of the situation and environment would be useful for the driver, or for autonomous car. This is especially true, when we look at many cars or many drivers, as the chance of accident with or without the driver is usually high at any given moment for some car in the city. The following figures give more details and components of the system.

As one embodiment, for one example, based on FIG. 57, we have: A method for positioning quality filter for a global navigation system for a vehicle, said method comprising: a central computer receiving global positioning system location data; said central computer receiving sensors data from vehicle sensors; said central computer calculating a first metric value; a processor receiving a first threshold; said processor comparing said first metric value with said first threshold; in case said first metric value is smaller than said first threshold, said processor setting a global navigation system value as invalid; in case said first metric value is larger than or equal to said first threshold, said processor receiving a second threshold; said central computer calculating a second metric value; said processor comparing said second metric value with said second threshold; in case said second metric value is larger than or equal to said second threshold, said processor setting said global navigation system value as invalid; in case said second metric value is smaller than said second threshold, said processor receiving a third threshold; said central computer calculating a third metric value; said processor comparing said third metric value with said third threshold; in case said third metric value is smaller than said third threshold, said processor setting said global navigation system value as valid; in case said third metric value is larger than or equal to said third threshold, said processor receiving a fourth threshold; said central computer calculating a fourth metric value; said processor comparing said fourth metric value with said fourth threshold; in case said fourth metric value is smaller than said fourth threshold, said processor setting said global navigation system value as valid; in case said fourth metric value is larger than or equal to said fourth threshold, said processor setting said global navigation system value as invalid; said central computer validating said global positioning system location data using said global navigation system value, for safety, operation, or navigation of said vehicle.

As other embodiments, we have the following choices or options:

wherein said first threshold is not greater than 1.
getting data for said vehicle speed.
getting data for said vehicle direction.
getting data for said vehicle yaw rate.
correcting said vehicle's direction.
warning an operator.
warning a driver.
warning headquarters.
warning a central server.
warning another driver.
warning another car.
communicating with pedestrians.
communicating with cloud.
communicating with server farms.

communicating with police.
communicating with a grid.
communicating with a secured network.
communicating with outside car sensors.
resolving conflict between sensors and/or received data.

Figure 59:
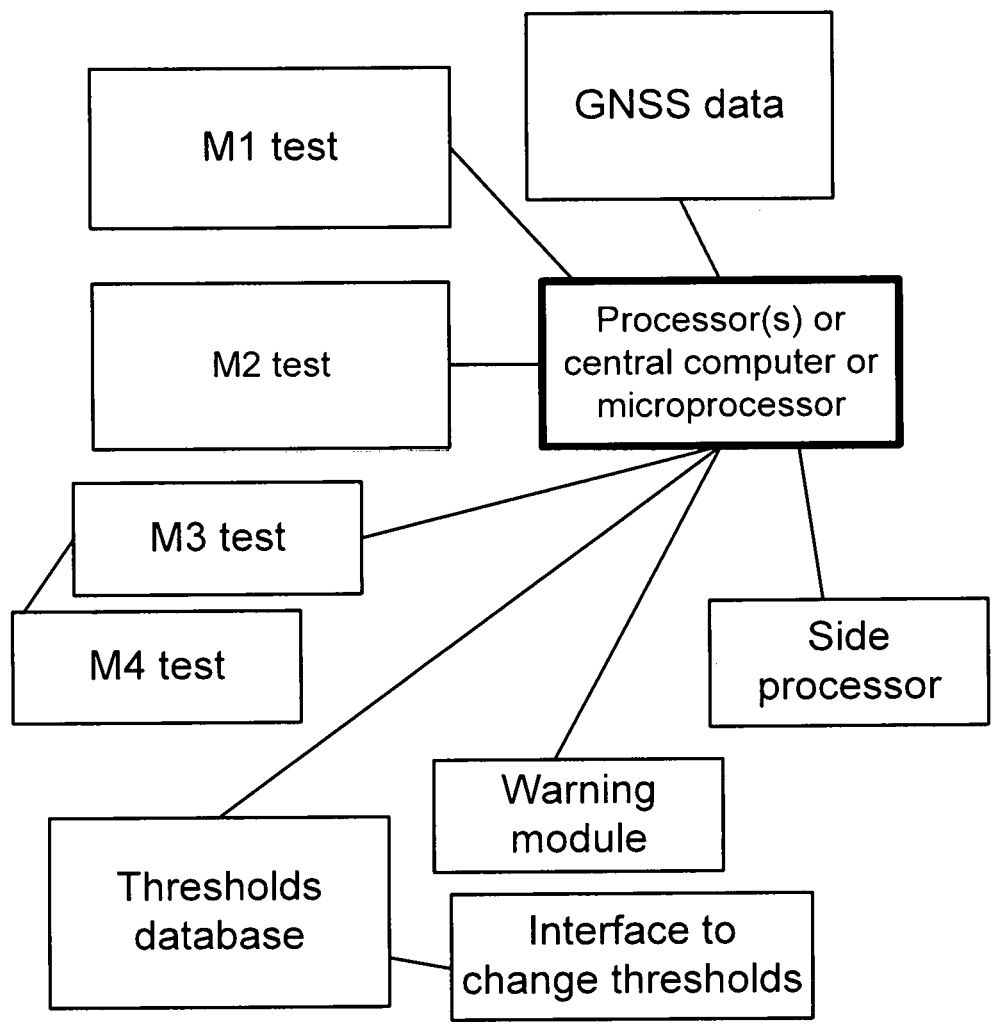
FIG. 59 is for one embodiment of the invention, for a system for filter for V2X technology.
Figure 60:
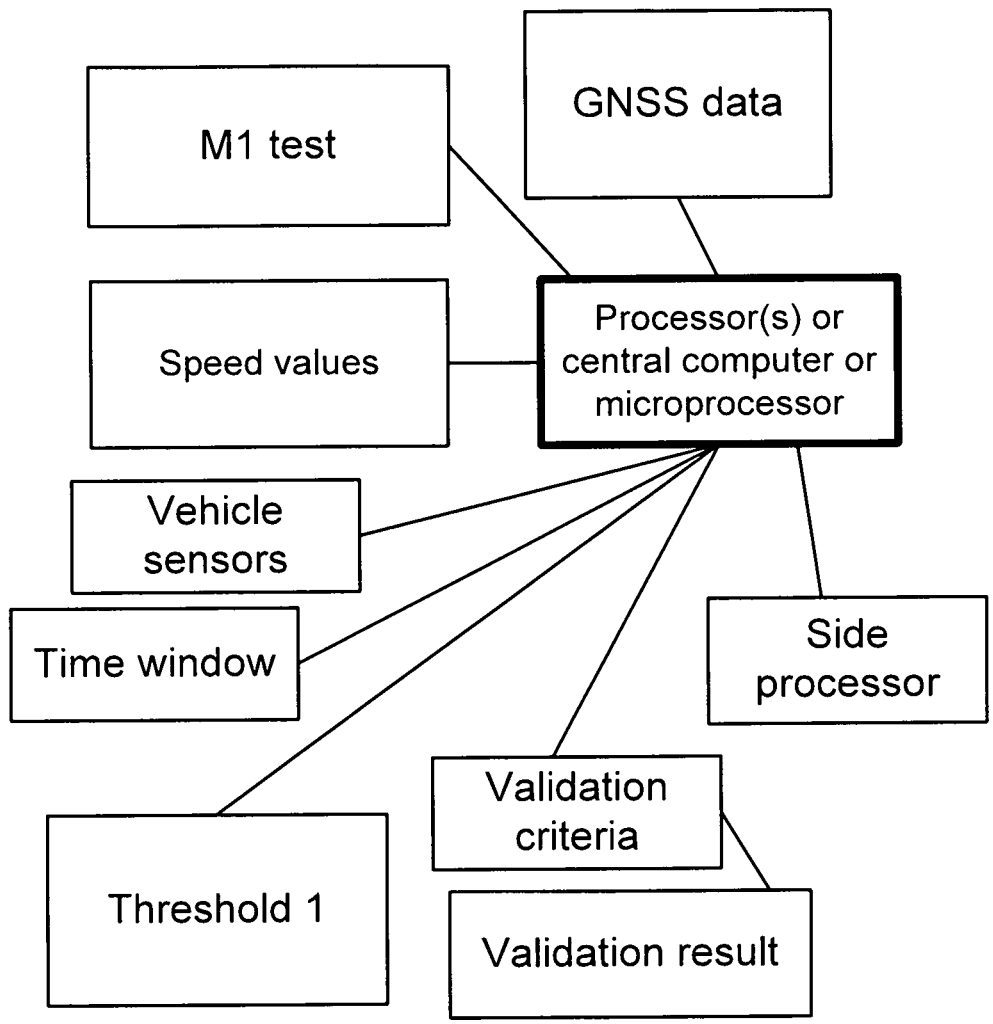
FIG. 60 is for one embodiment of the invention, for a system for filter for V2X technology.
Figure 61:
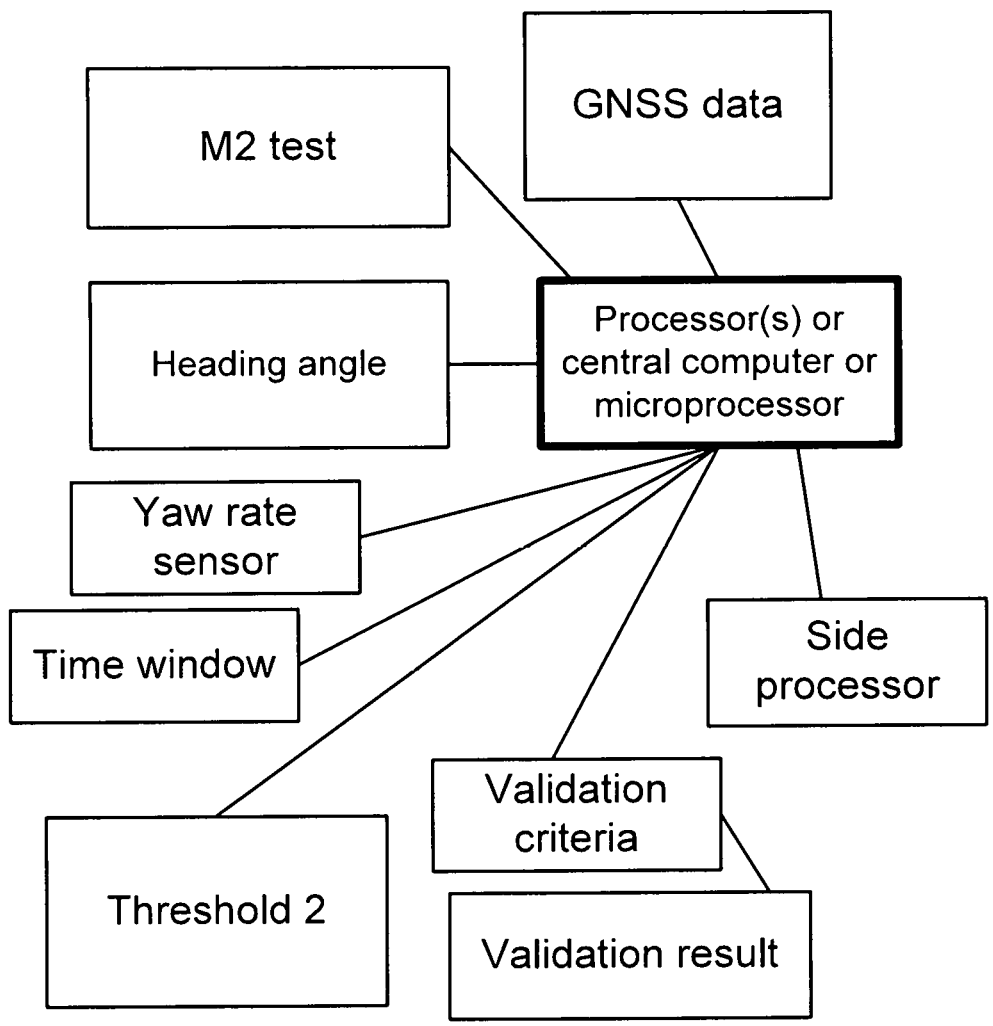
FIG. 61 is for one embodiment of the invention, for a system for filter for V2X technology.
Figure 62:
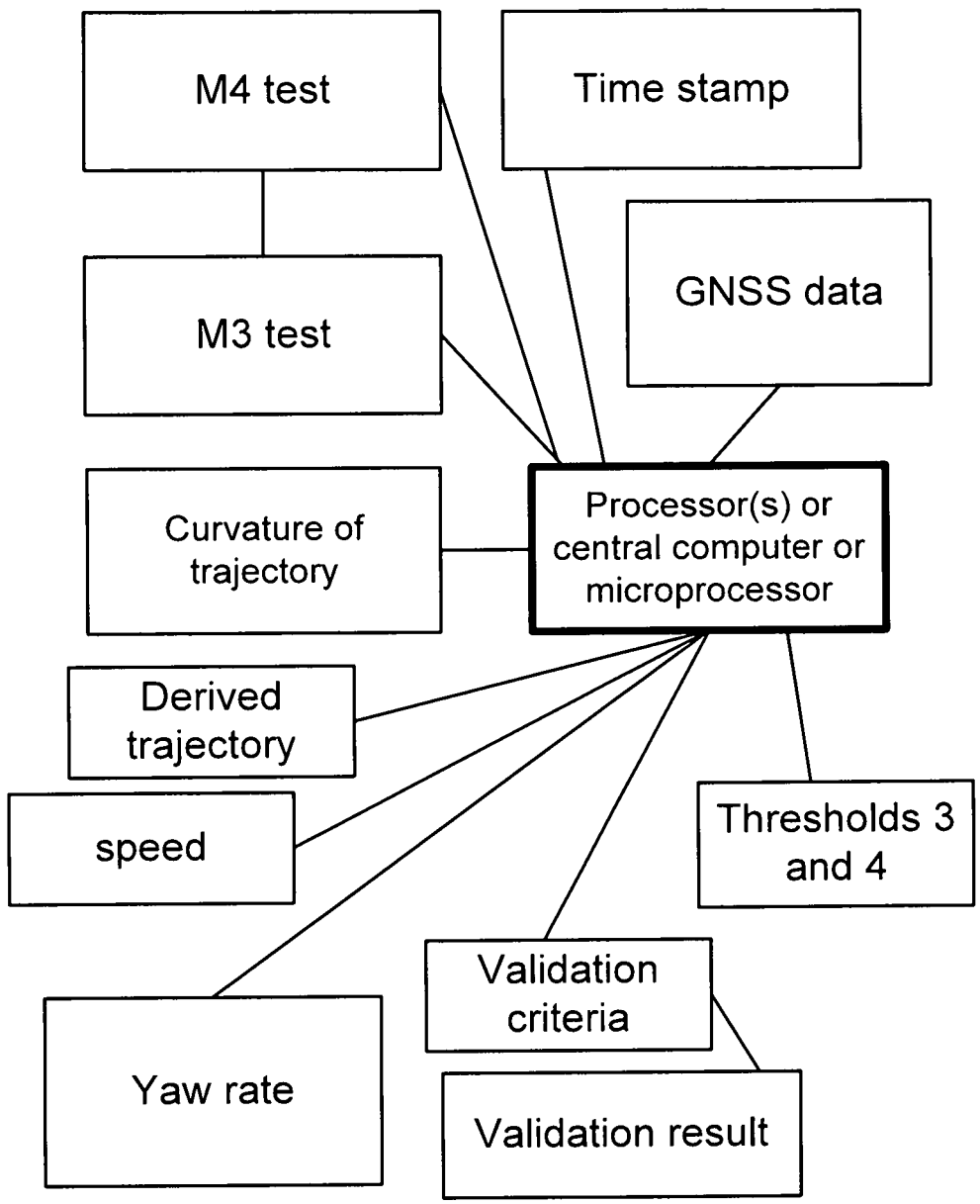
FIG. 62 is for one embodiment of the invention, for a system for filter for V2X technology.
Figure 63:
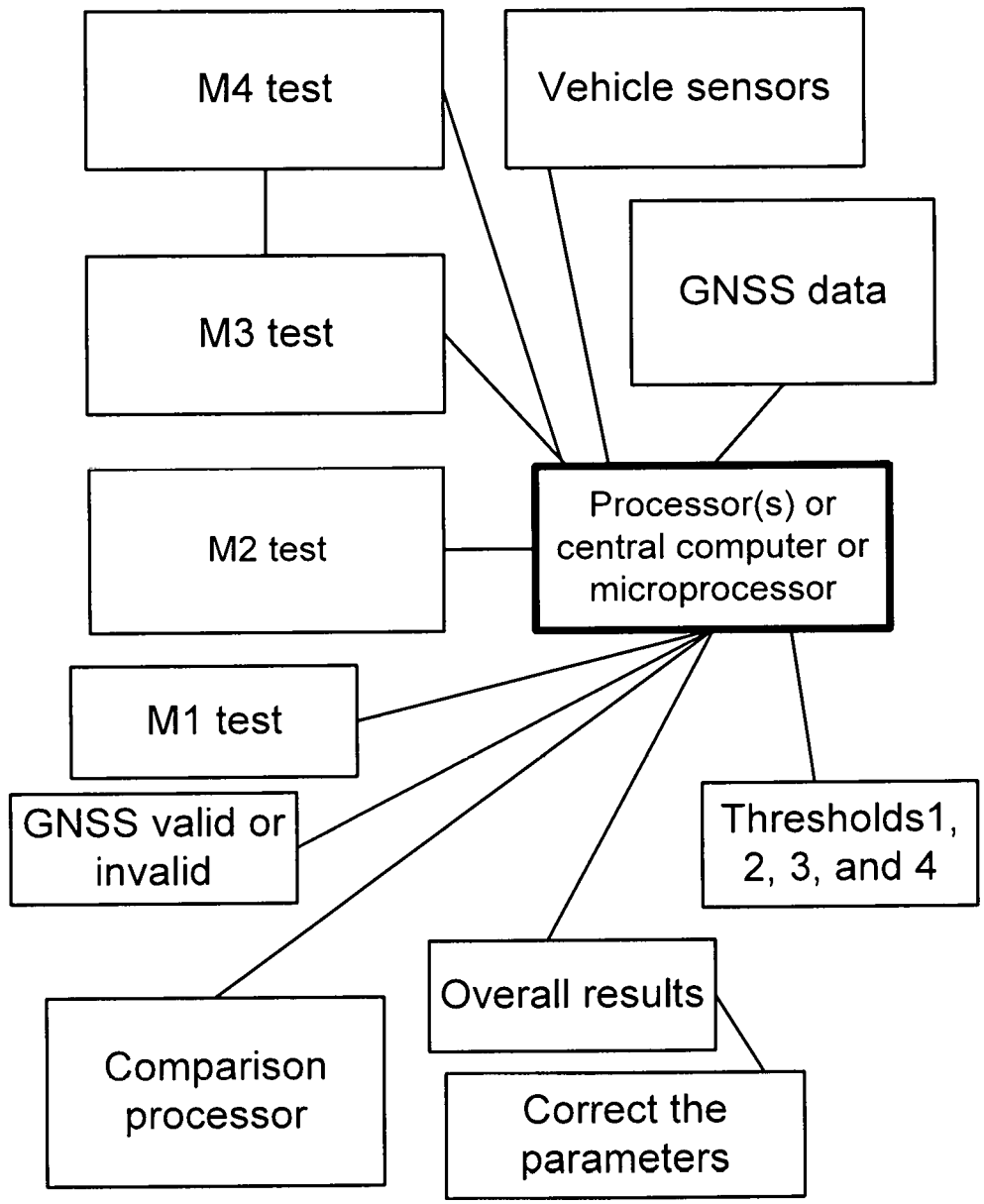
FIG. 63 is for one embodiment of the invention, for a system for filter for V2X technology.
Figure 64:
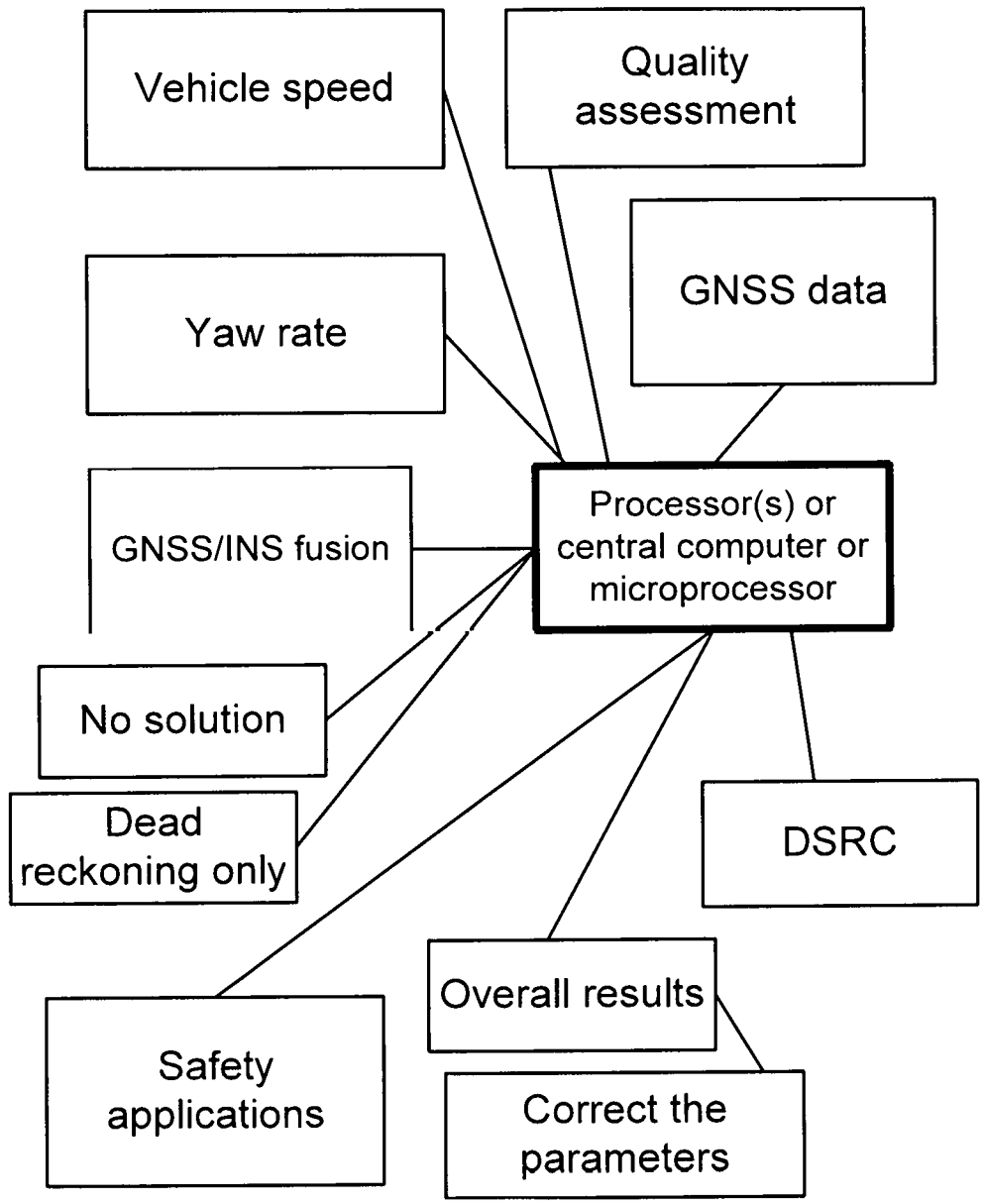
FIG. 64 is for one embodiment of the invention, for a system for filter for V2X technology.
Figure 65:
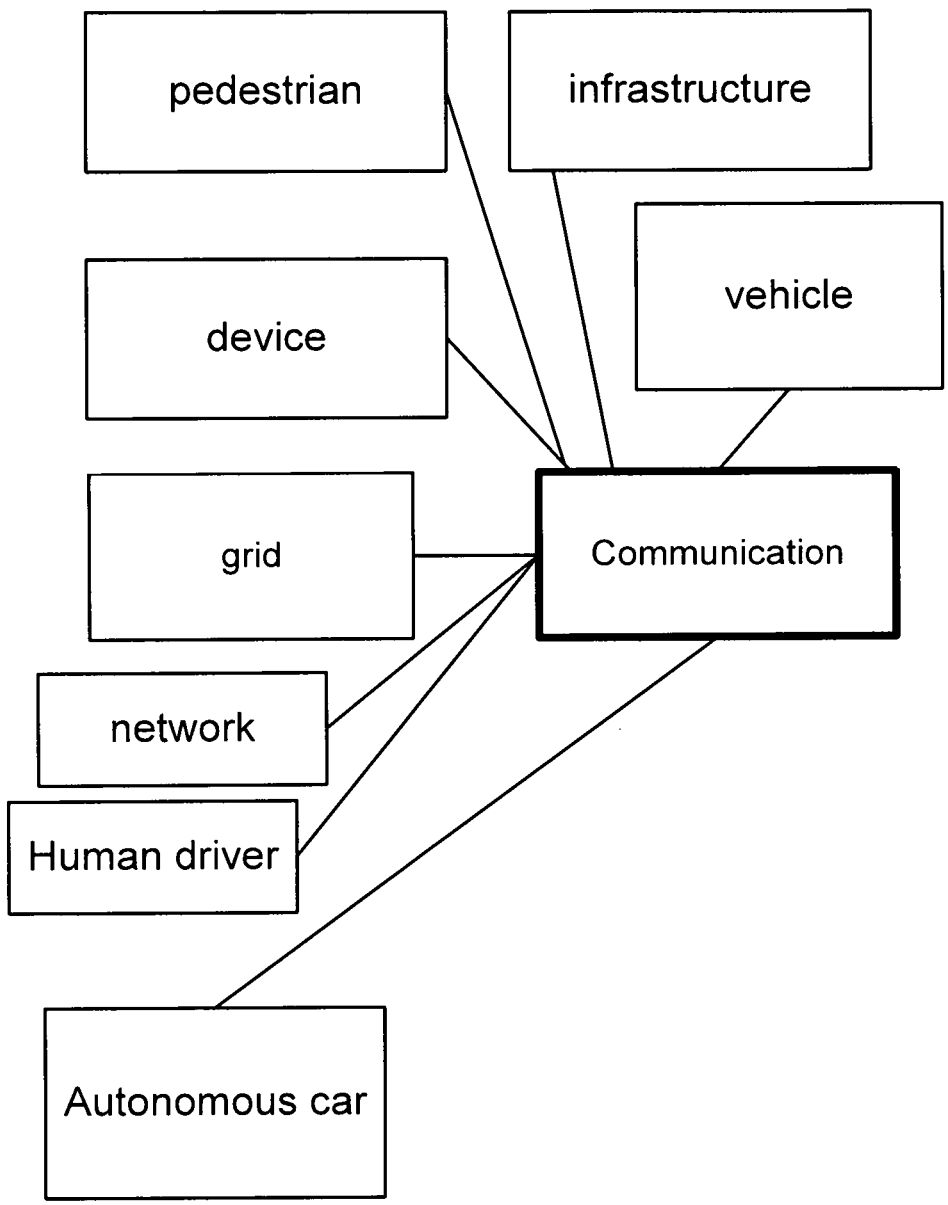
FIG. 65 is for one embodiment of the invention, for a system for filter for V2X technology.
Figure 66:
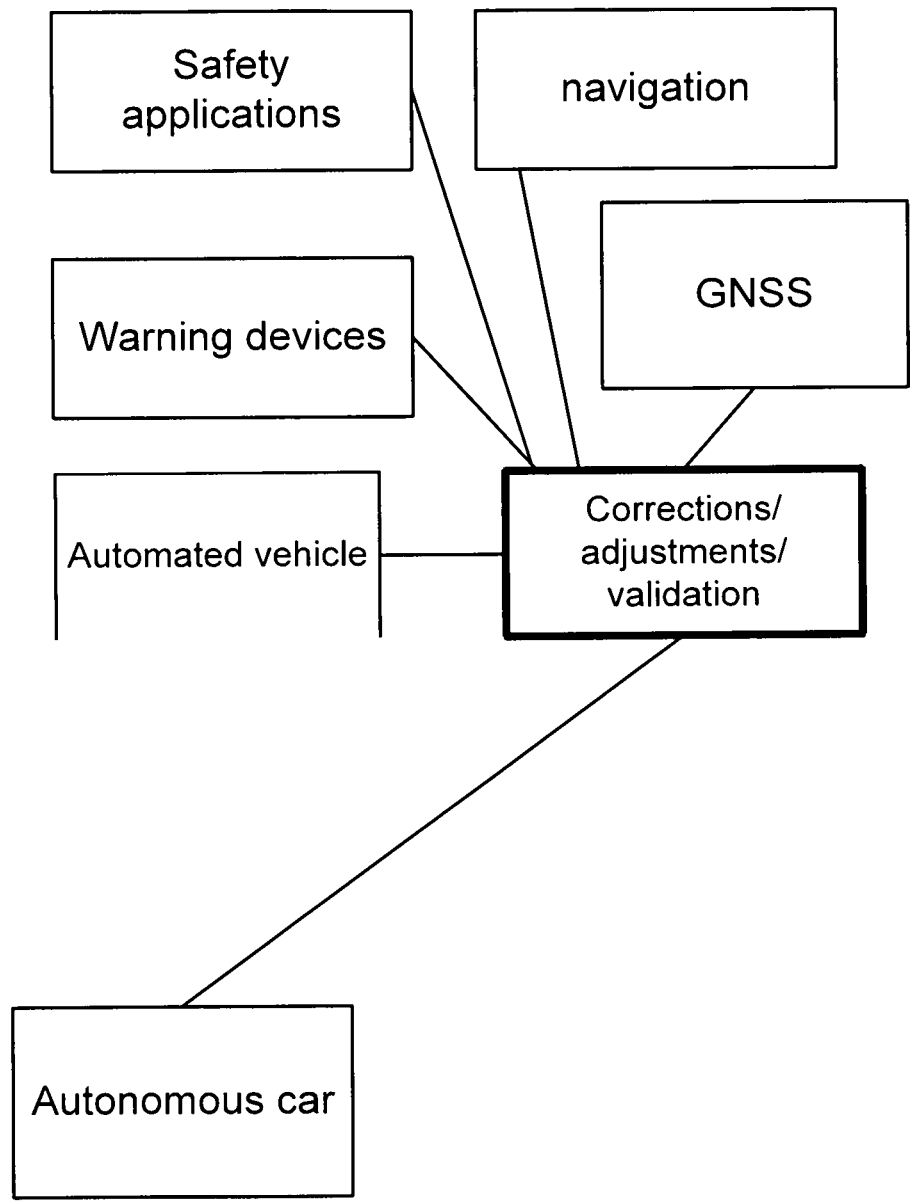
FIG. 66 is for one embodiment of the invention, for a system for filter for V2X technology.

Here are the components and their variations for the invention, for the system and method for positioning quality filter for the V2X technologies: FIG. 57 is for one embodiment of the invention, for a flow chart of the method. FIG. 58 is for one embodiment of the invention, for a flow chart of the method. FIG. 59 is for one embodiment of the invention, for a system for filter for V2X technology. FIG. 60 is for one embodiment of the invention, for a system for filter for V2X technology. FIG. 61 is for one embodiment of the invention, for a system for filter for V2X technology. FIG. 62 is for one embodiment of the invention, for a system for filter for V2X technology. FIG. 63 is for one embodiment of the invention, for a system for filter for V2X technology. FIG. 64 is for one embodiment of the invention, for a system for filter for V2X technology. FIG. 65 is for one embodiment of the invention, for a system for filter for V2X technology. FIG. 66 is for one embodiment of the invention, for a system for filter for V2X technology.

From Prior Teachings:

The teachings of the parent cases, "Methods of tracking pedestrian heading angle using smart phones data for pedestrian safety applications" and "System and method for creating, storing, and updating local dynamic MAP database with safety attribute", are included here, as well:

Here, we describe some of the embodiments of our system and method:

Let's look at the details of one method:

MAP Generation:

MAP Generation based on vehicle data, included in Basic Safety Message (BSM) or equivalent message(s).

a. Listen to all the BSMs transmitted in the given region, and based on what is the intended region of map, filter out the BSM data which falls outside this region. The intended region of map can also be defined adaptively, using the speed profiles data in each road segment of interest. For example, a high average speed road segment will require more map coverage than a low average speed road segment.

b. Store location (concise), Heading, Speed, and time-stamp of each of the BSM.

If the vehicle provides PH (Path History or trajectory or breadcrumb trail points) (concise points), check the accuracy/confidence of the PH points. In case the accuracy is good (say better than e.g. 0.4 m (or meter)), store them instead of actual locations reported by the vehicle.

For example, from the current location and velocity, we can calculate the next point in time, or we can extrapolate the next point, based on the last N points. For example, one can assume a line or higher order curves, or polynomials of degree M, to fit the points in the formula and get the coefficients. Once the coefficients are known, the next point can be extrapolated.

For example, the accuracy can be measured from the distance of a given point to the line or curve of trajectory.

For an embodiment, the accuracy threshold is a fixed number or distance.

For an embodiment, the accuracy threshold is a variable number or distance. That can be dependent on the velocity of the vehicle. For example, the higher the velocity, the higher the threshold, e.g., with a linear relationship.

Otherwise, use the location details provided by the vehicle and generate the PH (Concise) points for the vehicle, and store these values.

c. Start generating a Temporary Map, once the stored data has sufficient number of vehicles, Q (say, e.g., 1000 vehicles), or for example, length of time for monitoring, T, as a threshold, e.g., one-week worth of data, to make sure we have enough data points for our analysis and determination. In one embodiment, we can use any logical combination of thresholds or conditions on Q and T, e.g., using AND or OR.

Here are the steps of one embodiment of our method: (see FIG. 27)

Step 1: Generating Lanes: (see FIGS. 18-19)

Assign equal weights for all the paths at the start, as the initialization step.

Combine the Paths (or parts of paths) which have a separation distance of lesser than a fraction of a lane width, say, e.g., ¼th of the Lane width, or e.g., 0.5 meter, as the threshold for this step, to indicate that those are in fact the same. The weight of the resultant path is calculated using the combined statistic method similar to the one used in Kalman filtering.

e.g., Resultant Weight:

$$(w\_r) == 1/sqrt[((1/w1)^2 * (1/w2)^2)/((1/w1)^2 + (1/w2)^2)]$$

Where sqrt is the square root function, w1 is the weight of the first path, and w2 is the weight of the second path.

Another method is to use the first order statistical combination.

Then, we have:

$$w\_r = 1/(((1/w1)*(1/w2))/((1/w1)+(1/w2)))$$

In general, we have as a function (F) of w1 and w2:

$$w\_r = F(w1, w2)$$

First, combine the paths which start and end with the same heading angles.

Second, combine the parts of paths of the vehicles which have the same headings in that part.

For the combined paths which are headed in the same direction, update the weights (using the above formula) of the paths (or parts of the paths).

Detect Lane changes in the captured/stored data, and discard that data (either part or full info from that vehicle). Different methods of detecting lane changes have been proposed in previous inventions (see the parent applications). Any of those methods can be used here for the detection of lane changes.

In addition, the statistical Median operation can be also used to filter outliers in positions and paths. It also can help for the lane change detection.

In one embodiment, generally, the outliers may be bad data points, and cannot be relied on. So, we filter them out. In one embodiment, assuming the normal distribution, if any data point is beyond 2 standard deviations, from the peak, it is considered as the outlier point, and gets discarded.

In one embodiment, a vehicle is monitored from its center, as a point, for tracking purposes.

In one embodiment, a vehicle is monitored from the middle front point and the middle back point, as 2 points, for tracking purposes. So, for example, if one point (e.g. the front point) is in one lane and the other point is in another lane, that may indicate transition between lanes or changing lanes, if the difference is above a threshold, which is measured with respect to the distance perpendicular to the lane direction, or with respect to the angle relative to the lane direction.

Step 2: Determining Intersection Region and Splitting the lanes: (see FIGS. 20-23)

Intersection Diamond region can be identified from the above data in the following ways: (see FIG. 28)
1. Using Speed profiles of the vehicles.
2. Using Heading angles of the vehicles.
3. Using Intersection of Lanes (generated from Vehicle Travel paths).

Now, let's look at different methods in details:

Method 1: Using Speed Profiles of the vehicles: (see FIGS. 20-22)

For each of the lanes, consider the stop location of all the vehicles traversing on that lane.

Of these locations, discard the locations where the vehicle stays for lesser than a short time period $t_1$, say e.g. 5 sec. (As these could have been recorded due to vehicle slow motion, and would not have the time for GPS stabilization. So, they should be discarded.)

Of all these locations, using statistical methods, e.g. using standard-deviation method, neglect the outliers (e.g. 5% outliers), or e.g., discard the tail of the probability distribution on either side, as e.g., extreme cases or unreliable cases.

Consider vehicle travel direction on the road (based on locations and timestamps), and pick up the location which comes farthest and toward the exiting end of the lane, as $P_{far}$.

Pick up all the locations which lay within distance $L_2$ of $P_{far}$, say e.g. within 7 m of the selected location, or $A_3$. Calculate the percentage of vehicles in this circle or region. If the percentage of vehicles in this circle or region is below $S_1$, say e.g. 7% of the total vehicle locations on this lane, then discard the selected location and reconsider above step for selecting a location.

If Vehicle lengths are known, use them, as $L_3$, else use $L_{default}$, e.g. 5 m, as typical length, and then calculate the average of vehicle lengths. (We can eliminate this step and use 5 m, directly, if required, or if not enough data is available from the vehicles.)

Construct average of locations based on average of GPS location of all vehicles which fall within area $A_3$, or the 7 m radius of the selected location.

Calculate the GPS location of the point which falls ahead of the above average-of-locations, at a distance of a fraction of the typical vehicle length, or $S_2$, e.g. half (or 55 percent) of average vehicle length.

The GPS location of each of the lanes, constructed based on the above steps, provides the outer edge of the Intersection Diamond region.

This applies on other road segment of interest, that show queue of vehicles stopped, with profile history of coming to stop. Another way to look at it is to detect an area where there is no stopped vehicle position density. (This is the intersection diamond region.)

Method 2: Using Heading angles:

Consider all the vehicles which are traversing on each of the lanes.

Of the vehicles traversing on each lane, select the vehicles which have executed a change in the Heading angle (by more than $\alpha_1$, e.g. 20°), where some of the other vehicles near to that location were traveling straight.

Of all the above selected vehicles, select the location where they executed this change.

Of all these locations, discard the outliers which fall outside of e.g. 5% of the statistical limit, or tail of the distribution curve, as anomalies or outliers.

Calculate the average of these remaining locations. This average location provides the lane boundary of the selected lane.

In one embodiment, the average is based on average of X and Y coordinates, on 2-D coordinates.

In one embodiment, the average is based on weighted average of X and Y coordinates, emphasizing some data over the others. For example, one can have more weights for more reliable data.

The GPS location of each of the lanes, constructed based on the above steps, provides the outer edge of the Intersection Diamond region.

Method 3: Using Intersection of Lanes (generated from Vehicle Travel paths): (see FIG. 23)

For each of the lanes which differ in heading angle by more than angle $\alpha_3$, say e.g. 30°, construct the Intersection point of the lines (lanes).

In one embodiment, angle $\alpha_3$ can be adjusted based on historical data, as a threshold value.

In one embodiment, angle $\alpha_3$ can be randomly selected from the range of 25° to 350°

Construct a convex polygon using these points (or a subset of them) which can cover all the points.

In one embodiment, for a subset of points, choose every other point.

In one embodiment, for a subset of points, choose one point out of every 3 points.

In one embodiment, for a subset of points, choose one point out of every N points. (N is an integer above 3.)

In one embodiment, to define a convex polygon using these points, we look at the current side and 2 previous sides of the polygon, labeled $P_1$, $P_2$, and $P_3$, respectively, as vectors. The difference between the directions of vectors ($P_1$ and $P_2$) and ($P_2$ and $P_3$) are angles $\alpha_4$ and $\alpha_5$, respectively. If both angles $\alpha_4$ and $\alpha_5$ are in the same directions (e.g. both tilted clockwise, with respect to the previous vector), then the resulting polygon is a convex one.

Expand the Convex polygon by adding a certain amount of width, e.g. a fraction ($g_1$) of the lane width (say e.g. half of the lane width) on each of the sides.

Split the lanes, based on the intersection region polygon.

Step 3: Determining Lane type (Ingress/Egress): (see FIG. 24)

We use the following methods:

Method 1: Using difference in angle in Vehicle heading and Lane-Heading (Waypoint0):

For each of the lanes, calculate the angle of Waypoint0 (w.r.t. Waypoint1).

Calculate the difference in heading of Waypoint0 and Heading of vehicle ($\alpha_6$).

If the Difference $\alpha_6$ falls between say, e.g., ([0°-90°] U [270°-360°]), as the union of sets or ranges of angles (or the angle locating in the union of the first and fourth quadrants in the 2-D coordinate system), then given lane is an Egress lane, else (otherwise), it is an Ingress lane.

Based on the vehicles heading angle at the 1st waypoint (closest to intersection region), we decide on whether the Lane is an Ingress or Egress.

Method 2: Based on vehicle movement inside the Lane:
Using the location of vehicle and its corresponding timestamp, determine whether Vehicle is approaching Waypoint0, or leaving.

Step 4: Determining Approach Set for each of the lanes: (see FIG. 25)
Combine the (incoming/outgoing) lanes which fall on one side of the polygon and have either same (or) exactly opposite heading angle (diff. approximately 180°).

Step 5: Determining connected Lanes: (see FIG. 26)
For each of the Ingress lanes, observe the movement (mapping of incoming lanes to outgoing lanes) of each of the vehicles in that lane.
Create a Mapping list for the selected Ingress lane, and count the vehicles traversing each of these connections.
Discard the outliers (connections) where the vehicles traverse less than e.g. 5% of the total vehicles in that lane.
Using relative heading angle between the Ingress lane and Connecting-Egress lane ($\alpha_7$), determine whether a Left/Right/Straight (L/R/S) maneuver is required to enter the connecting-Egress lane.
In one embodiment, we compare the angle $\alpha_7$ with a threshold angle $\alpha_8$. If absolute value of $\alpha_7$ is smaller than or equal to $\alpha_8$, then we call it Straight. If absolute value of $\alpha_7$ is bigger than $\alpha_8$, then, e.g.:
For positive $\alpha_7$ values, we call it Right.
For negative $\alpha_7$ values, we call it Left.

Step 6: Determining Movement states for each Ingress lane:
For each of the Ingress lanes, based on the Connected-Egress lane's Maneuver code, determine the Movement state. Say, for example, the possible connection maneuvers are Left-Turn (LT), Straight (S), and then the Movement states are: LT movement, S movement.

Figure 40:
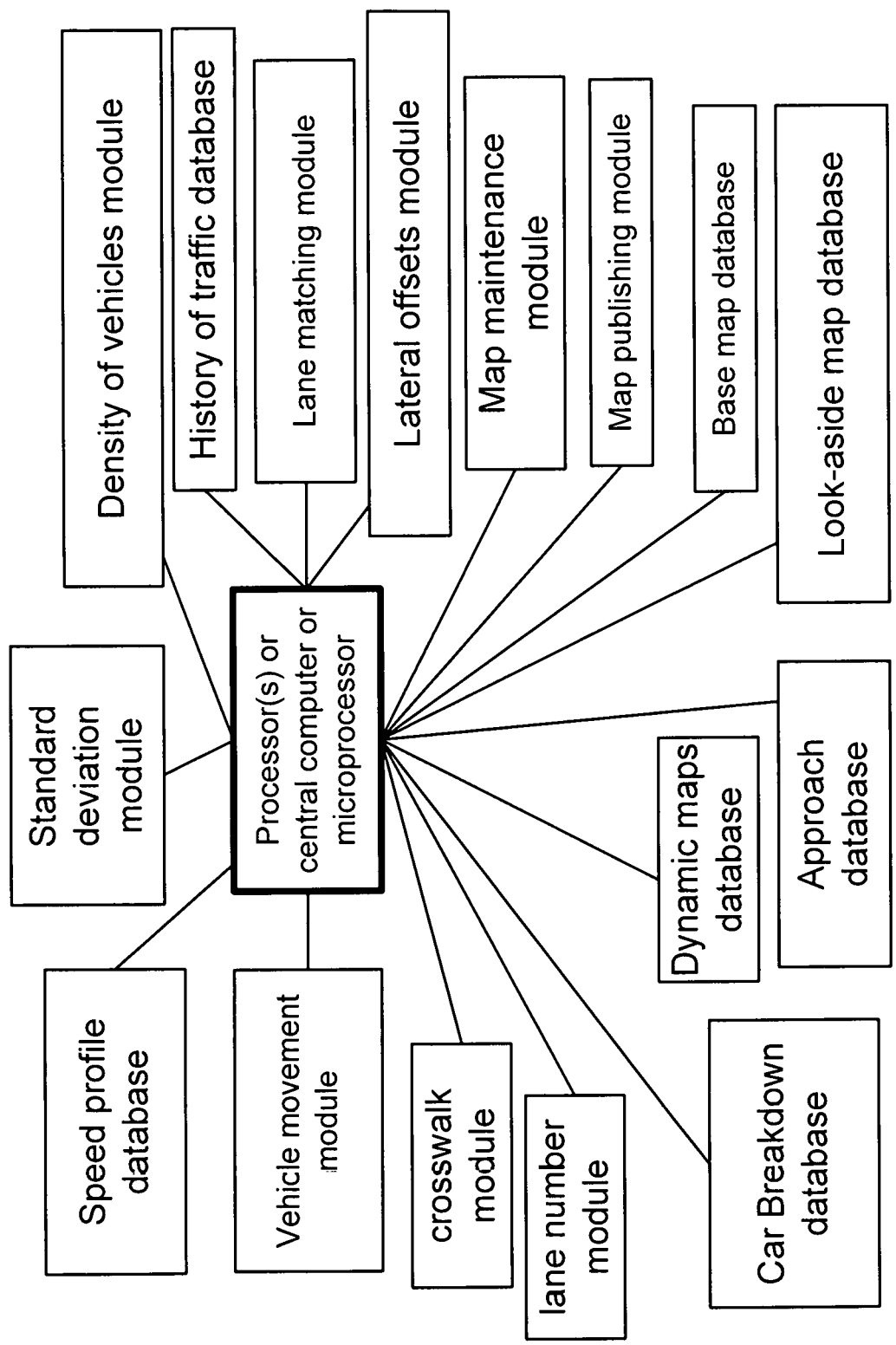
FIG. 40 is for one embodiment of the invention, for a system of creating, storing, and updating local dynamic MAP database with safety attribute.

MAP Generation:
Improvement to above described method in steps 1-6 with an additional Signal Data available from Traffic controller. (see FIG. 40)
The Idea in this method is to match Traffic controller's signal-phase data with vehicles' motion in each of the lanes and determine the signal phase for each of the Lane/Approach. Here is how it works:
Continuously poll Traffic-controller for the Signal status information.
When Traffic-controller is stating a particular phase number for the first time, during next short period of time, $t_2$, e.g. 1-5 seconds, identify the lanes in which vehicles started moving from a halt.
Of these lanes, identify the direction of travel of the vehicles in each ingress lane towards their egress lanes, and determine the Phase-number for that lane corresponding to that Movement state.
For each of the Signal-phase mapped to the Ingress lane, count the number of vehicles using that phase to cross the Diamond region, $N_1$.
Eliminate the Outlier, e.g. 5% of the phases (if any), or the tail of the distribution, from the above list of phases for each of the Ingress lanes, resulting in a smaller number ($N_2$).

MAP Maintenance:
Based on BSM messages(s) or equivalent vehicle message. (see FIG. 40)
Removal of (or repair work in) a Lane: When the density of the vehicles in a particular lane drops off drastically (e.g., more than a percentage or ratio of the original number, e.g., more than $N_3$ percentage), and adjoining lane increases in a similar manner (e.g., more than a percentage or ratio of the original number, e.g., more than $N_4$ percentage).
A vehicle breakdown is detected in that lane. (Or)
The lane is temporarily closed. (Or)
The lane is permanently closed. (Or)
A detour is assigned for that lane. (Or)
There is an accident in that lane. (Or)
Almost all the vehicles in that lane have been detected to do a lane change to adjacent lane(s) before a certain point (coordinates X, Y in 2D space). (Or)
No vehicles were detected in that lane over a period of time, $t_3$, e.g. 2 hours, while on a similar time frame over a past couple of days, or $N_{past}$ past number of days, we had a greater number of vehicles using that lane, percentage-wise with respect to all vehicles on the road, or using an absolute number, e.g., Nab, e.g. 50.
The exception is for holidays and weekends, which have different traffic patterns. So, we do not include them for comparison with weekdays. So, for comparison, we have different classes, e.g.: working day class, weekend class, and holiday class, which correspond to different days and traffic patterns and human behaviors.
For example, during weekends, at 6 am, the lanes may be empty or almost empty, but there is no accident or broken down car in any lane. So, it cannot be compared with a period of rush-hour at 6 am during weekdays/work days. So, each class should be compared within/with itself.
For example, during different seasons, e.g. winter, the ice and snow may slow down the cars. Thus, those days cannot be good base of comparison for a sunny day in Summer. So, they constitute a new class of days with different traffic patterns and behavior. So, they should be compared with similar days with similar situations/classes.
Removal of (or repair work in) an Approach: When, e.g., the density of the vehicles in a particular approach road decreases.
For example, a major pileup (breakdown in multiple/all lanes) has been detected.
For example, the road is closed and a detour is assigned.
No vehicles were detected in that lane over a period of time, while the same time previous days had a considerable number of vehicles passing through that approach.
One can specify the previous number of days, N.
One can specify the number of hours or window of hours, e.g., from 12:00 to 16:00, or from 12 noon to 4 pm, for monitoring the traffic.
One can specify the considerable number of vehicles (as a threshold), or number of cars in general, as the absolute number or ratio of numbers or percentage of total, e.g., 50 cars, or 50 cars/hour, or 5 times more cars than yesterday for the same time period, or 50 percent more cars than yesterday for the same window of time or rush hours, or 1.2 times more cars than 2 hours ago, or 50 more cars than 2 hours ago, or 50 cars/minute more cars than 2 hours ago (as the rate comparison), or 50 percent more cars/minute than 2 hours ago (as the rate comparison), or 1.2 times more cars/minute than 2 hours ago (as the rate comparison).

The season, holidays, weekends, weather-related events, and work days are considered, to define different classes of the days, hours, traffic patterns, or human behavior, for comparison purposes, as the base line, or find anomaly, or find road condition, or determine traffic status, or prepare maps, or modify maps.

Historical data can be accumulated for a region or specific road to get the patterns for traffic or behavior, e.g., to predict the future or scale the results or numbers for a specific condition. For example, for rainy days, the speeds are reduced by a factor of 30 percent.

For different roads, one can define different classes, for which the same pattern is observed, or there is a common parameter or property. For example, the 4-lane interstate highways, near a major city, may show a similar traffic pattern or traffic jams, or they may have same general traffic speed. So, we define a class for these highways, which historically or statistically behave similarly, in one or more aspects or parameters. Then, for a given class member, if we get a data for a specific time/day, e.g., for speed of vehicles, and e.g., it shows 20 percent lower speed with respect to 1 hour ago, then one can assume the same for other members of the same class for the same time period, which is useful to estimate the speed for other highways, or make the data analysis faster, even if we have no data or incomplete data from other members of class (other highways of the same class), which probably gives us a reasonable starting point or base line or data point, especially in the absence of data or reliable data from other highways of the same class.

Updating Waypoints of a Lane: When vehicle-Matching is either continuously failing or having a correction values above e.g. 20 cm, or a threshold distance, D. Note that D can be defined based on a fraction of lane width or average car length, or percentage or ratio of those parameters.

Do a Lane-matching for all the vehicles traversing in the Mapped region.

For each of the Lane, calculate the average lateral-offset values each of the vehicles is having in each segment of the Lane.

If the lateral offsets are greater than, $D_w$, e.g. 20 cm, for particular contiguous waypoints, add additional waypoints in between the existing waypoints, based on average location or X-Y 2D coordinates (discarding outliers, e.g. 5 percent outliers, anomalies, or tails of distribution curve) of recent-vehicles traversing in that lane-segment, e.g. recent 15 minutes or 1 hour.

In one embodiment, $D_w$ is defined e.g. based on lane width or average vehicle length or width.

MAP Maintenance:

Improvement to above method with additional Signal Data available from Traffic Controller. (see FIG. 40)

Keep a continuous monitor on the Vehicle traversals using each of the Signal phases.

Verify if the existing Matching of the Signal-Phases and the Vehicle motions in each of the active lanes are still valid.

Neglect the outlier in the matching, e.g. the 5 percent extremes, but if the matching provides a consistent "inconsistencies" in the matchings, update the Signal-Phase and Lane-Movement states matching.

MAP Publishing, Storing, and Updating Mechanisms: Broadcasting MAP information. (see FIG. 40)

Each of the RSE/Remote-Server would have 2 MAPS for each location, namely, Base-Map and Look-aside (Current-status) MAP.

Case 1: No Base map is available (initial condition):

For a Look-aside MAP, once the MAP has sufficient number of vehicle (say e.g. 100) traversals on each of its lanes, consider it for further calculations.

Once the above limit is reached, execute a Map-matching of vehicles with Look-aside MAP, and determine the match percentage or ratio. Average the matching percentage for all the vehicles.

If the Match-percentage is high (say e.g. above 99%), upgrade the Look-aside database at that instant to Base-MAP.

Case 2: Base Map is available (updating condition):

Compare the Base Map with Look-aside MAP for following differences:

Lateral distance shifts in the Waypoints of the lane:
Ignore them if the shift is less than $D_s$, e.g. 20 cm, or a threshold distance.
In one embodiment, $D_s$ is defined e.g. based on lane width or average vehicle length or width, or based on $D_w$. For example, $D_s$ is set equal to $D_w$.
In one embodiment, $D_s$ is adjusted based on historical data, or corrected by human expert periodically.

Connection lane changes: Changes in possible maneuver codes of the lane and the connected lane lists.

Change in Signal-Phase matching.

In case the changes in the Base-Map and Look-aside Map are considerable (above a threshold), and base Map is failing to provide high-Map-matching results, while Look-aside MAP is able to provide high MAP-Matching results, consider upgrading Look-aside MAP in the following criteria:

Manual override is detected for upgrading existing Look-aside MAP.

The difference is seen consistently for more than e.g. a Day, or a specific time period $T_C$, and there are sufficient numbers of vehicles, $N_V$ (say e.g. 1000), in each of the lanes, for proper statistics and analysis. Cherry pick these differences and update them in Base-Map.

Decreasing Computations and Increasing Confidence in MAP-Generations: (See FIG. 40)

Some minimal information, when available, could be manually fed to the system allowing the system to identify vehicle movements accurately and generate better results, in a shorter time period. For example:

Approach Count, and Approach names

Lane numbers in each Approach and Lane-widths

Cross-Walks

Traffic controller-information (to which system to poll and get results)

Approximate intersection-Diamond region dimensions, or average/typical of those dimensions from other locations Safety Consideration:

Detecting an idle vehicle (or Breakdown vehicle or accident vehicle or a closed lane) and share the location of this vehicle with other vehicles make this concept of map extend, to have a safety attribute.

Figure 18:
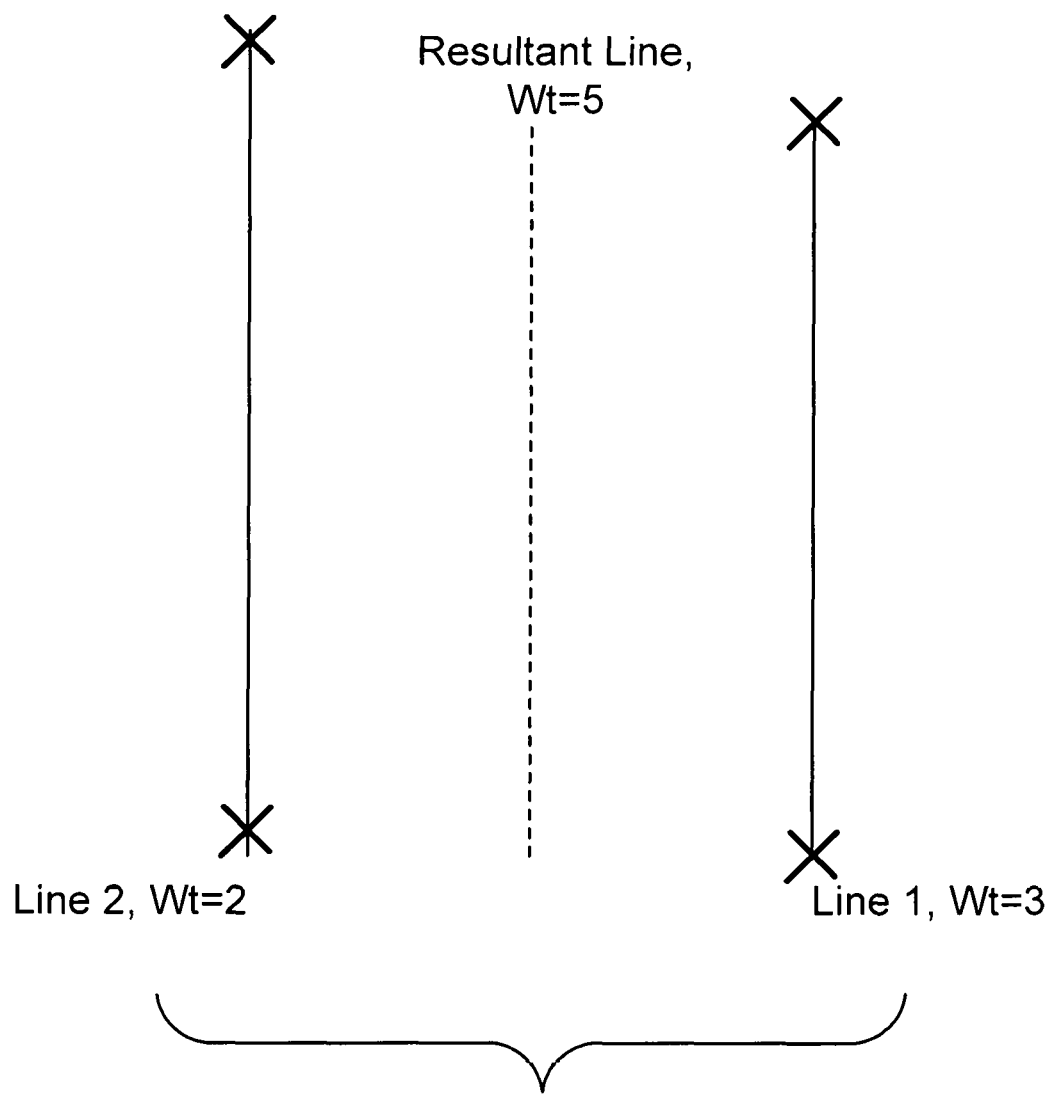
FIG. 18 is for one embodiment of the invention, for step 1, generating lanes.
Figure 19:
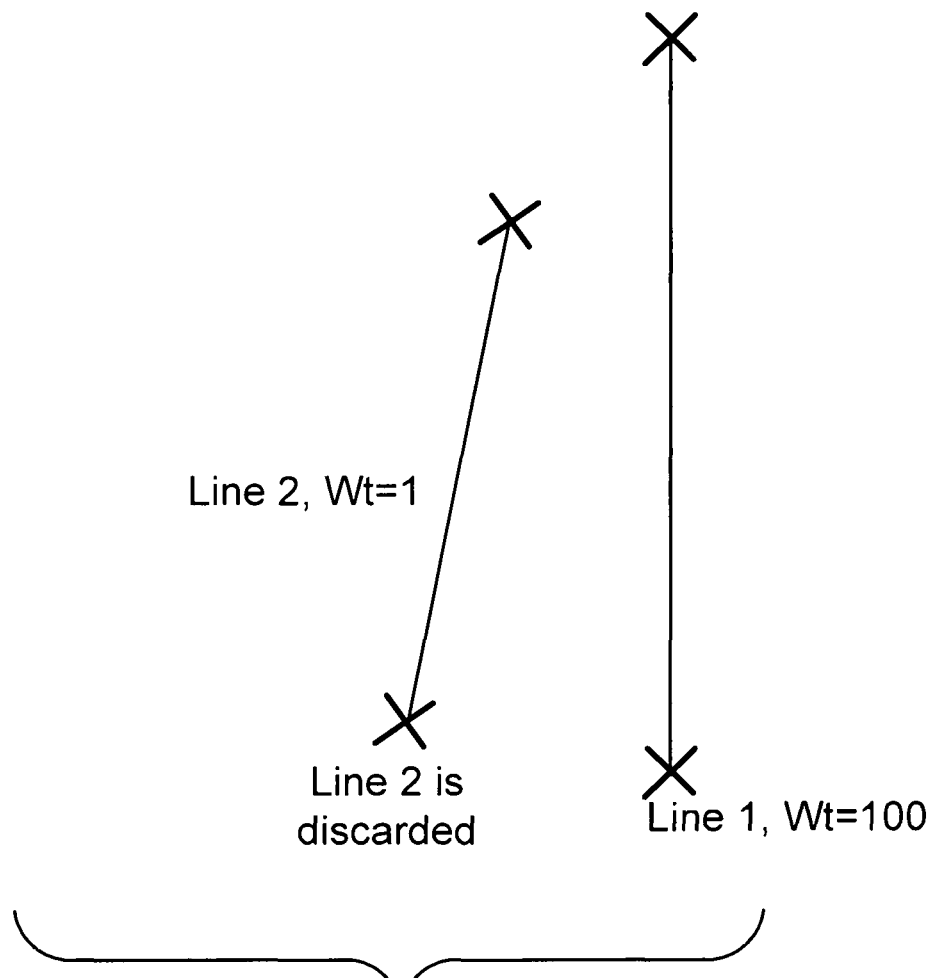
FIG. 19 is for one embodiment of the invention, for step 1, generating lanes.
Figure 20:
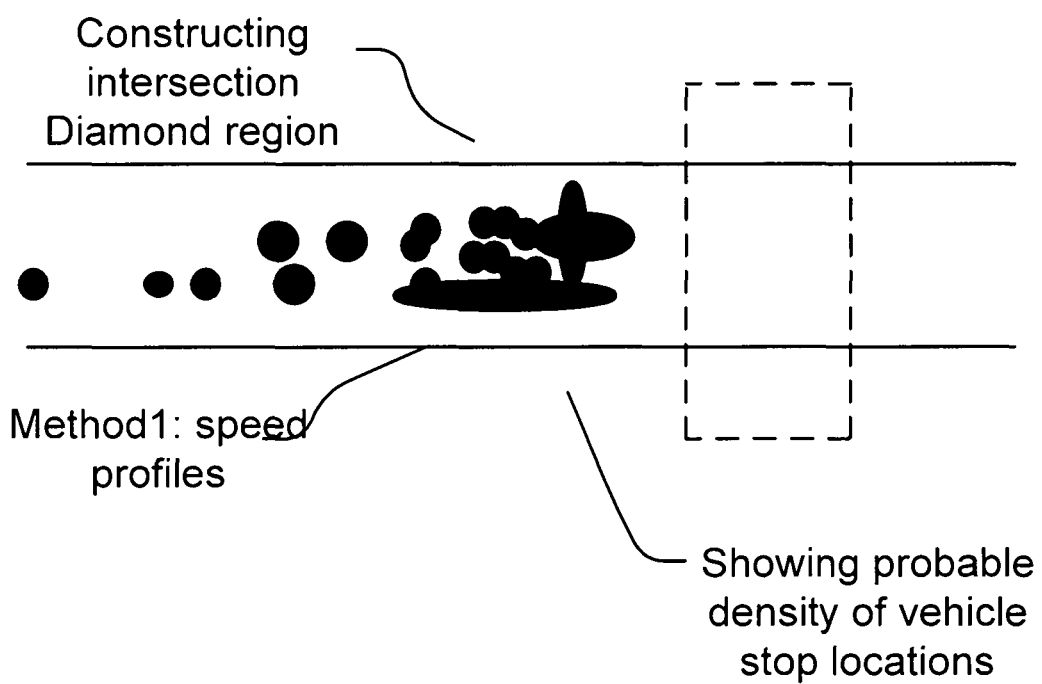
FIG. 20 is for one embodiment of the invention, for step 2, Method 1, constructing Intersection (INTX) Diamond Region.
Figure 21:
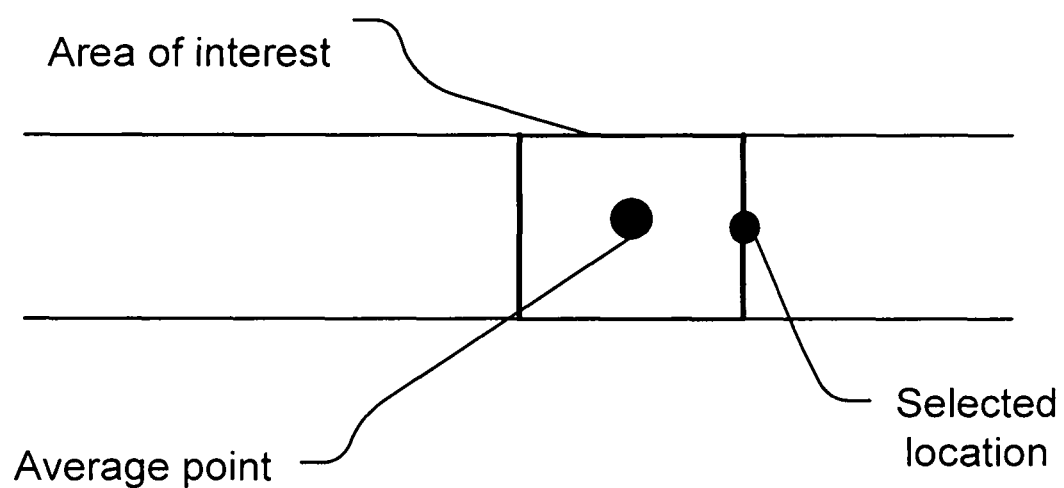
FIG. 21 is for one embodiment of the invention, for step 2, Method 1, constructing INTX Diamond Region.
Figure 22:
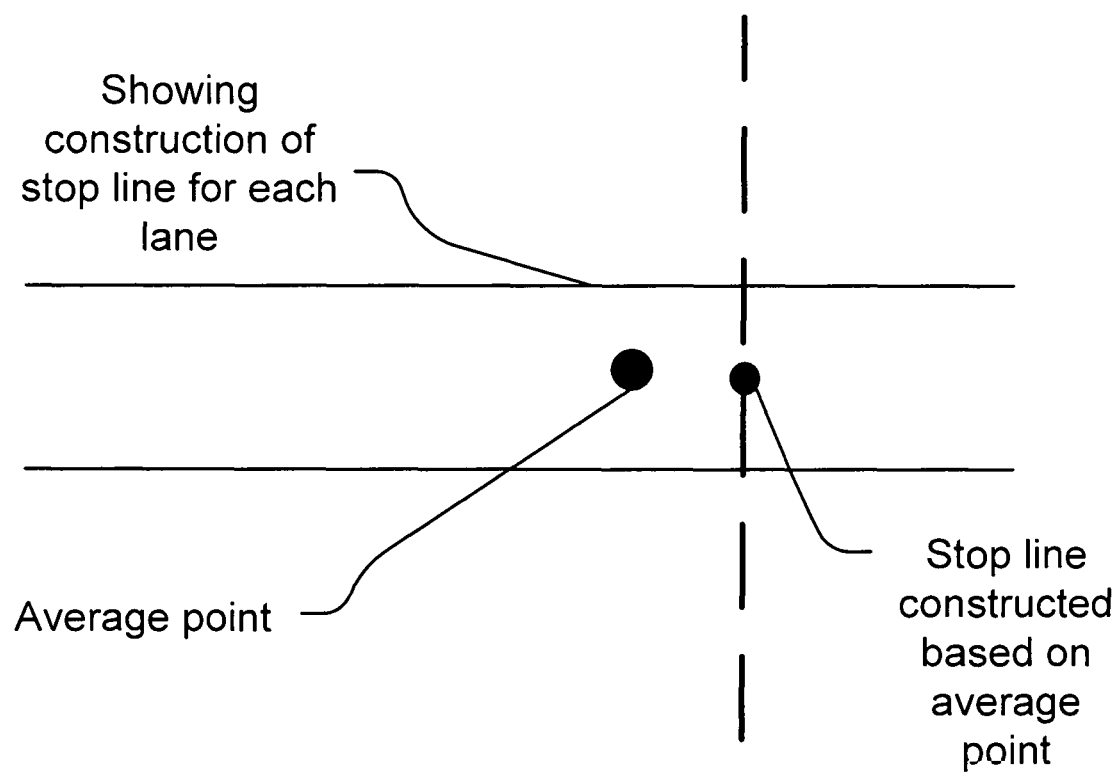
FIG. 22 is for one embodiment of the invention, for step 2, Method 1, constructing INTX Diamond Region.
Figure 23:
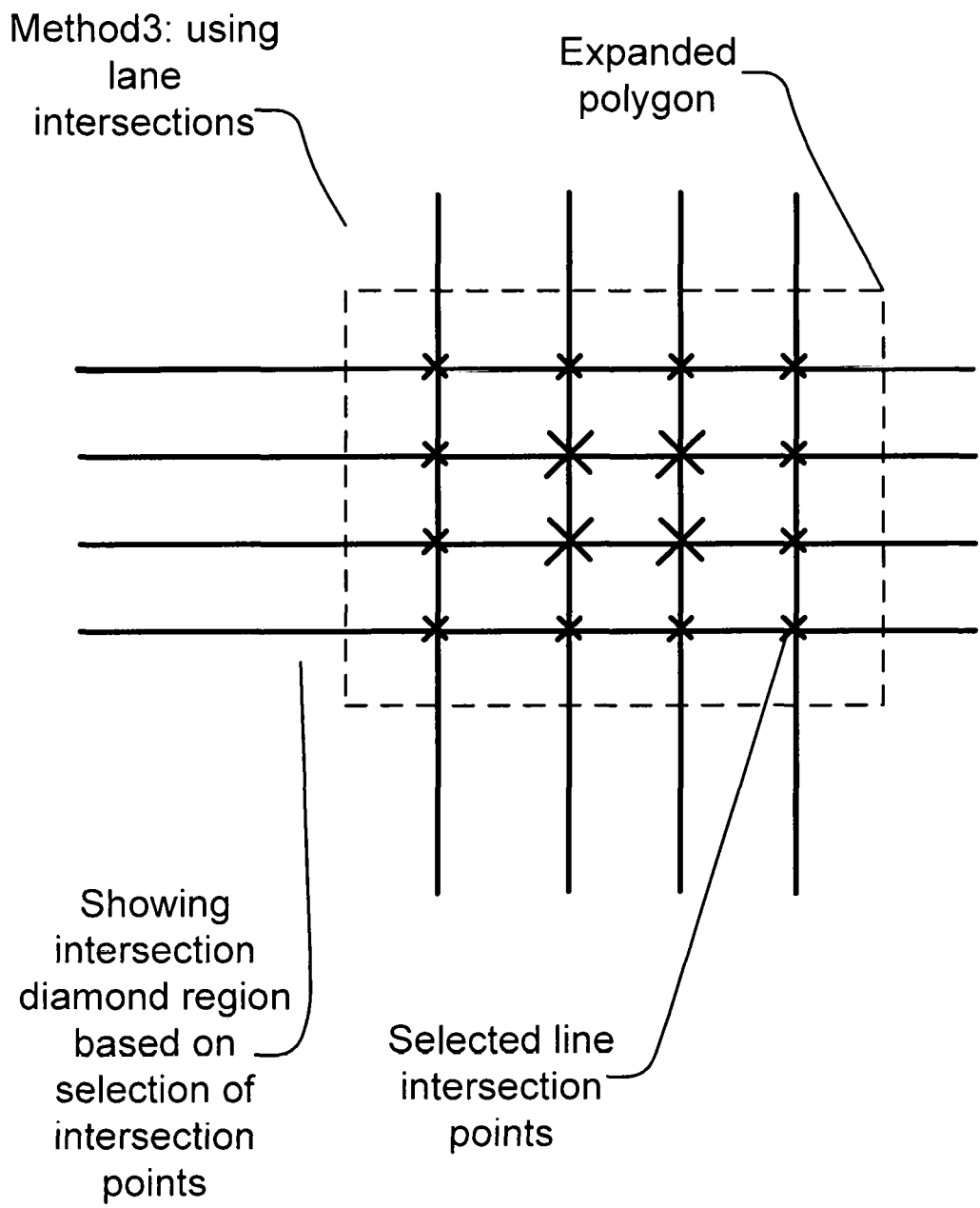
FIG. 23 is for one embodiment of the invention, for step 2, Method 3, using lane intersections.
Figure 24:
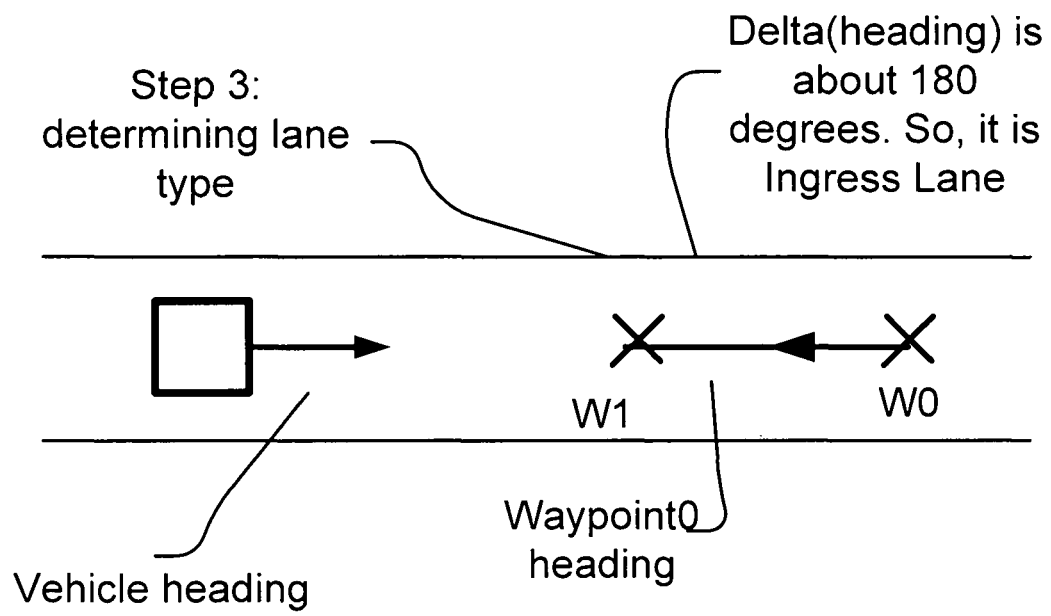
FIG. 24 is for one embodiment of the invention, for step 3, determining lane type.
Figure 25:
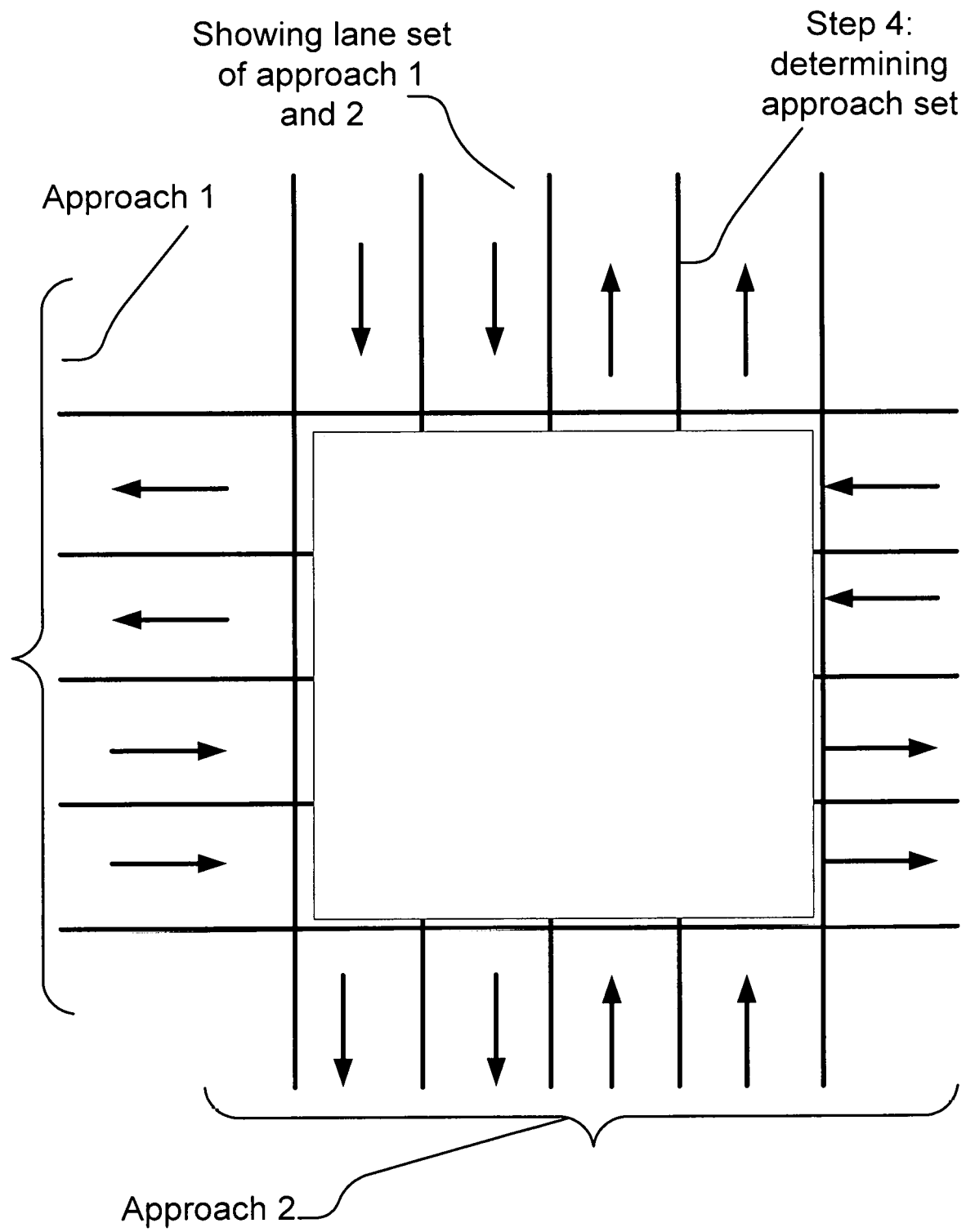
FIG. 25 is for one embodiment of the invention, for step 4, determining approach set.

FIG. 18 is for one embodiment of the invention, for step 1, generating lanes. FIG. 19 is for one embodiment of the invention, for step 1, generating lanes. FIG. 20 is for one embodiment of the invention, for step 2, constructing INTX Diamond Region. FIG. 21 is for one embodiment of the invention, for step 2, constructing INTX Diamond Region. FIG. 22 is for one embodiment of the invention, for step 2, constructing INTX Diamond Region. FIG. 23 is for one embodiment of the invention, for Method 3, using lane intersections. FIG. 24 is for one embodiment of the invention, for step 3, determining lane type. FIG. 25 is for one embodiment of the invention, for step 4, determining approach set.

Figure 26:
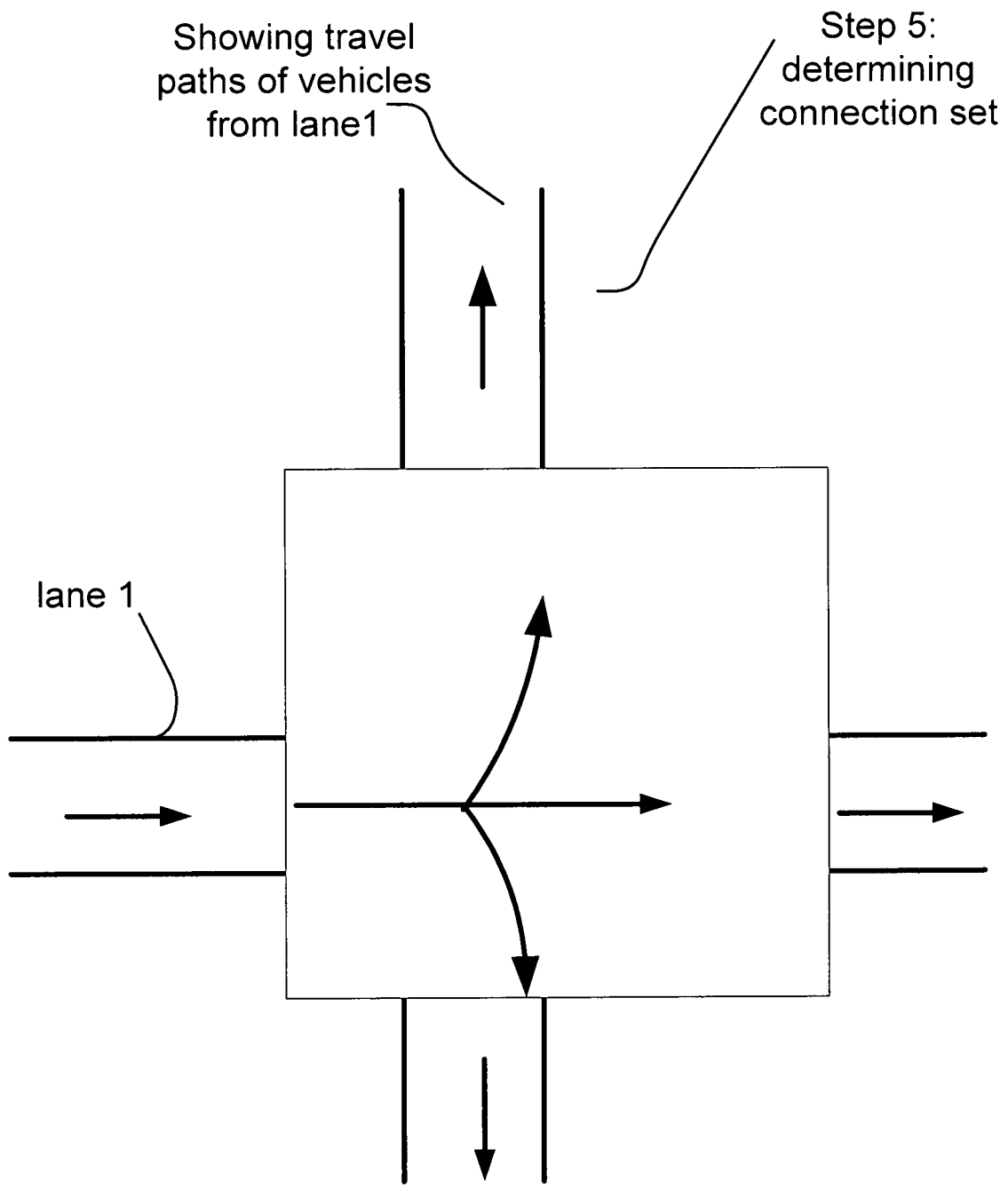
FIG. 26 is for one embodiment of the invention, for step 5, determining connection set.
Figure 27:
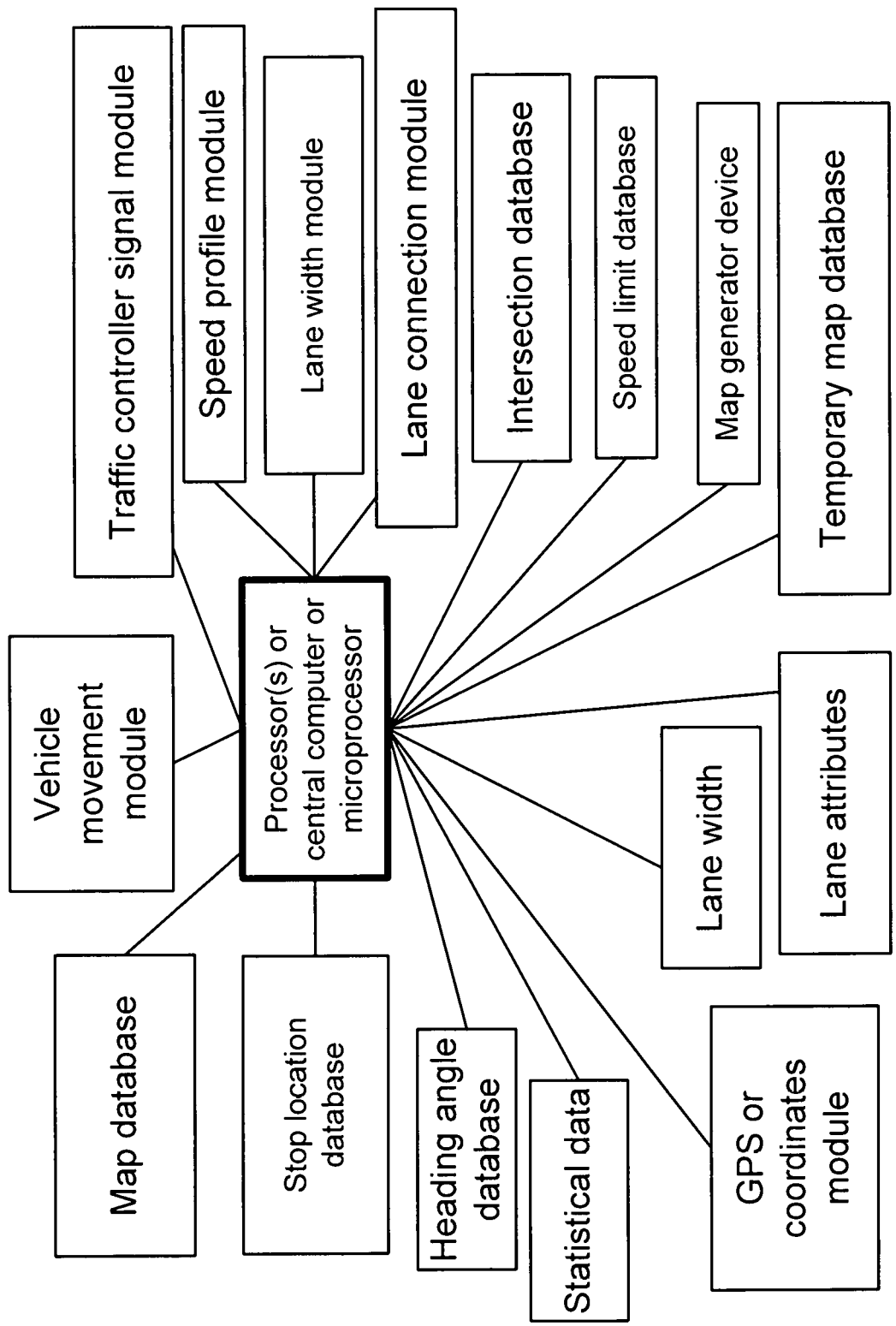
FIG. 27 is for one embodiment of the invention, for a system of creating, storing, and updating local dynamic MAP database with safety attribute.
Figure 28:
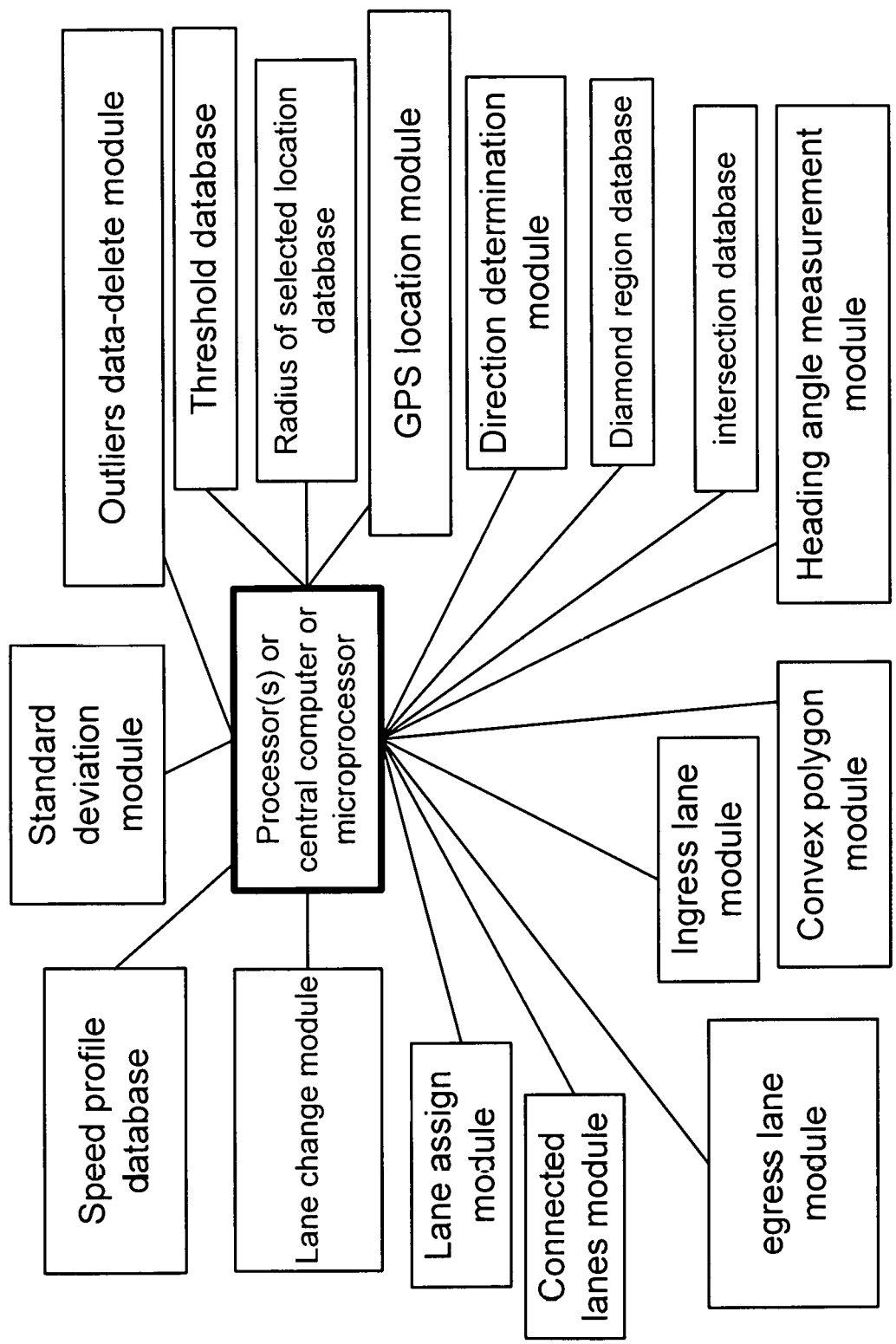
FIG. 28 is for one embodiment of the invention, for a system of creating, storing, and updating local dynamic MAP database with safety attribute.

FIG. 26 is for one embodiment of the invention, for step 5, determining connection set. FIG. 27 is for one embodiment of the invention, for a system of creating, storing, and updating local dynamic MAP database with safety attribute. FIG. 28 is for one embodiment of the invention, for a system of creating, storing, and updating local dynamic MAP database with safety attribute.

Figure 29:
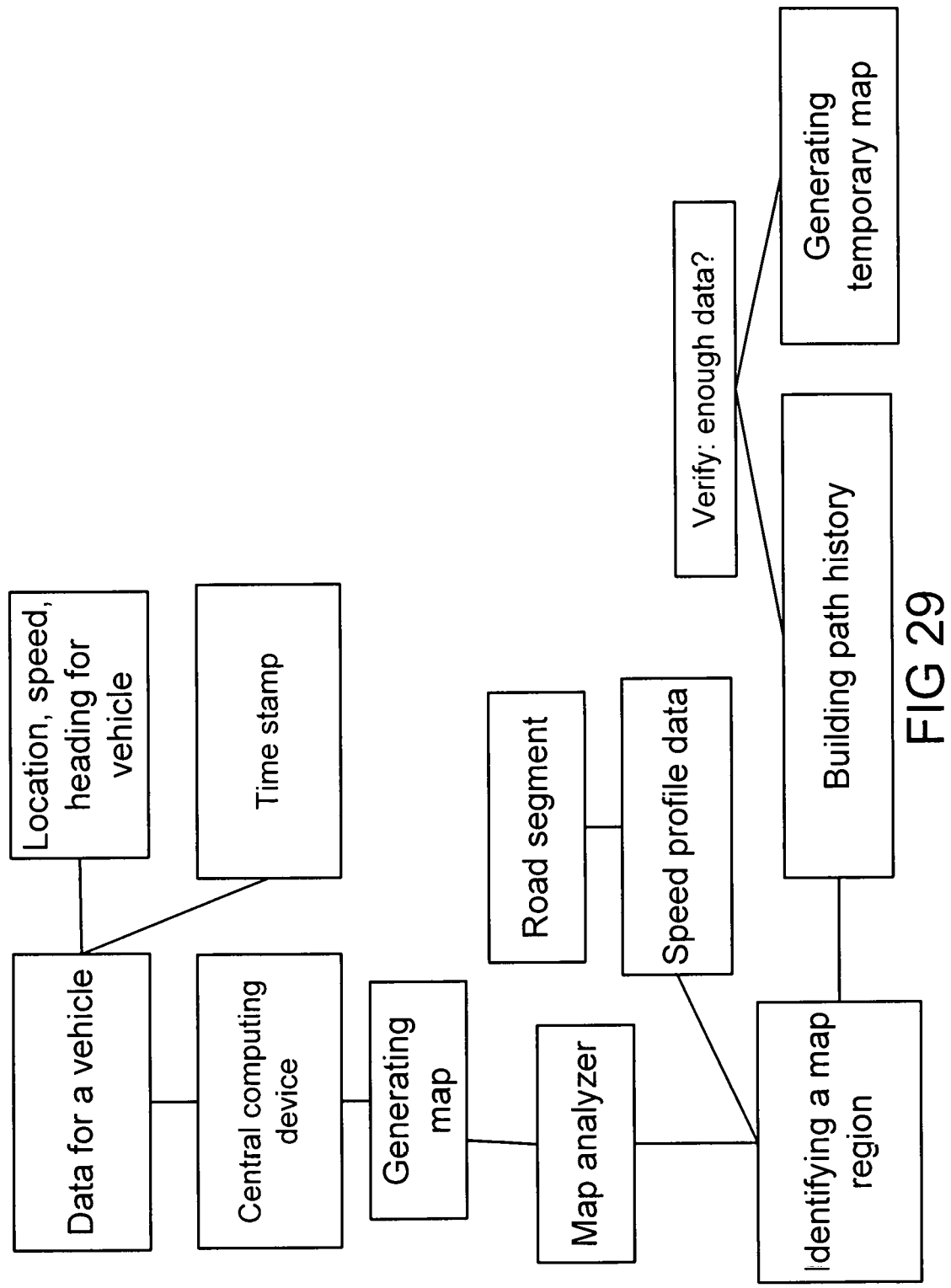
FIG. 29 is for one embodiment of the invention, for a system of map generation. It generates maps using vehicle data such as location, speed, and heading, along with time stamp.

FIG. 29 is for one embodiment of the invention, for a system of map generation. It generates maps using vehicle data such as location, speed, and heading, along with time stamp. It identifies map region using speed profile data collected on each road segment. It builds path history for each vehicle data. It generates temporary map when enough data is captured.

Figure 30:
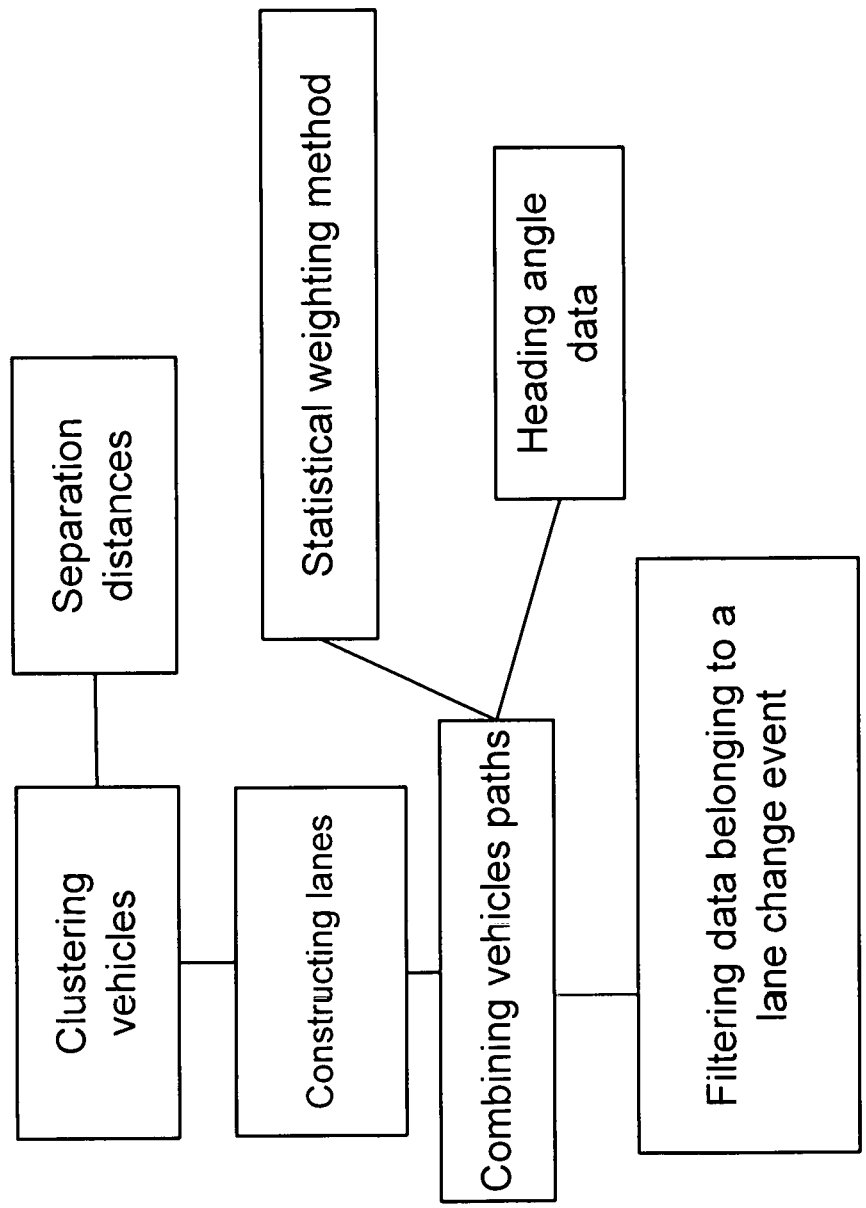
FIG. 30 is for one embodiment of the invention, for a system of lane generation. It constructs lanes by clustering vehicles path and combining vehicle paths inside the clusters.

FIG. 30 is for one embodiment of the invention, for a system of lane generation. It constructs lanes by clustering vehicles path and combining vehicle paths inside the clusters. It clusters vehicle paths using separation distance. It combines vehicle path using statistical weighting method. It combines vehicle path using heading angle data. It filters the data that belongs to lane change event.

Figure 31:
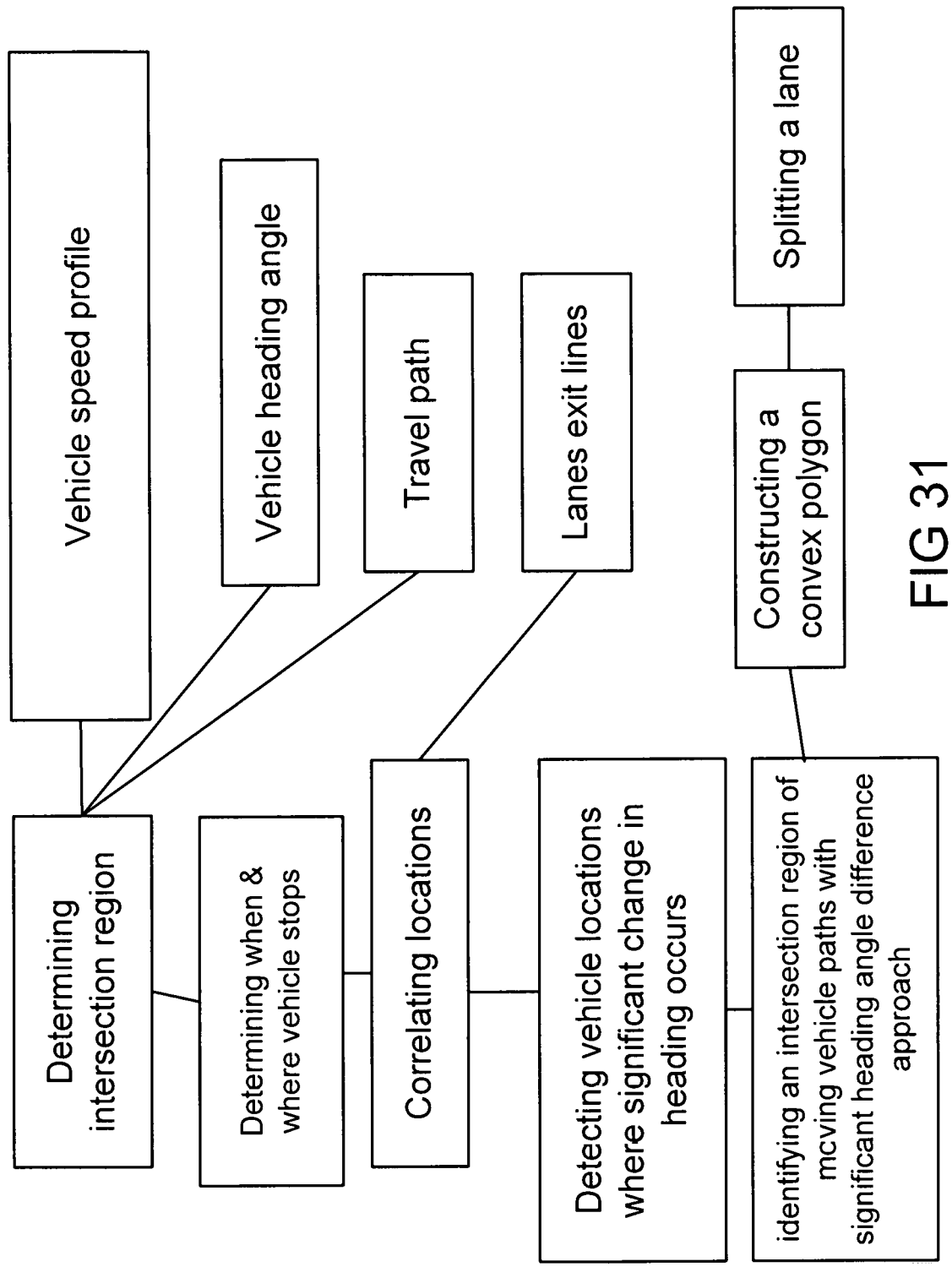
FIG. 31 is for one embodiment of the invention, for a system of determining intersection and lanes splitting. It determines intersection region using vehicles speed profiles, vehicles heading angles, and vehicles travel path intersects.

FIG. 31 is for one embodiment of the invention, for a system of determining intersection and lanes splitting. It determines intersection region using vehicles speed profiles, vehicles heading angles, and vehicles travel path intersects. It detects when and where vehicles have stopped. Stopped vehicles locations are correlated with the lanes exit lines. It detects vehicle locations where significant change in the heading has occurred. It identifies intersection region of moving vehicle paths with significant heading angle difference approach. It constructs convex polygon. It splits lane using the polygon region.

Figure 32:
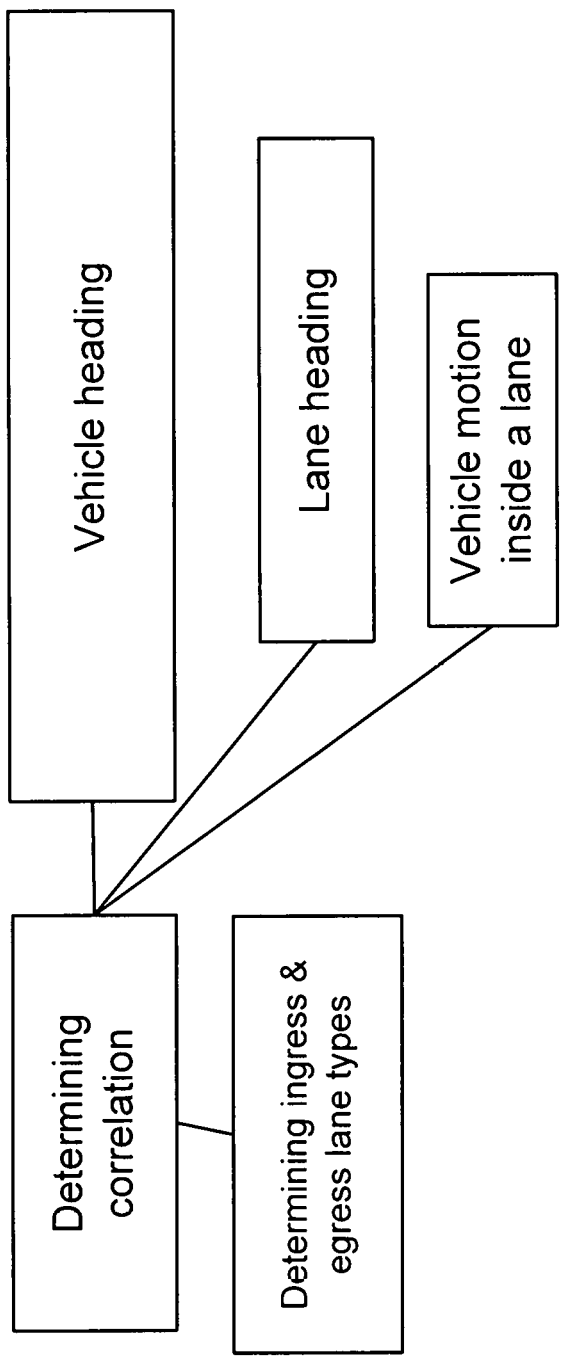
FIG. 32 is for one embodiment of the invention, for a system of determining Lane type (Ingress/Egress).

FIG. 32 is for one embodiment of the invention, for a system of determining Lane type (Ingress/Egress). It determines "Ingress/Egress" lane type using correlation between vehicle heading and lane heading, and vehicle motion inside the lane.

Figure 33:
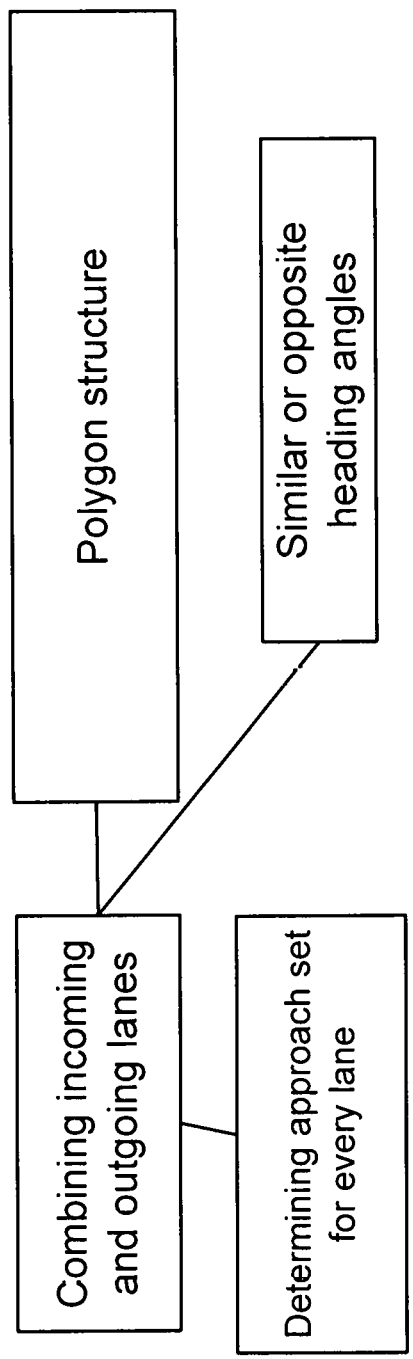
FIG. 33 is for one embodiment of the invention, for a system of determining the approach set for every lane.

FIG. 33 is for one embodiment of the invention, for a system of determining the approach set for every lane. It determines the approach set for every lane by combining the incoming and outgoing lanes that fall on one side of the polygon and have similar or opposite heading angle.

Figure 34:
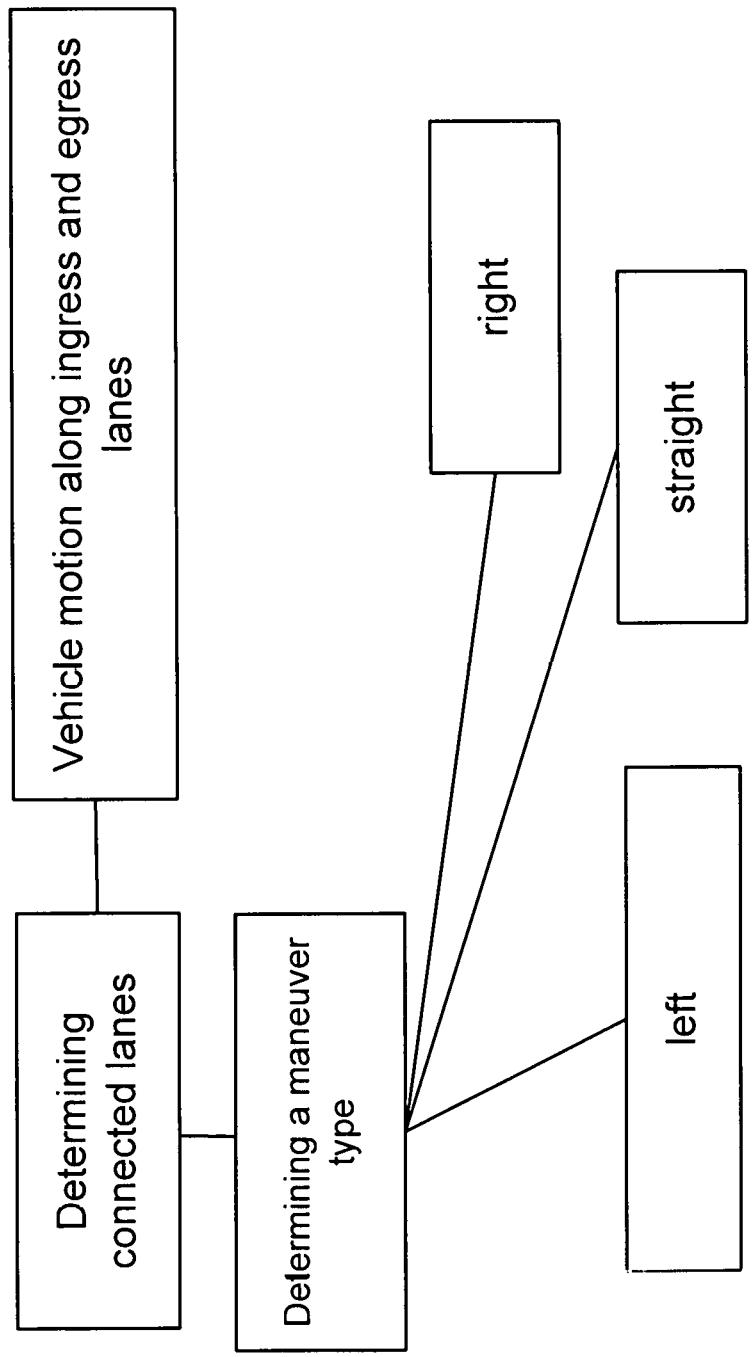
FIG. 34 is for one embodiment of the invention, for a system of determining connecting lanes and movement state for ingress lane.

FIG. 34 is for one embodiment of the invention, for a system of determining connecting lanes and movement state for ingress lane. It determines connected lanes by observing vehicles motion along ingress and egress lane. It determines the maneuver type to go between ingress and egress (left/right/straight).

Figure 35:
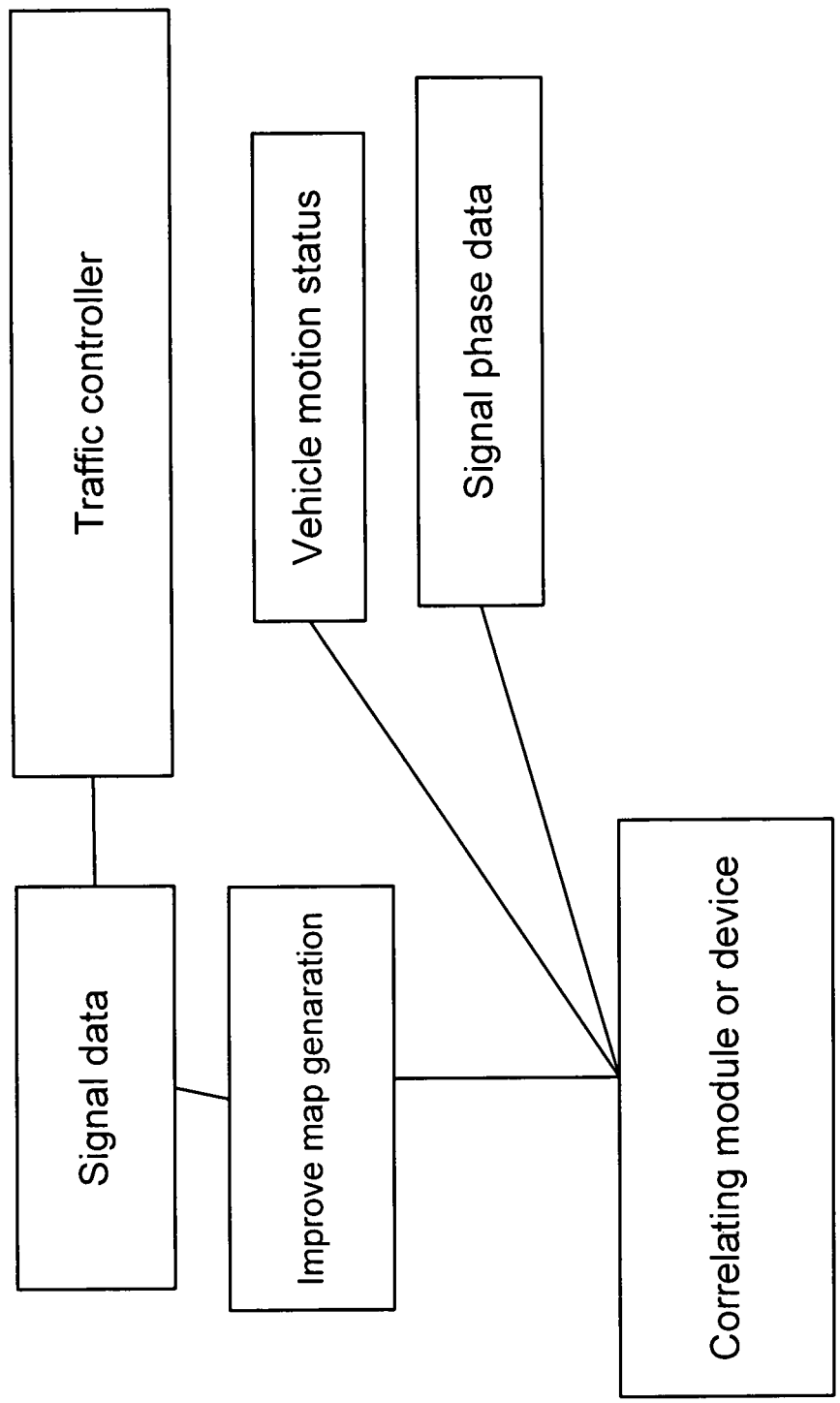
FIG. 35 is for one embodiment of the invention, for a system of MAP Generation. Improved map generation uses signal data available from traffic controller.

FIG. 35 is for one embodiment of the invention, for a system of MAP Generation. Improved map generation uses signal data available from traffic controller. It correlates the traffic controller signal phase data with the vehicle motion status (e.g., as: "is going to stop", "has stopped", "is moving from stop", "moving", and etc.).

Figure 36:
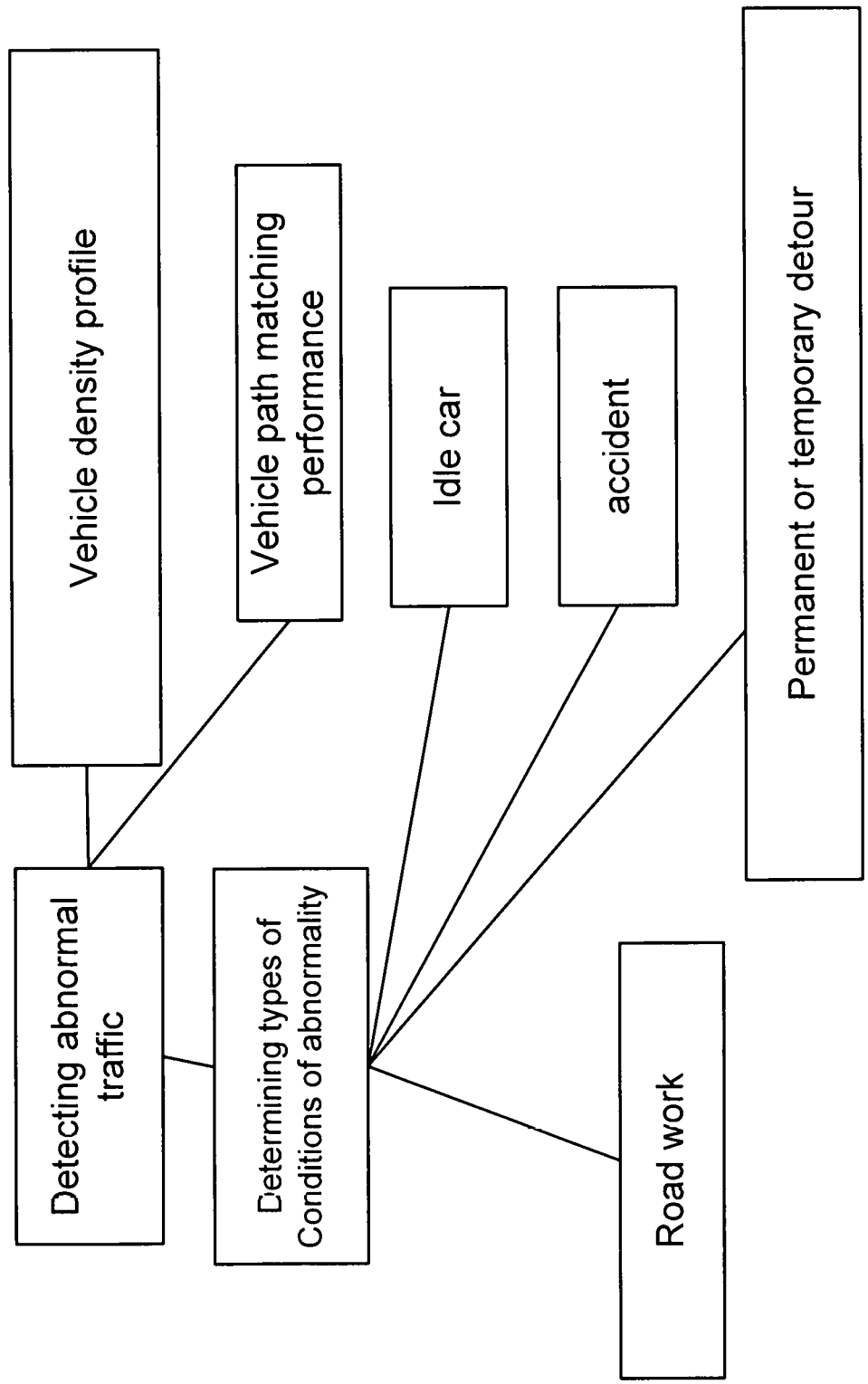
FIG. 36 is for one embodiment of the invention, for a system of Map maintenance. Abnormal traffic condition is detected by observing the vehicle density profile and the vehicle path matching performance.

FIG. 36 is for one embodiment of the invention, for a system of Map maintenance. Abnormal traffic condition is detected by observing the vehicle density profile and the vehicle path matching performance. Different types of conditions that cause the abnormality are detected, such as idle vehicle, accident, work zone, or even a permanent or temporary change in the road.

Figure 37:
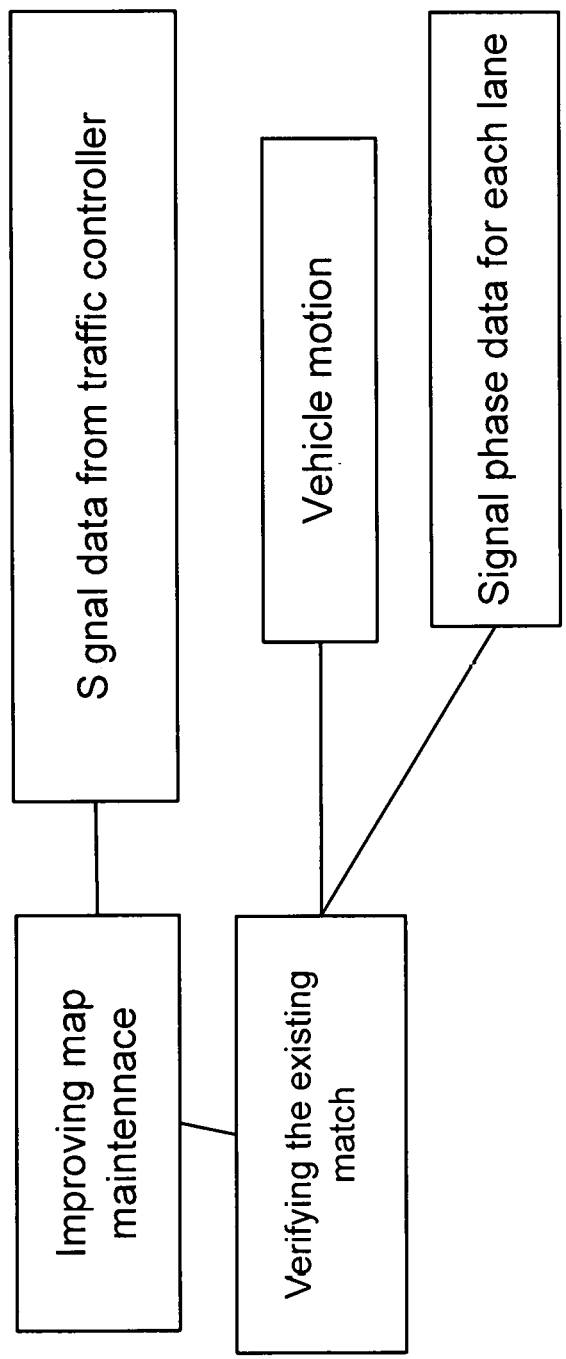
FIG. 37 is for one embodiment of the invention, for a system of Map maintenance. Improved map maintenance uses signal data from traffic controller.

FIG. 37 is for one embodiment of the invention, for a system of Map maintenance. Improved map maintenance uses signal data from traffic controller. It verifies that existing matching between vehicle motion and signal phase data for each lane is still the same.

Figure 38:
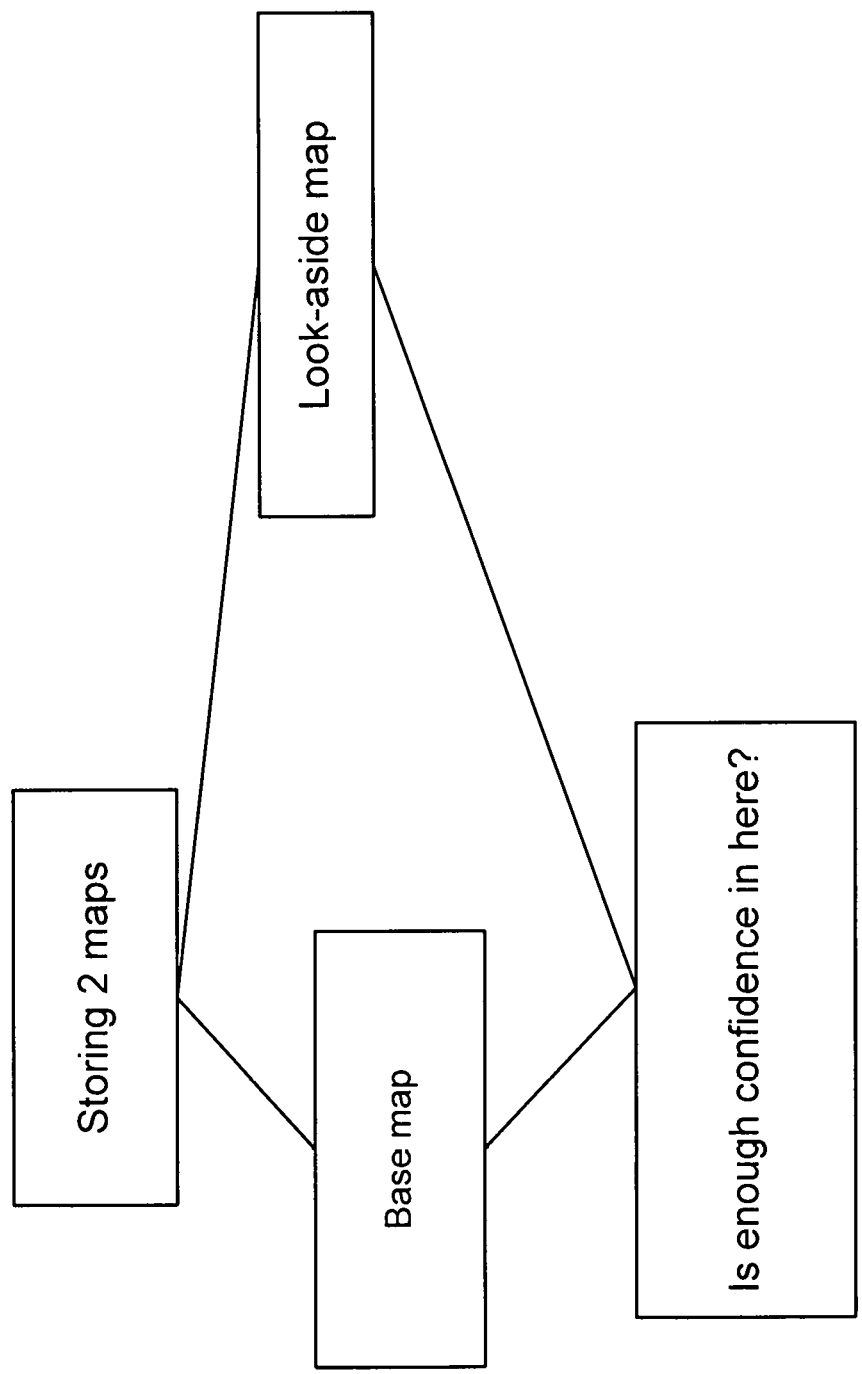
FIG. 38 is for one embodiment of the invention, for a system of Map publishing, storing, and updating mechanism.

FIG. 38 is for one embodiment of the invention, for a system of Map publishing, storing, and updating mechanism. Two maps are stored: base map and look aside map. At initialization, no base map is available. Look aside map can be moved to base map when enough confidence is built. The look aside replaces the corresponding part of the base map when its confidence level becomes better than the base map.

Figure 39:
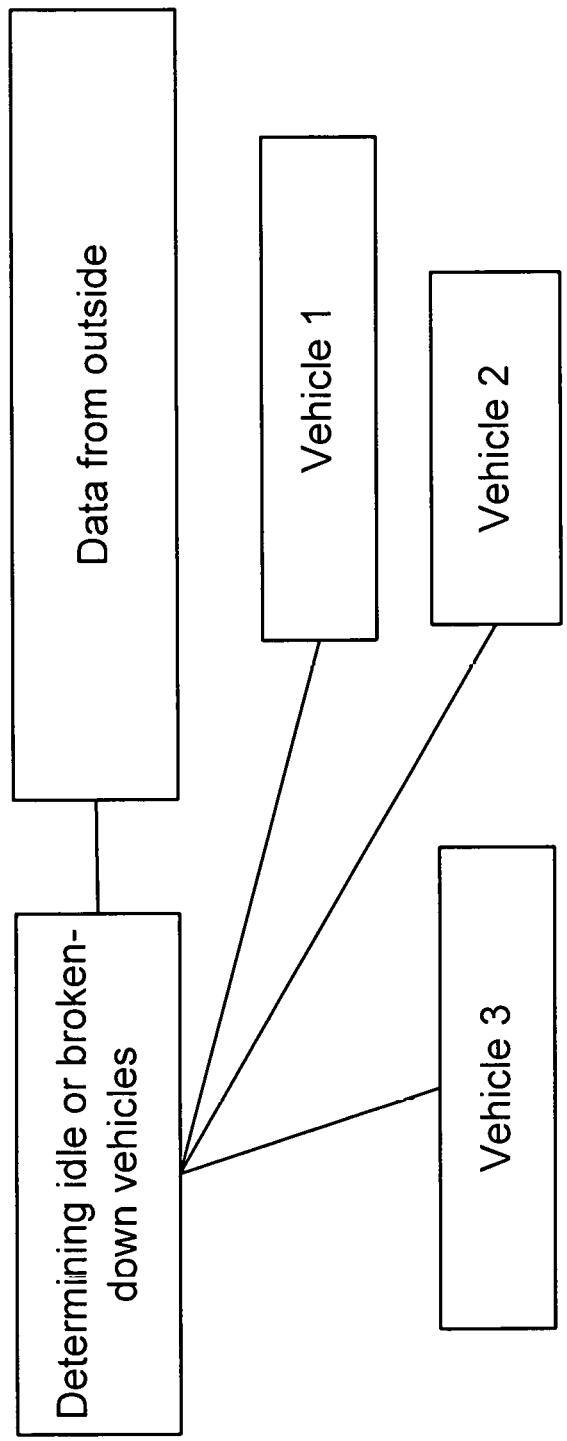
FIG. 39 is for one embodiment of the invention, for a system of Safety Consideration.

FIG. 39 is for one embodiment of the invention, for a system of Safety Consideration. It detects an idle vehicle (breakdown vehicle) and shares the location of this vehicle with other vehicles, for map, to have a safety attribute.

An embodiment of the invention is a method for creating, storing, and updating local dynamic map database with safety attribute, for a street or highway, said method comprising: a central computer receiving speed profiles from vehicles in said street or highway from an input device; an analyzer module or device determining vehicular density for said vehicles in said street or highway; an identifier module or device determining lane attributes for a lane in said street or highway; receiving traffic controller data for said street or highway; integrating said traffic controller data for said street or highway into map data; identifying temporary and permanent changes in said map data; updating said map data; and identifying an obstacle of mobility attribute in said map data.

An embodiment of the invention is one of the following:
identifying intersections for said street or highway.
identifying an idle vehicle in said street or highway.
identifying an accident in said street or highway.
using a short range communication device.
using an on-board device in a car.
using a road side equipment.
determining a status of said traffic controller data.
determining a correlation with a status of said traffic controller data.
storing said map data.
generating a basic safety message.
storing location, heading, and speed of a car.
storing a time-stamp for a basic safety message.
checking an accuracy of past history points.
generating lanes for said street or highway.
combining paths for said street or highway.
using statistical analysis for paths.
using weights for paths.
detecting a lane change event.
filtering outlier samples in statistical analysis.

In one embodiment, the map can be generated in a central processor. In one embodiment, the map can be generated in distributed processors, and later merged together as one map. The advantage of the distributed-processors method is that if for any reason the communication or the processing is interrupted, the other processors can partially supply the data for the vehicles, for navigation and operation. In one embodiment, the processor is mobile itself, e.g., installed in a car, satellite, drone, balloon, or airplane. In one embodiment, the processor is stationary, at a fixed location. In one embodiment, the processor network manages the map, e.g., in a server farm.

In one embodiment, each server covers one part of the city or area. In one embodiment, the geographical areas have overlaps for coverage. In one embodiment, there are redundancies between coverage of different units. In one embodiment, there is a correction based on the redundancies between coverage of different units, to find and filter out the erroneous data. In one embodiment, there is an averaging process based on the redundancies between coverage of different units, to average the data for more accurate results. In one embodiment, there is a weighted-averaging process based on the redundancies between coverage of different units, to weighted-average the data for more accurate results, with more weights for the more reliable units or sources, or higher weights for the results that are closer to the center of curve representing the distribution of values, i.e., eliminating or reducing the fringe results or erroneous data.

In one embodiment, we have data distributed and sold to a third party subscribing to our service and data flow, as updates and feed, so that they can manage the traffic or control cars or analyze the data for marketing purposes or finding the trends. For example, from the traffic patterns, one can conclude that how many cars are going to the new mall or store and how long they stay at that mall in average, in terms of hours, and at what hours or which days, which will help the mall to plan for marketing and sales, e.g., to order merchandise in advance for specific people or specific time or season. In addition, from the traffic pattern, one can conclude that which areas or streets are most likely the source of cars to a specific mall or region, statistically, so that from the social or income data from a target neighborhood, one can find the social or income level of people likely going to a specific mall, and at what time during the day, as a probability distribution, so that the average, or median, or aggregate, or expected value, or standard deviation can be extracted or estimated for each parameter under study, e.g., income level or average age or gender, e.g., a stay-home or vacationing parent driving to mall during day time on weekdays (e.g., not working at an office or regular job or vacationing, so that have enough time during the day to go to mall during weekdays and non-holidays). Such estimates and statistics for patterns or behaviors for people are very valuable for marketing and sales people who want to predict and plan ahead. Thus, they buy these data and analyze and extract patterns from them for their specific purposes.

Another purpose or usage for such data is for traffic planning or city expansion planning or metro rail planning for future, e.g., to remove congestion or reduce traffic around main roads or plan for gas stations or malls or office buildings or metro stations or train stations, or estimate the trend for population growth or movement or concentration throughout the years, by comparing such traffic data in time, e.g., to plan schools for future for a district. Aggregate and trend and direction results are very useful and valuable for people in charge or decision makers for all of the private and public sectors. For example, for heavily congested and concentrated intersections and roads, the real estate market and values may go up, due to demand for commercial space and office space. Or, the parking fee rate per hour or per day may go up, due to the demand or shortage for parking space, at least during the time that are the peak for traffic, from our data collected for various times and regions.

Here, we describe some of our embodiments/examples, as components of our system:

Map Generation: (See FIG. 29)
It generates maps using vehicle data such as location, speed, and heading, along with time stamp.
It identifies map region using speed profile data collected on each road segment.
It builds path history for each vehicle data.
It generates temporary map when enough data is captured.
Generating Lanes: (See FIG. 30)
It constructs lanes by clustering vehicles path and combining vehicle paths inside the clusters.
It clusters vehicle paths using separation distance.
It combines vehicle path using statistical weighting method.
It combines vehicle path using heading angle data.
It filters the data that belongs to lane change event.
Determining Intersection and Lanes Splitting: (See FIG. 31)
It determines intersection region using vehicles speed profiles, vehicles heading angles, and vehicles travel path intersects.
It detects when and where vehicles have stopped.
Stopped vehicles locations are correlated with the lanes exit lines.
It detects vehicle locations where significant change in the heading has occurred.
It identifies intersection region of moving vehicle paths with significant heading angle difference approach.
It constructs convex polygon.
It splits lane using the polygon region.
Determining Lane Type (Ingress/Egress): (See FIG. 32)
It determines "Ingress/Egress" lane type using correlation between vehicle heading and lane heading, and vehicle motion inside the lane.
Determining the Approach Set for Every Lane: (See FIG. 33)
It determines the approach set for every lane by combining the incoming and outgoing lanes that fall on one side of the polygon and have similar or opposite heading angle.
Determining Connecting Lanes and Movement State for Ingress Lane: (See FIG. 34)
It determines connected lanes by observing vehicles motion along ingress and egress lane.
It determines the maneuver type to go between ingress and egress (left/right/straight).
More in MAP Generation: (See FIG. 35)
Improved map generation uses signal data available from traffic controller.
It correlates the traffic controller signal phase data with the vehicle motion status (e.g., as: "is going to stop", "has stopped", "is moving from stop", "moving", and etc.).
Map Maintenance: (See FIG. 36)
Abnormal traffic condition is detected by observing the vehicle density profile and the vehicle path matching performance.
Different type of conditions that causes the abnormality are detected, such as idle vehicle, accident, work zone, or even a permanent or temporary change in the road.
More in Map Maintenance: (See FIG. 37)
Improved map maintenance uses signal data from traffic controller.
It verifies that existing matching between vehicle motion and signal phase data for each lane is still the same.
Map Publishing. Storing, and Updating Mechanism: (See FIG. 38)
Two maps are stored: base map and look aside map.

At initialization, no base map is available. Look aside map can be moved to base map when enough confidence is built.

The look aside replaces the corresponding part of the base map when its confidence level becomes better than the base map.

Safety Consideration: (See FIG. 39)

It detects an idle vehicle (breakdown vehicle) and shares the location of this vehicle with other vehicles, for map, to have a safety attribute.

Description of the Overall System

Figure 1:
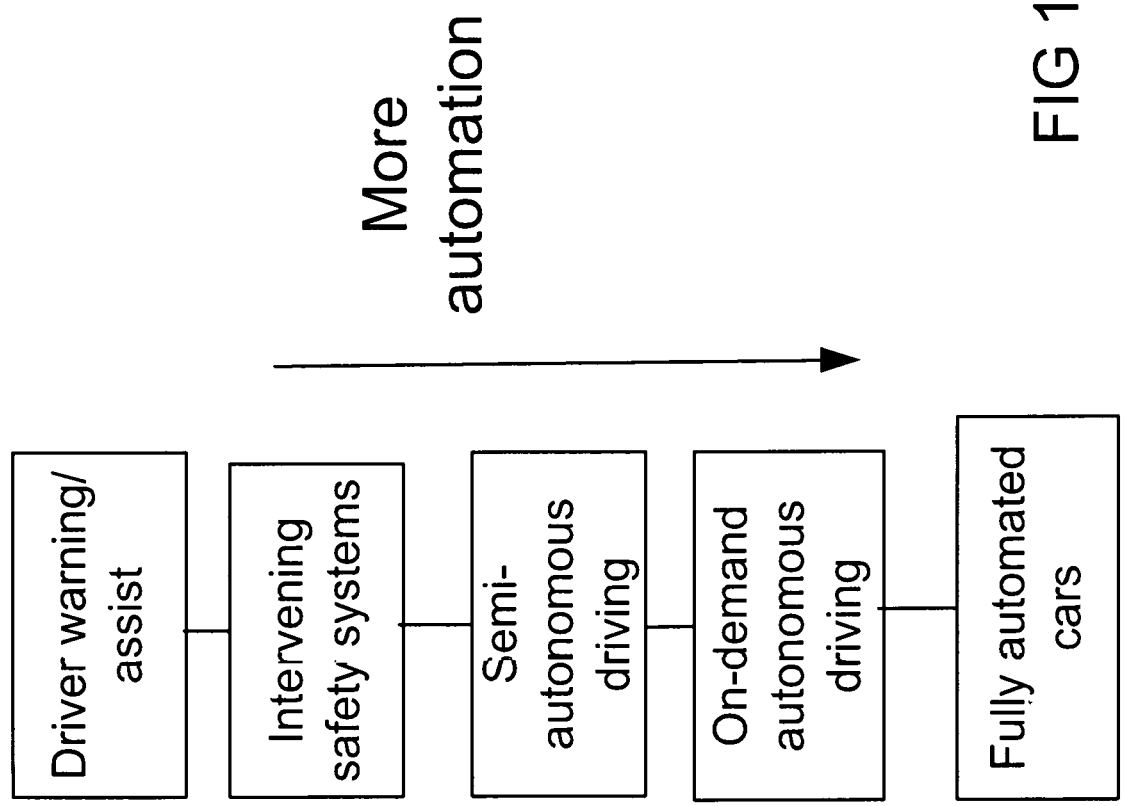
FIG. 1 is for one embodiment, as an example, for representation of development of fully automated vehicles, in stages.
Figure 2:
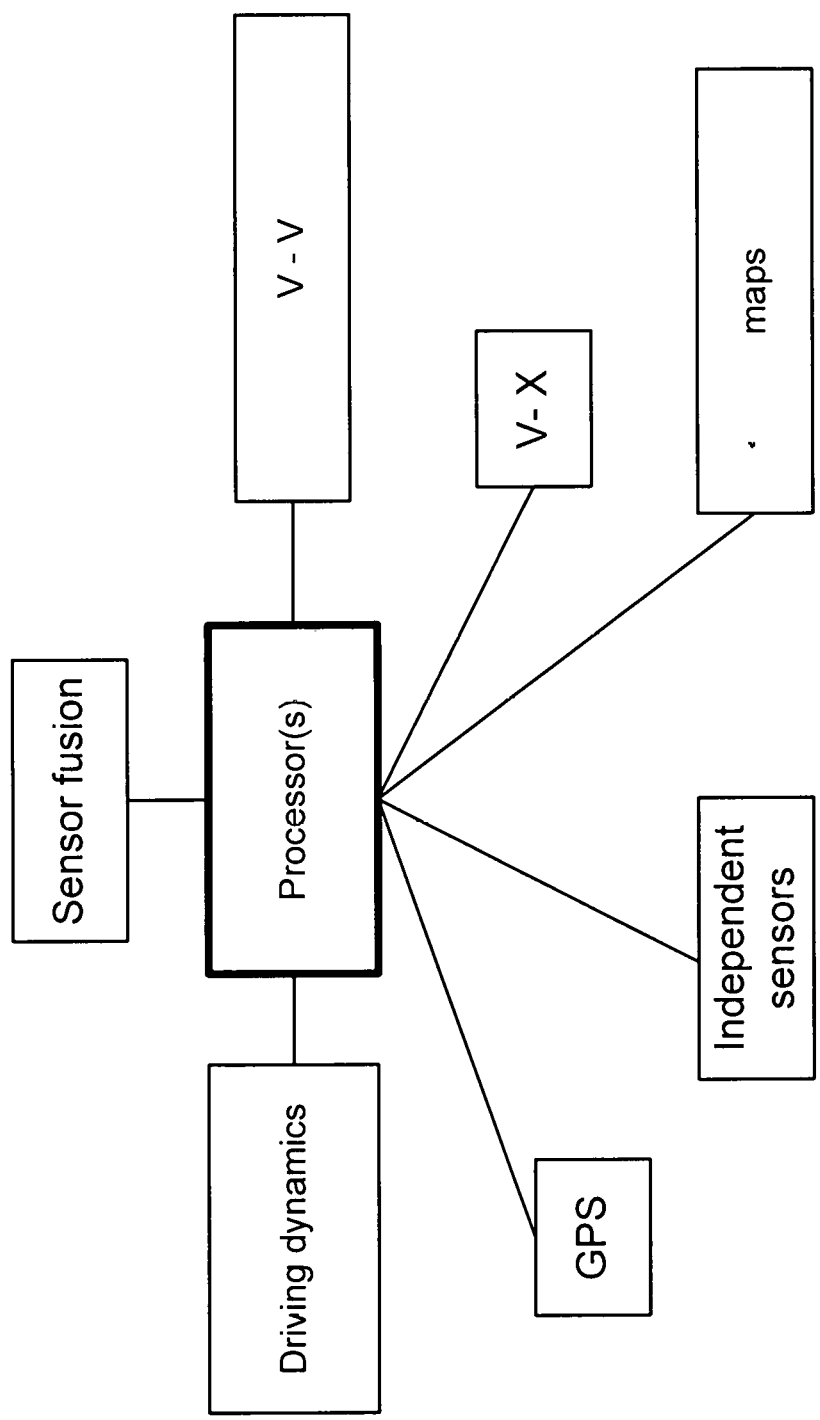
FIG. 2 is for one embodiment of the invention, for a system for automated vehicles.

Here, we describe the overall/general system for some of our embodiments above:

FIGS. 1-9 describe in details the presented automated vehicle system. FIGS. 10-17 explain some embodiments of the current invention. FIG. 1 is for one embodiment, as an example, for representation of development of fully automated vehicles, in stages, for progression toward fully automated vehicles. FIG. 2 is for one embodiment of the invention, for a system for automated vehicles, using GPS, independent sensors, maps, driving dynamics, and sensor fusions and integrations.

Figure 3:
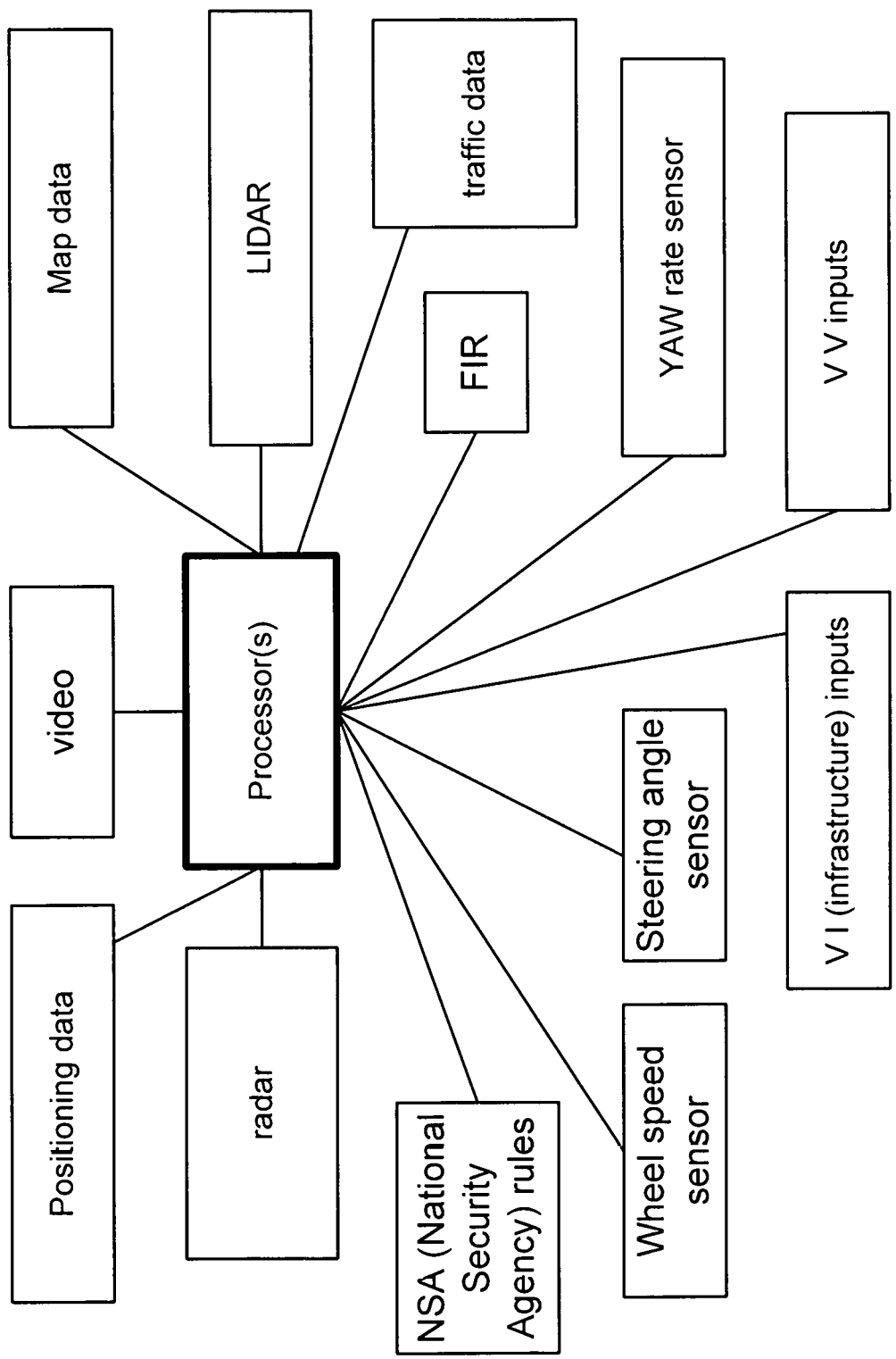
FIG. 3 is for one embodiment of the invention, for a system for automated vehicles.

FIG. 3 is for one embodiment of the invention, for a system for automated vehicles, with different measurement devices, e.g., LIDAR (using laser, scanner/optics, photodetectors/sensors, and GPS/position/navigation systems, for measuring the distances, based on travel time for light), radar, GPS, traffic data, sensors data, or video, to measure or find positions, coordinates, and distances. The government agencies may impose restrictions on security and encryption of the communications and data for modules and devices within the system, as the minimum requirements, as the hackers or terrorists may try to get into the system and control the vehicles for a destructive purpose. Thus, all of the components are based on those requirements imposed by the US or other foreign governments, to comply with the public safety.

Figure 4:
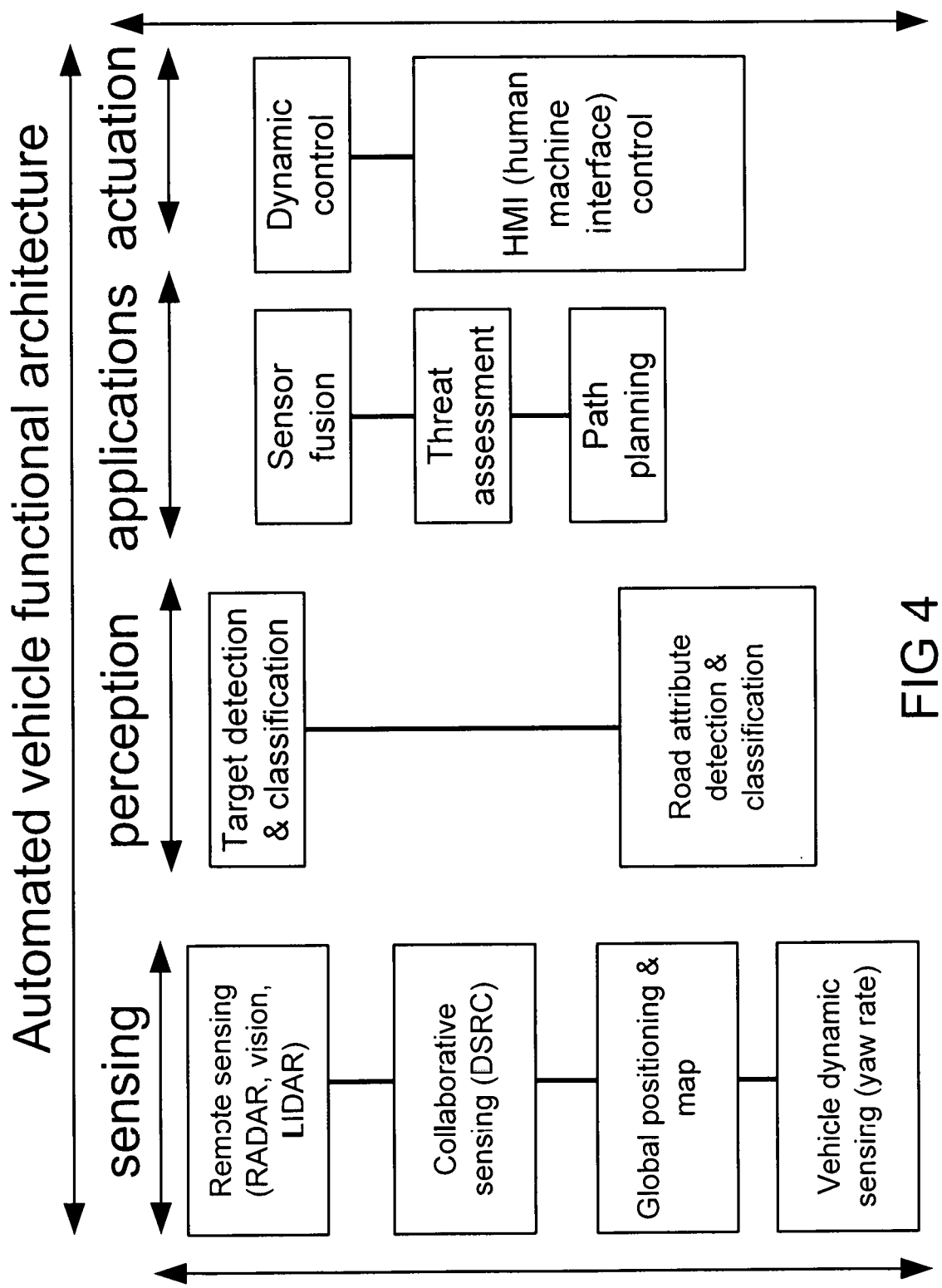
FIG. 4 is for one embodiment of the invention, for automated vehicle functional architecture.
Figure 5:
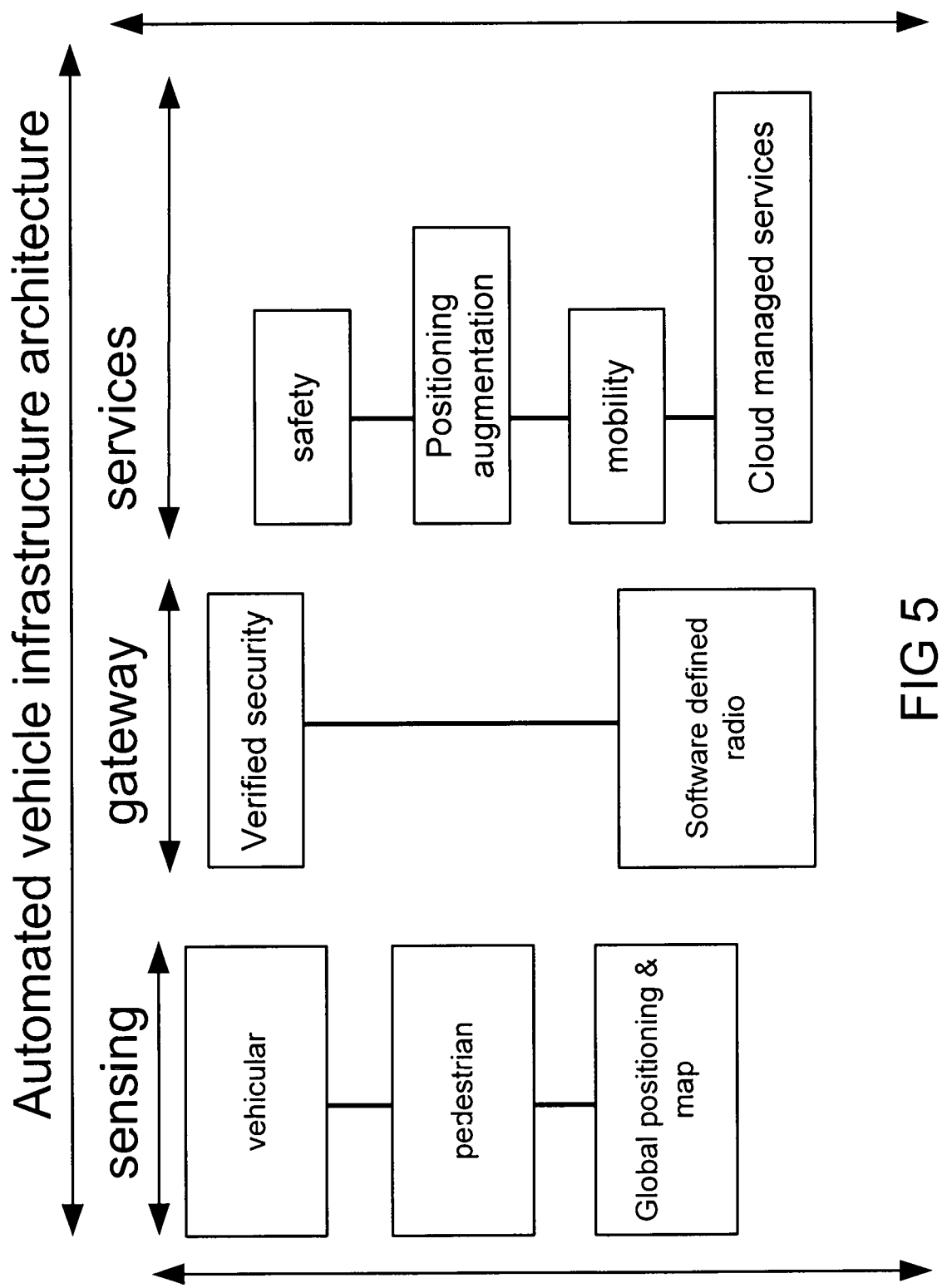
FIG. 5 is for one embodiment of the invention, for automated vehicle infrastructure architecture.

FIG. 4 is for one embodiment of the invention, for automated vehicle functional architecture, for sensing, perception, applications, and actuation. FIG. 5 is for one embodiment of the invention, for automated vehicle infrastructure architecture, for sensing, gateway, and services.

Figure 6:
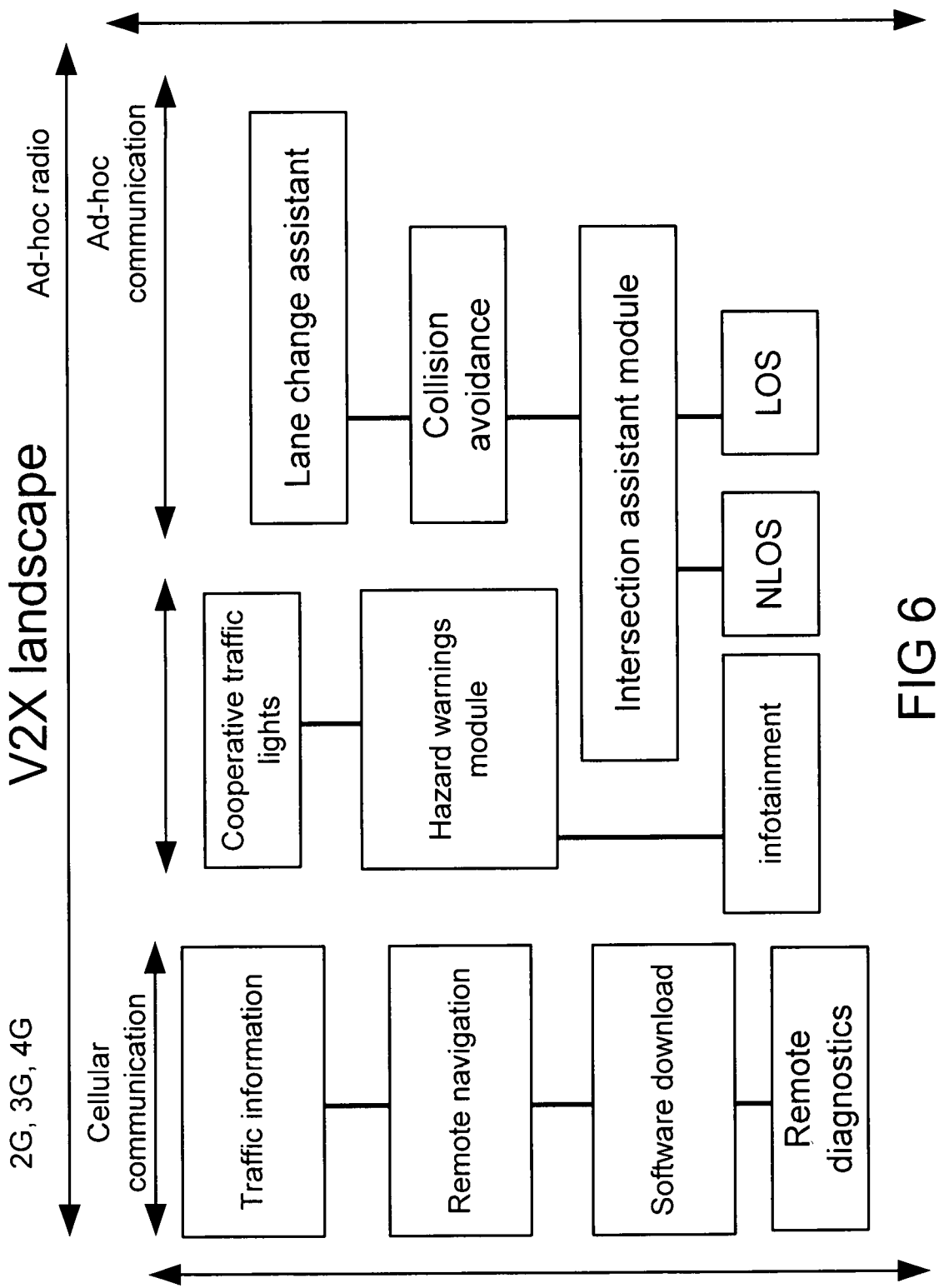
FIG. 6 is for one embodiment of the invention, for a system for V2X landscape, with components.
Figure 7:
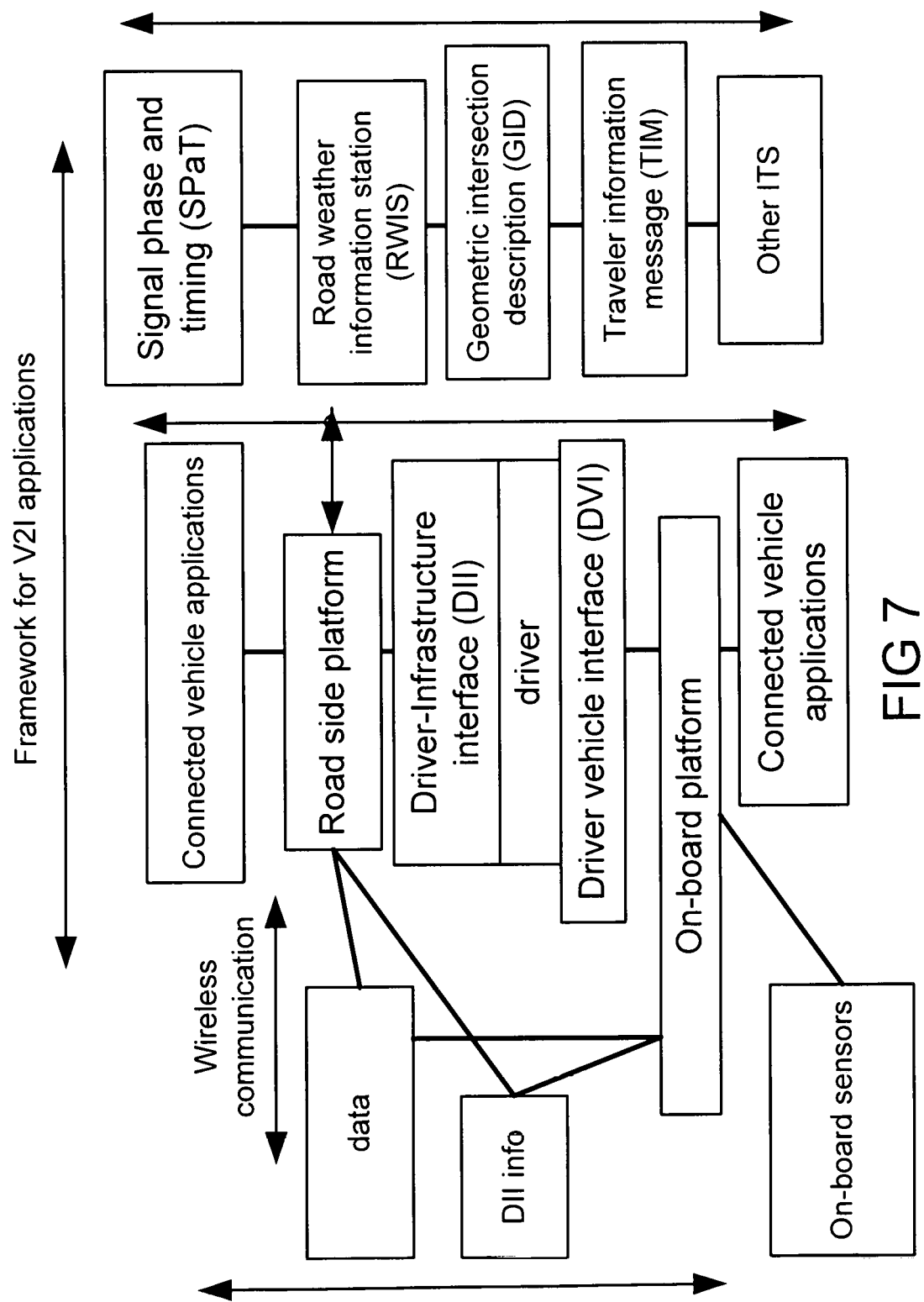
FIG. 7 is for one embodiment of the invention, for a system for framework for V2I applications, with components.

FIG. 6 is for one embodiment of the invention, for a system for V2X landscape, with components, for spectrum and range of frequencies and communications, for various technologies, for various purposes, for different ranges. FIG. 7 is for one embodiment of the invention, for a system for framework for V2I applications, with components, for roadside platform and on-board platform, using various messages and sensors.

Figure 8:
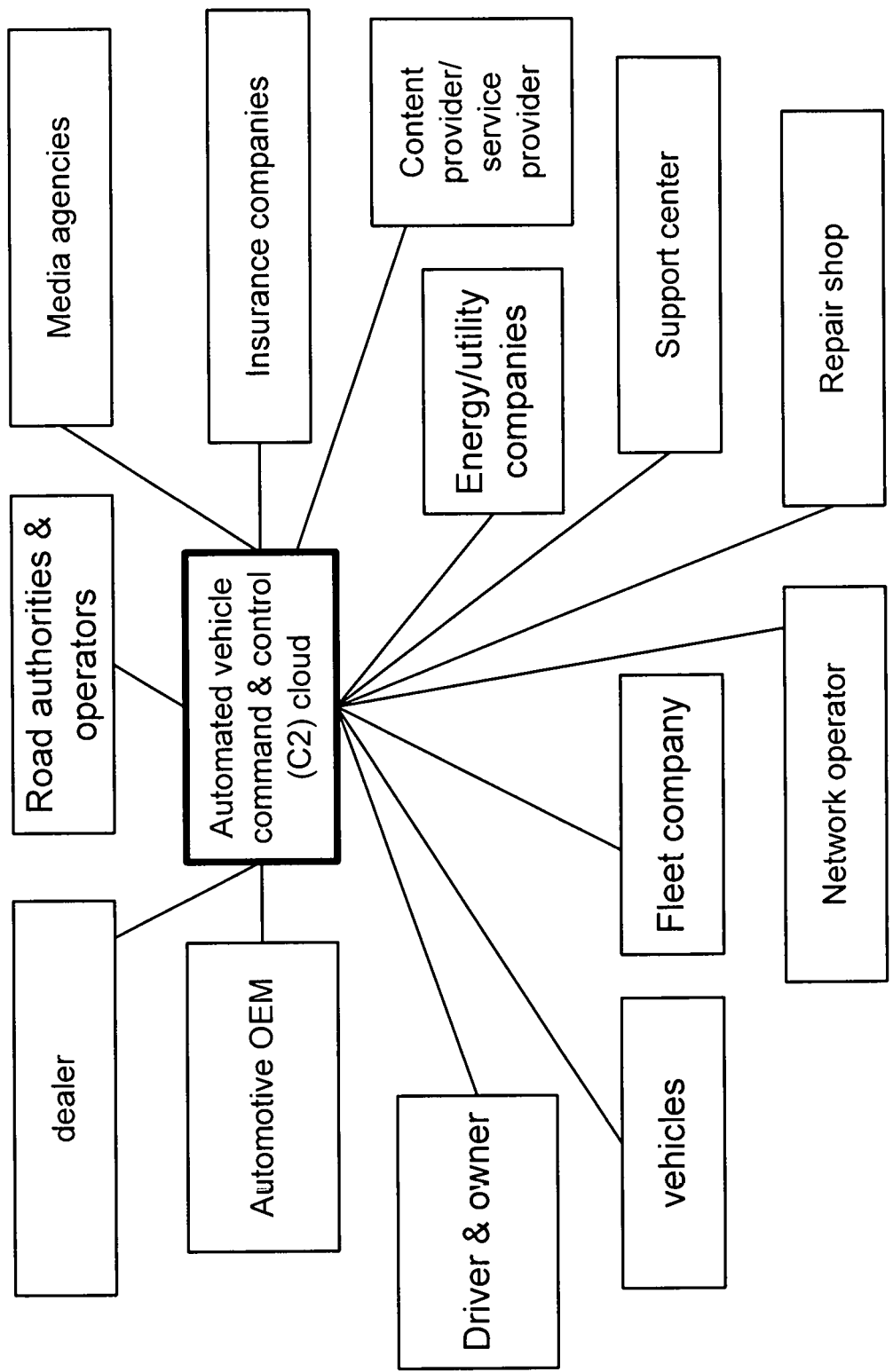
FIG. 8 is for one embodiment of the invention, for a system for automated vehicle command and control (C2) cloud, with components.
Figure 9:
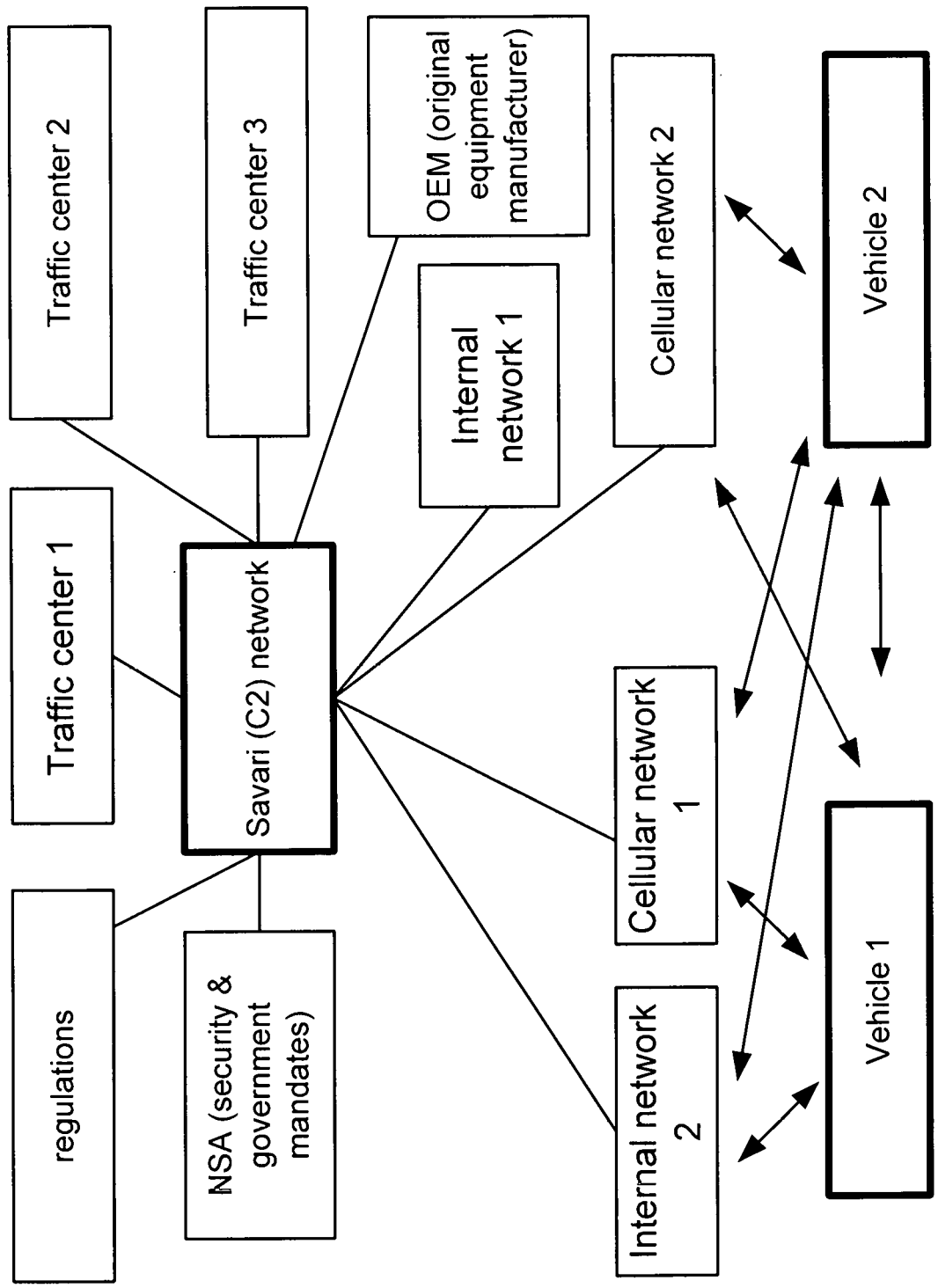
FIG. 9 is for one embodiment of the invention, for a system for our (Savari) C2 network, with components, showing communications between networks and vehicles.

FIG. 8 is for one embodiment of the invention, for a system for automated vehicle command and control (C2) cloud, with components, with various groups and people involved, as user, beneficiary, or administrator. FIG. 9 is for one embodiment of the invention, for a system for our (Savari) C2 network, with components, showing communications between networks and vehicles, using traffic centers' data and regulations by different government agencies.

In one embodiment, we have the following technical components for the system: vehicle, roadway, communications, architecture, cybersecurity, safety reliability, human factors, and operations. In one embodiment, we have the following non-technical analysis for the system: public policy, market evolution, legal/liability, consumer acceptance, cost-benefit analysis, human factors, certification, and licensing.

In one embodiment, we have the following requirements for AV (automated vehicles) system:
  Secure reliable connection to the command and control center
  Built-in fail-safe mechanisms
  Knowledge of its position and map database information (micro and macro maps)
  Communication with traffic lights/road side infrastructure
  Fast, reliable, and secure
  Situational awareness to completely understand its immediate surrounding environment
  Requires multiple sensors
  Algorithms to analyze information from sensors
  Algorithms to control the car, for drive-by-wire capability In one embodiment, we have the following primary technologies for our system:
  V2X communication: time-critical and reliable, secure, cheap, and dedicated wireless spectrum
  Car OBE (on-board equipment): sensor integration (vision, radar and ADAS (advanced driver assistance system)), positioning (accurate position, path, local map), wireless module (physical layer (PHY), Media Access Control (MAC), antenna), security (multi-layer architecture), processing and message engine, and algorithms for vehicle prediction and control In one embodiment, we have the following building blocks for AVs:
  Automation Platform
    i. Advanced Driver Assistance (ADAS) integration
    ii. Map Integration, Lane Control
    iii. Radio communications support
    iv. Vehicle Controller Unit to do actuation
  Base Station
    Ground positioning support to improve positioning accuracy
    V2I (vehicle to infrastructure) functionality, support for public/private spectrums
    Cloud connectivity to provide secure access to vehicles
  Command Control Center
    i. Integration with Infrastructure Providers Here are some of the modules, components, or objects used or monitored in our system: V2V (vehicle to vehicle), GPS (Global Positioning System), V2I (vehicle to infrastructure), HV (host vehicle), RV (remote vehicle, other vehicle, or $3^{rd}$ party), and active and passive safety controls.

Figure 10:
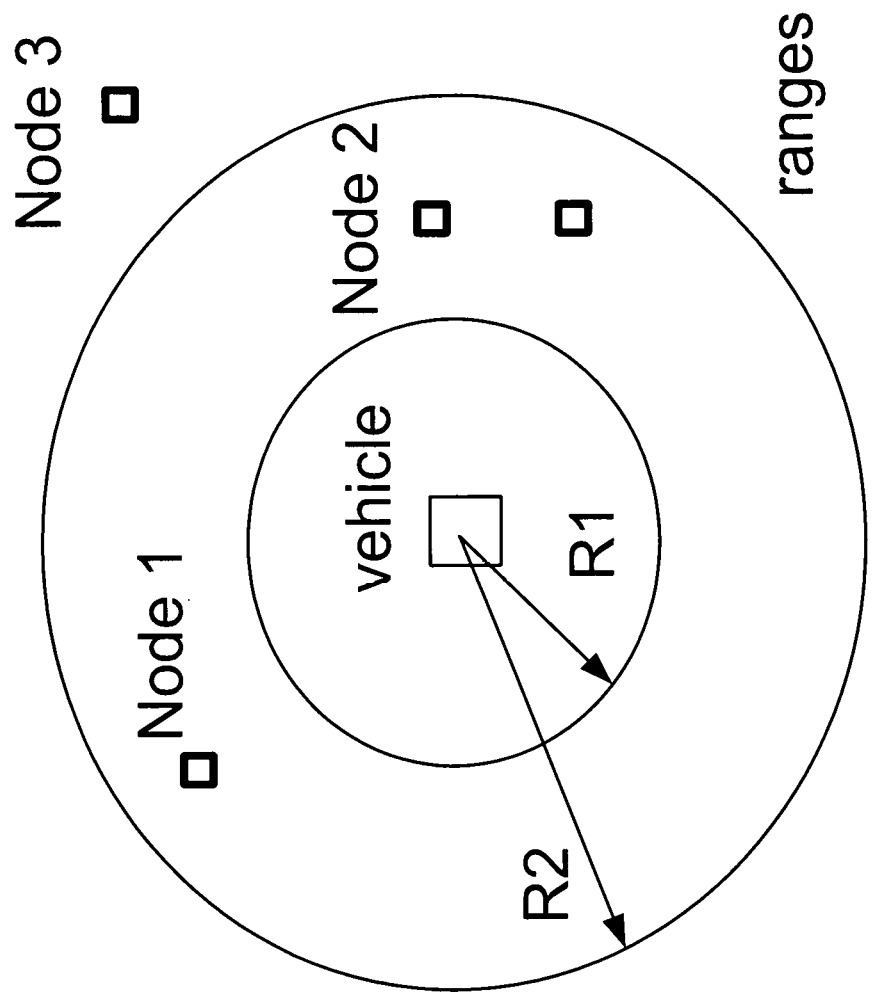
FIG. 10 is for one embodiment of the invention, for a system for host vehicle, range of R values, region(s) defined, multiple nodes or vehicles inside and outside region(s), for communications between networks and vehicles, and warning decisions or filtering purposes.
Figure 11:
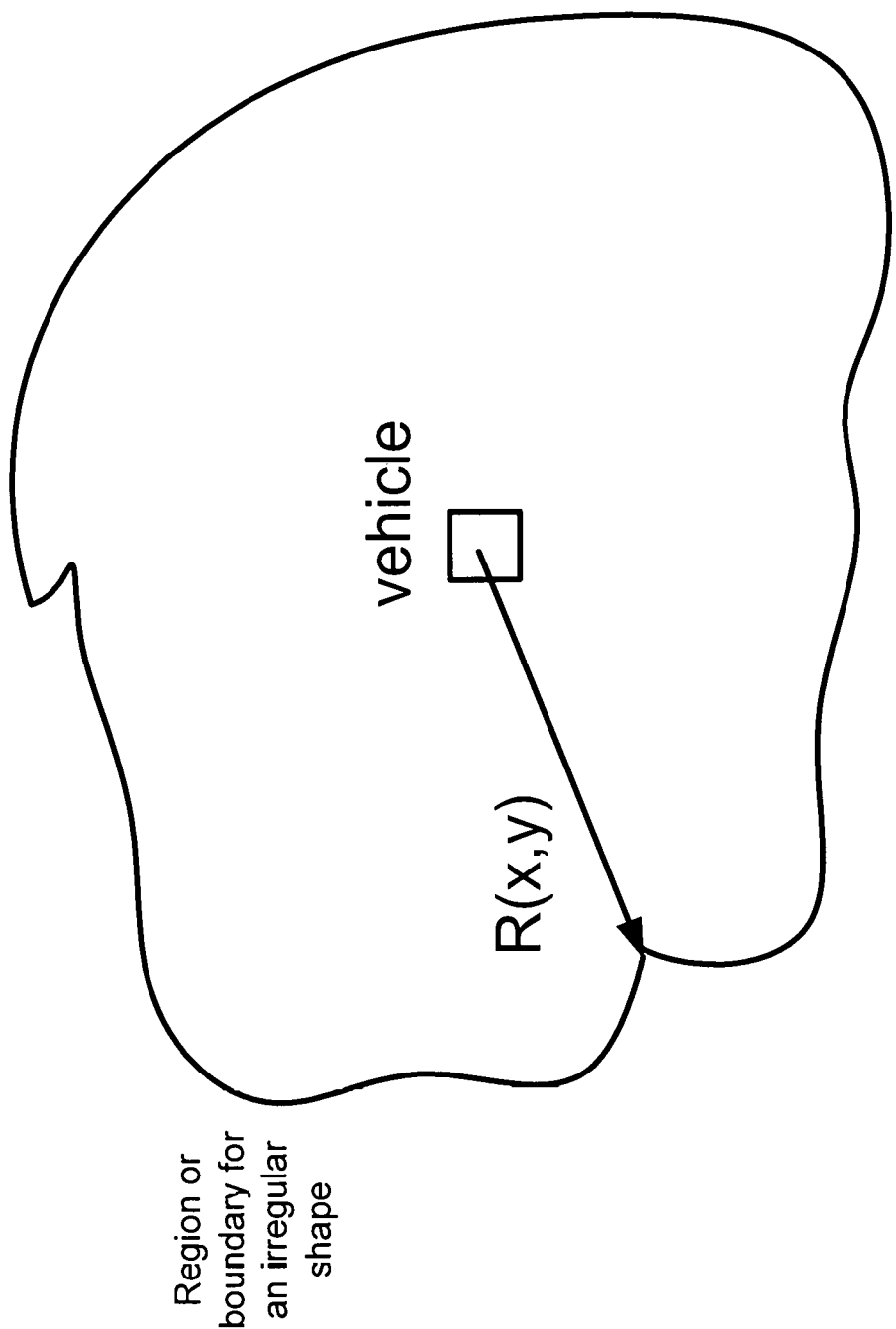
FIG. 11 is for one embodiment of the invention, for a system for host vehicle, range of R values, region(s) defined, for an irregular shape(s), depending on (x,y) coordinates in 2D (dimensional) coordinates, defining the boundaries.

FIG. 10 is for one embodiment of the invention, for a system for host vehicle, range of R values, region(s) defined, multiple nodes or vehicles inside and outside region(s), for communications between networks and vehicles, and warning decisions or filtering purposes, for various filters to reduce computations and reduce the bandwidth needed to handle the message traffic. FIG. 11 is for one embodiment of the invention, for a system for host vehicle, range of R values, region(s) defined, for an irregular shape(s), depending on (x,y) coordinates in 2D (dimensional) coordinates, defining the boundaries, or in 3D for crossing highways in different heights, if connecting.

Figure 12:
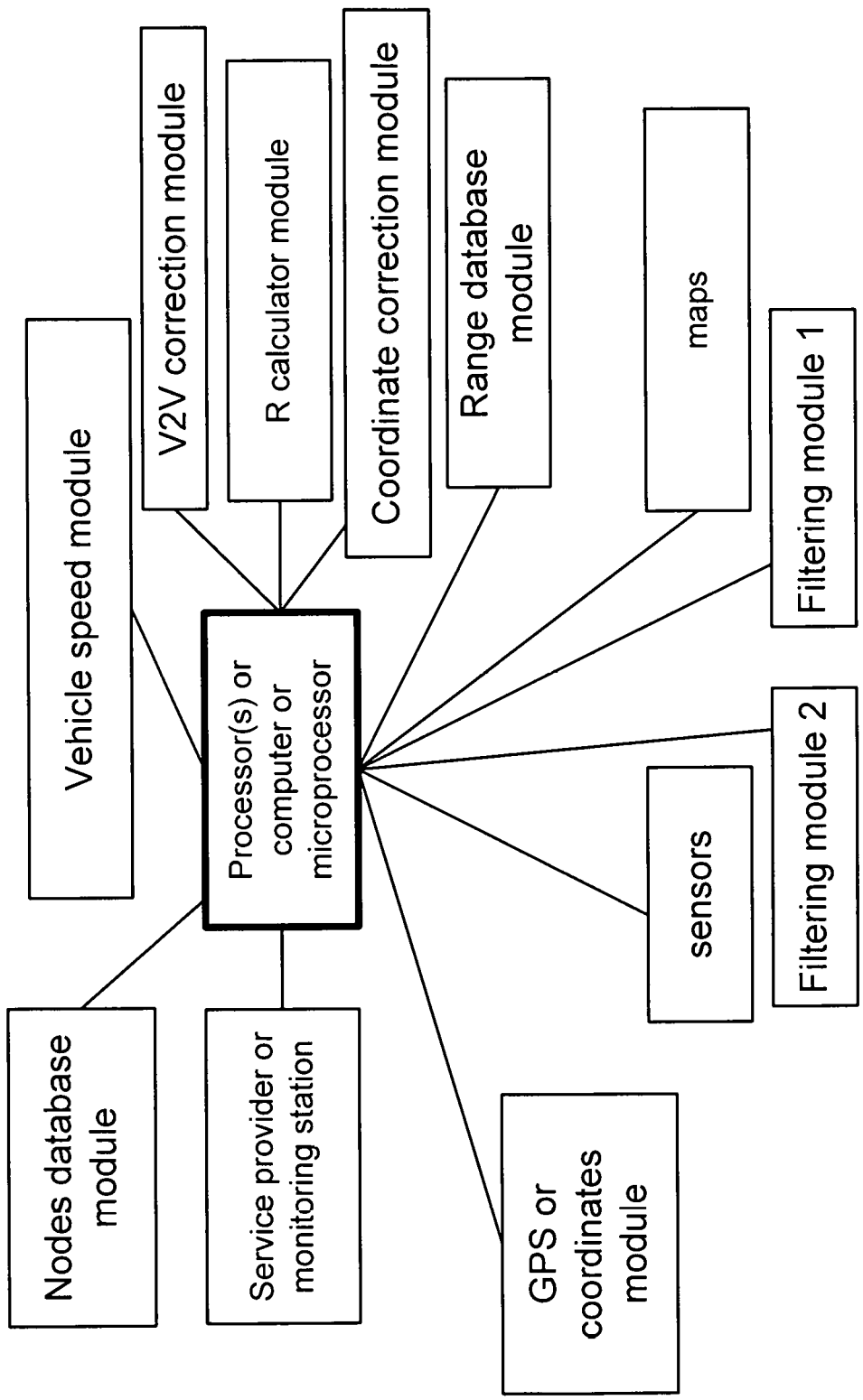
FIG. 12 is for one embodiment of the invention, for a system for automated vehicles, with components, with one or more filtering modules.
Figure 13:
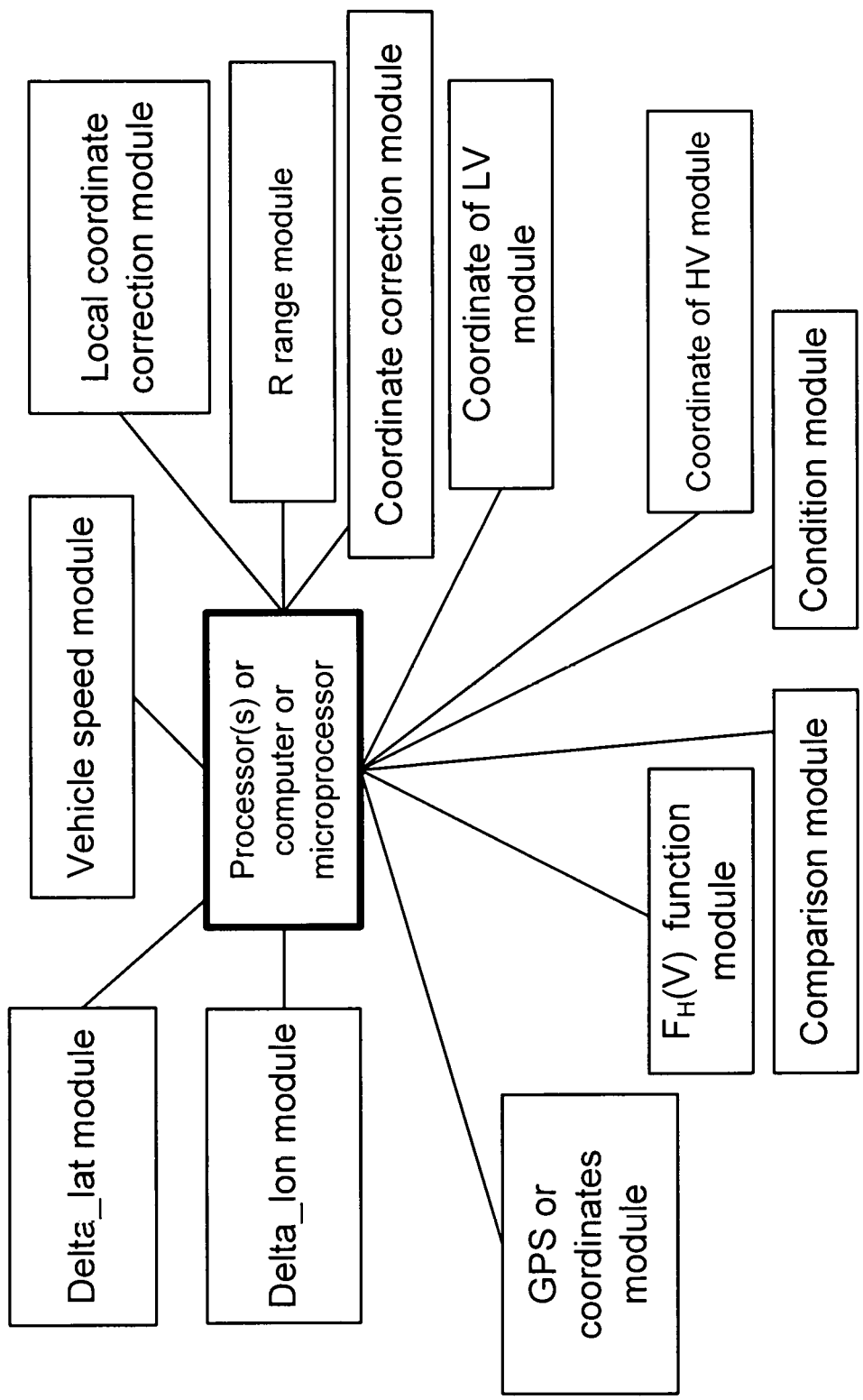
FIG. 13 is for one embodiment of the invention, for a system for automated vehicles, with components, with a function F( ), e.g., depending on the velocity of the vehicle, for calculations for Lat and Lon coordinates, and their corresponding deltas or differences.

FIG. 12 is for one embodiment of the invention, for a system for automated vehicles, with components, with one or more filtering modules, based on coordinates, Rs, GPS, and maps, and their corresponding corrections. FIG. 13 is for one embodiment of the invention, for a system for automated vehicles, with components, with a function F( ), e.g., depending on the velocity of the vehicle, for calculations for Lat and Lon coordinates, and their corresponding deltas or differences, with local and global coordinate correction module(s).

Figure 14:
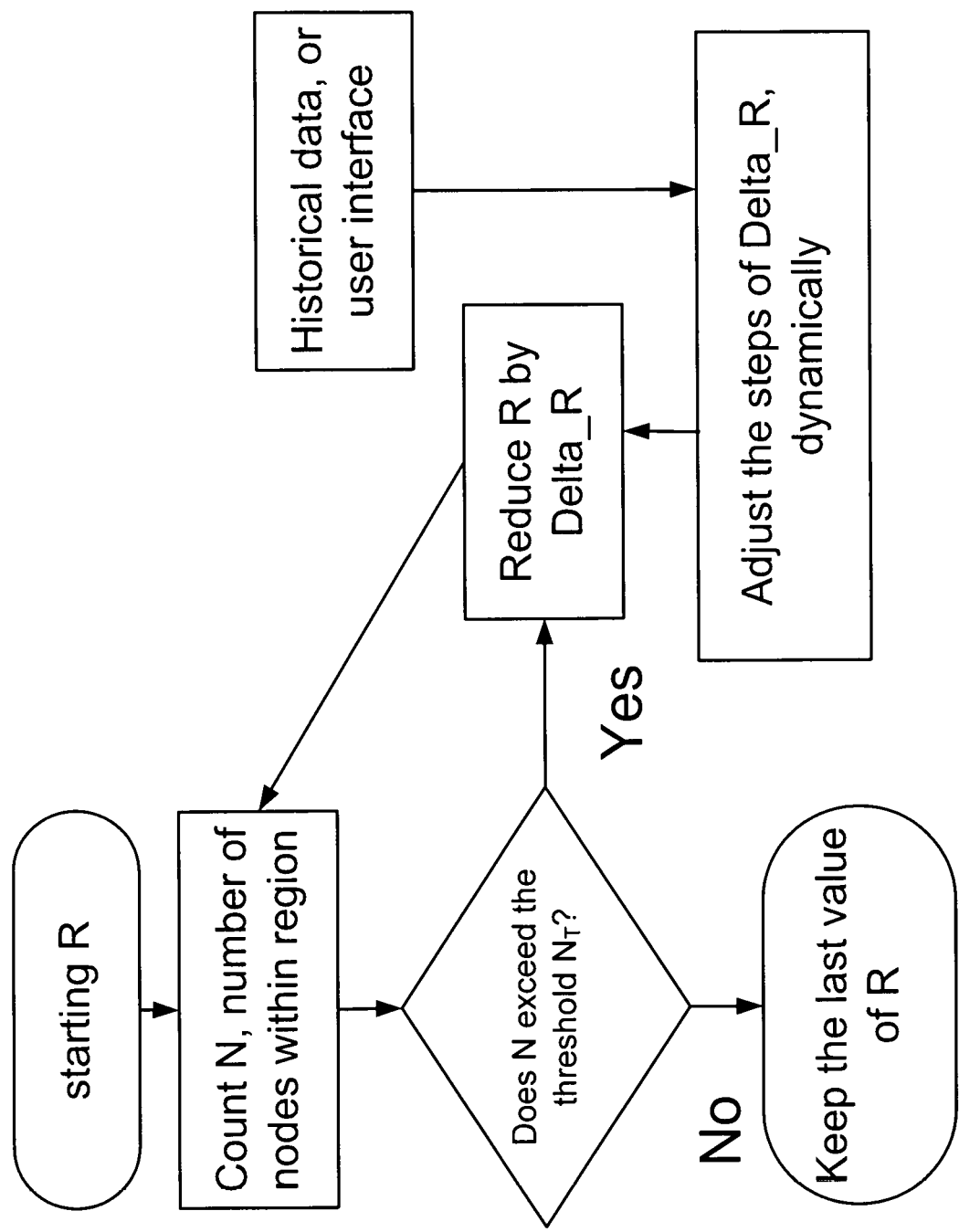
FIG. 14 is for one embodiment of the invention, for a method for automated vehicles, for adjusting R dynamically, based on rules engine, historical data, user-interface, or neural network.
Figure 15:
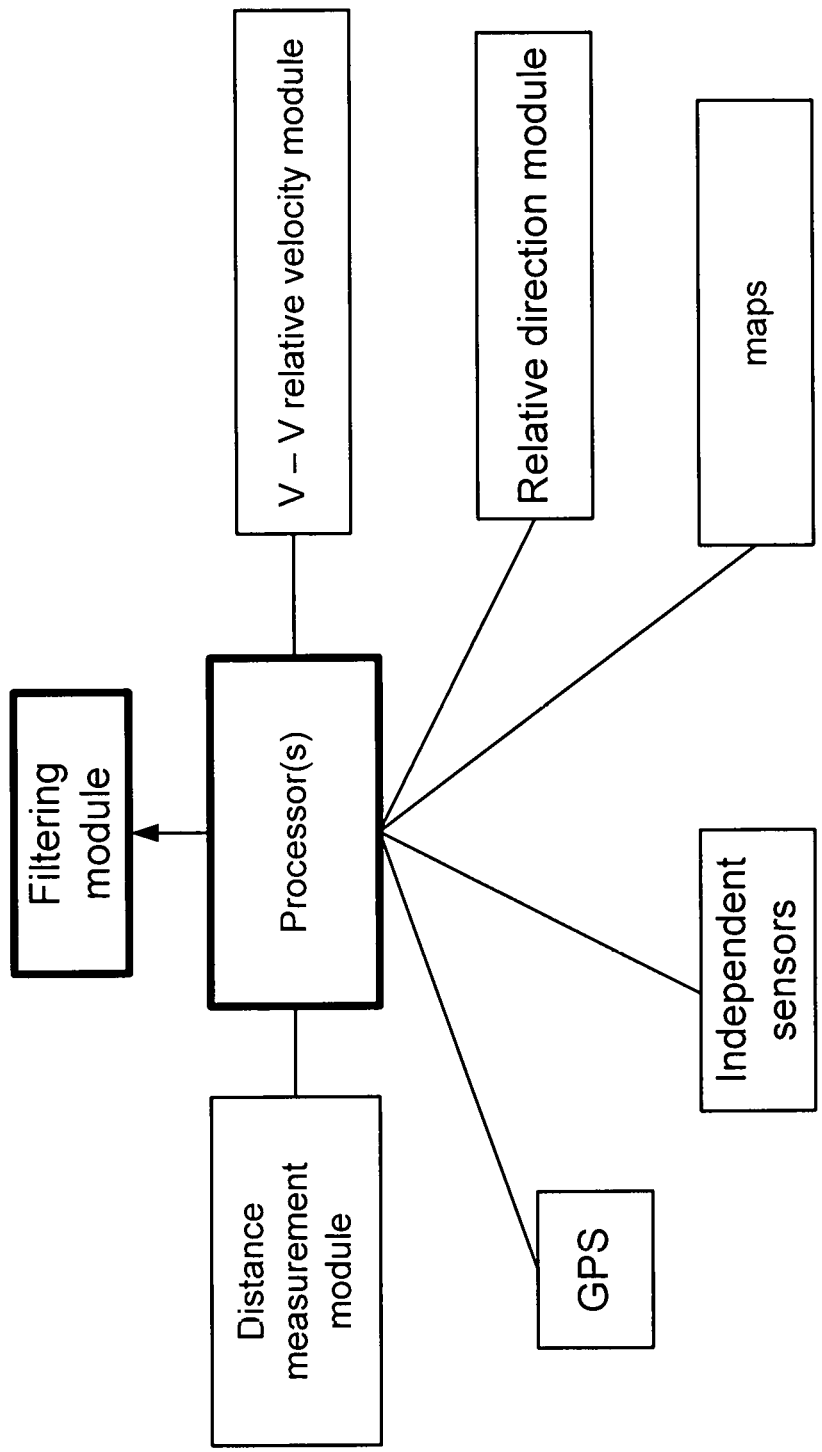
FIG. 15 is for one embodiment of the invention, for a system for automated vehicles, for filtering module, for direction, velocity, and distance.

FIG. 14 is for one embodiment of the invention, for a method for automated vehicles, for adjusting R dynamically, based on rules engine, historical data, user-interface, or neural network, e.g., for filtering purpose. FIG. 15 is for one embodiment of the invention, for a system for automated vehicles, for filtering module, for direction, velocity, and distance, e.g., using independent sensors and GPS.

Figure 16:
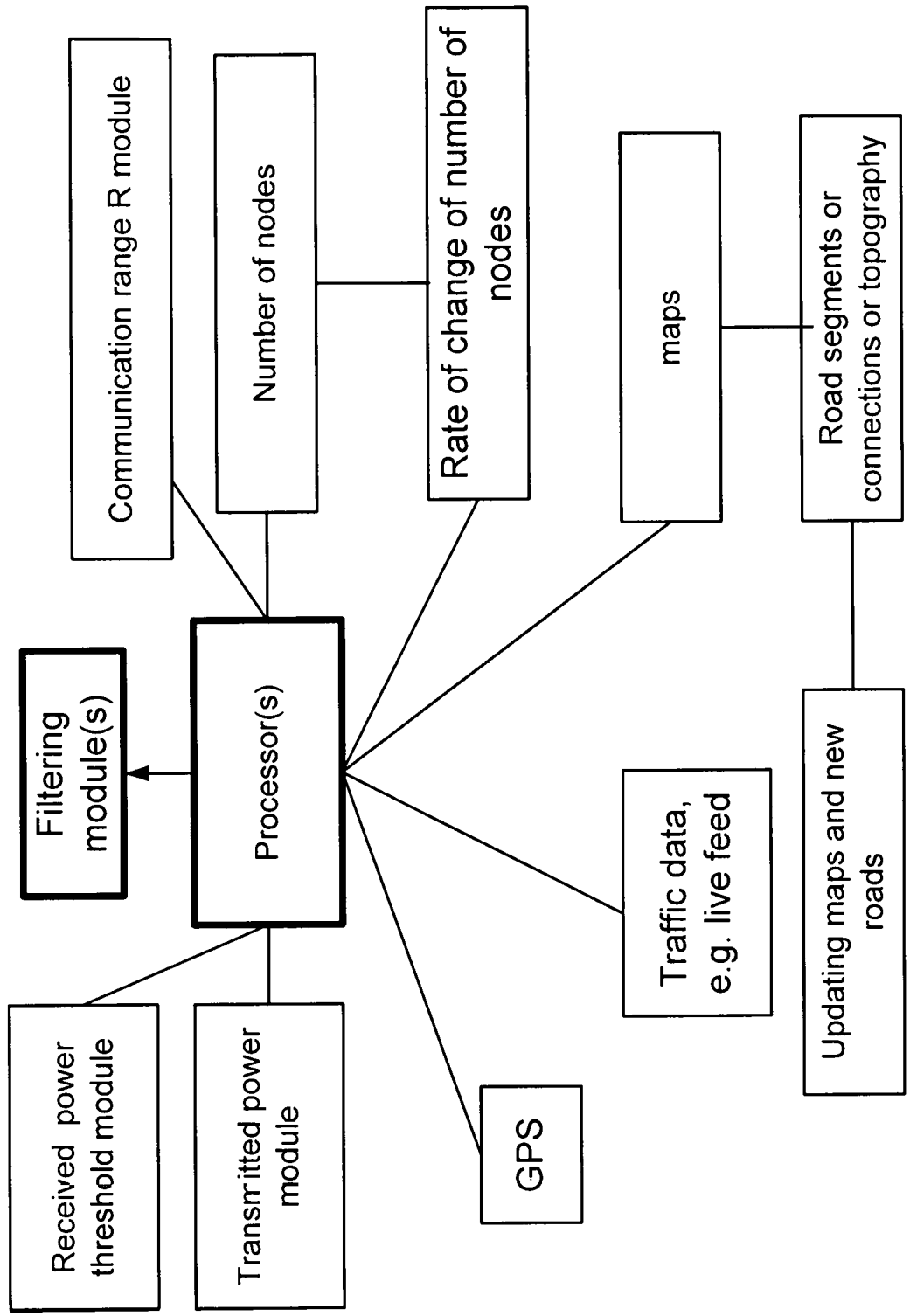
FIG. 16 is for one embodiment of the invention, for a system for automated vehicles, for filtering module, for power, power threshold(s), traffic data, maps, topography, R, number of nodes, and rate of change of number of nodes.

FIG. 16 is for one embodiment of the invention, for a system for automated vehicles, for filtering module, for power, power threshold(s), traffic data, maps, topography, R, number of nodes, and rate of change of number of nodes, with a module for updating the new roads, intersections, and topographies, by user or automatically, as a feed, e.g. periodically or based on an event.

Figure 17:
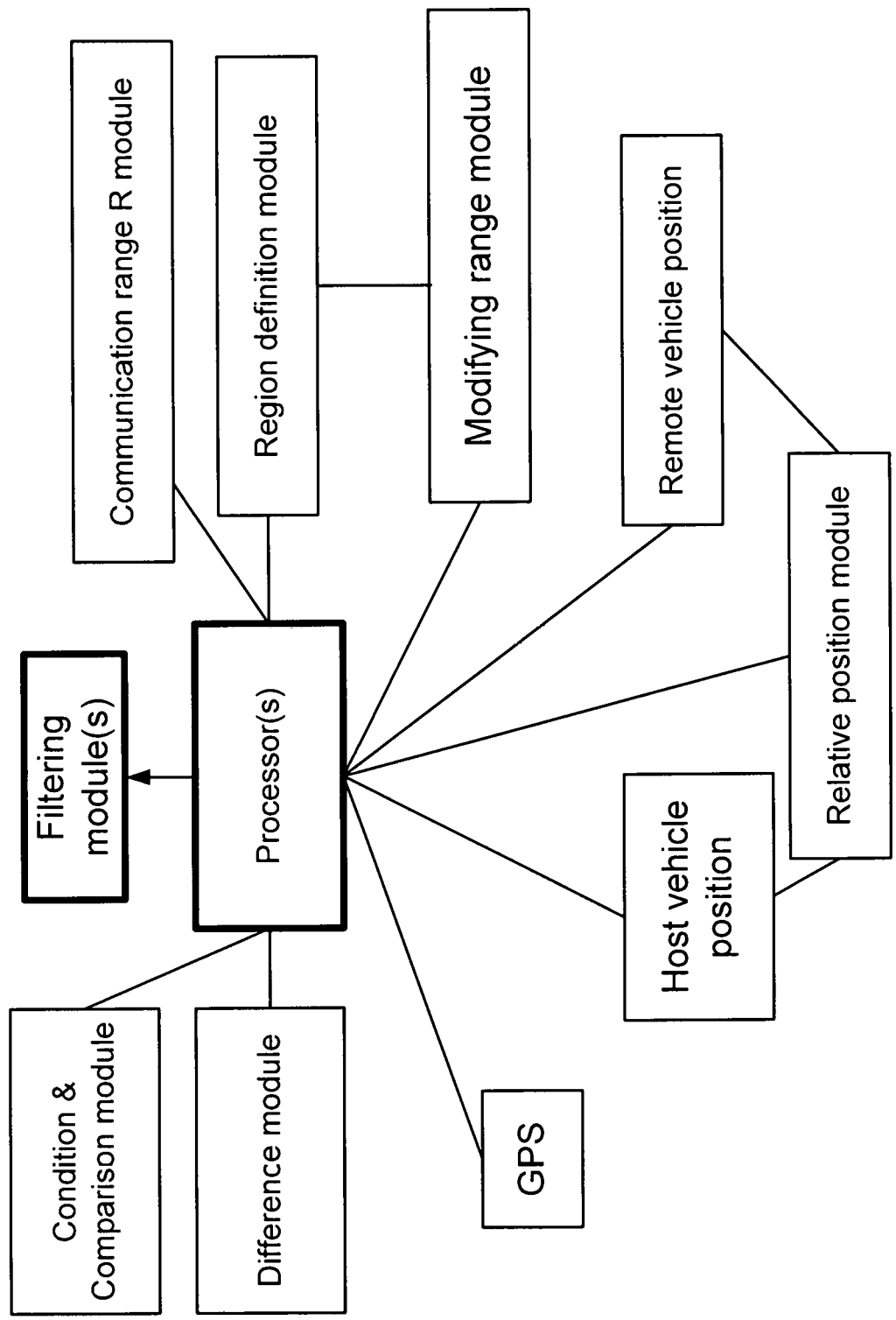
FIG. 17 is for one embodiment of the invention, for a system for automated vehicles, for filtering module, for various vehicles.

FIG. 17 is for one embodiment of the invention, for a system for automated vehicles, for filtering module, for modifying region, for various vehicles, with relative position module and GPS, with condition module, to compare and get all the relevant nodes or vehicles.

Here, we describe a method, as one embodiment: The first level of filtering is based on defining circle (geometry) of interest or any other geometrical shape (see also FIG. 11). For the circular geometry case, the objective is to ignore (not process) all nodes (vehicles) that is outside a calculated radius R (see also FIG. 10). In one embodiment, the R is calculated based on the targeted safety applications combined with vehicle dynamics. For example, FCW (forward collision warning), BSW (blind spot warning), LCA (lane change assist), IMA (intersection movement assist), and CSW can all be implemented using 200 m (meter) radius. In one embodiment, as the vehicle speed decreases, the forward application required coverage range decreases.

In one embodiment, for example, for calculating R, we have (see also FIG. 13):

R, as a function of host vehicle speed, $F_H$, e.g.:

$$R=F_H(V)=50+2V+(V^2/8)$$

Where V is the host vehicle speed in m/s.

In one embodiment, F is a function of velocities, distances, and coordinates, both in absolute values and relative values, for host and other vehicles. In one embodiment, F is a function of polynomial of degree G, in host vehicle speed V. In the example above, we have: G=2.

For example, for: 70 m≤R≤200 m

That is, Maximum (R)=200 m, and

Minimum (R)=70 m.

The 70 meter will still be sufficient to do all the rear applications. These numbers are just examples for some specific applications.

In one embodiment, the next step is to convert this R to delta Longitudinal and delta Latitude from the host vehicle coordinate. The objective here is to ignore all vehicles that are outside a radius. Here, we assumed circular filtering. Different types of geometric filtering can also be done: rectangle, ellipse, other irregular geometry, or any other regions or shapes. For circular filtering, given the current host vehicle (HV) coordinate (lat_HV, lon_HV), and given the desired filtering radius R, then the equivalent delta latitude (Delta_lat) and delta longitudinal (Delta_lon), from (lat_HV, lon_HV) for this radius R, are calculated as follows (see also FIG. 13):

$$\text{Delta\_lat}=(R/\text{Radius of earth})=(R/6378137),$$

e.g., based on Earth Equatorial radius of 6378137 m, and where R is in meter (m).

$$\text{Delta\_lon}=\arcsin(\sin(\text{Delta\_lat})/\cos(\text{lat}\_HV))$$

Therefore, in one embodiment, to apply the filtering algorithm for any node (Remote Vehicle (RV)), with the coordinate of (lat_RV, lon_RV), the following is executed (see also FIG. 13, for Comparison Module and Condition Module):

If $$\text{Abs}(\text{lat}\_RV-\text{lat}\_HV)>\text{Delta}\_\text{lat}$$

OR $$\text{Abs}(\text{lon}\_RV-\text{lon}\_HV)>\text{Delta}\_\text{lon}$$

Then: Ignore it (i.e., do not process it).

Else: Process it.

Wherein all "lat" and "lon" values are expressed in radian. The default value for R is 200 m, but it is configurable. For jam reduction and reduction of processing, in one embodiment, we want to ignore all the vehicles outside of the radius R.

Now, in one embodiment, this value of R can be adaptively adjusted based on the statistical distribution of the nodes ranges (see also FIG. 12). For example, if the maximum number of nodes that can be processed is 150, and the calculated R=200 m, and the number of nodes in the 200 m radius is 200 nodes, but most of those nodes are close to the 200 m range, then the R value can be adaptively adjusted (reduced), so we get close to the 150 desired total numbers of nodes. For example, this can be done in small steps with ΔR, in a loop, reducing the value of R slightly, each time (in each step), and measuring the nodes or vehicles within the new radius, and the process continues, until we get 150 nodes or less in that radius, and then we exit the loop, and stop the process (see also FIG. 14). Then, we select the final radius as the radius for the formulation and next steps.

In one embodiment, the second level of filtering is based on the relative velocity between the host vehicle and the remote vehicle. For example, for all remote vehicles that have a value of the velocity component in host vehicle direction that is greater than the host vehicle velocity, and they are also at relatively high range distance from the host vehicle, then they constitute no immediate threat on the host vehicle (based on the probability) (see also FIG. 15). Thus, those vehicles can be filtered out.

In one embodiment, the third level of filtering is to adjust either the transmitted power and/or the received power threshold as a function of one of the following (as different embodiments) (see also FIG. 16):

a. Rate of change in the number of received nodes. As the number of nodes increases sharply, the host vehicle is approaching a congested traffic area, and therefore, the transmitted power can be decreased to reduce the communication range, and/or the received power threshold can be increased to reduce the receiving communication range (see also FIG. 16).

b. The map database can also be used very effectively: For example, if the number of connected road segments to the host vehicle road segment is high, and/or the total number of road segments is high within a defined area, then the transmitted power can be decreased, and/or the received power threshold can be increased (see also FIG. 16).

c. Based on the calculated R. For example, communication range R decreases/increases, as the transmission power increases/decreases (see also FIG. 16).

In one embodiment, the fourth level of filtering is just using the map database: For example, filter all the nodes (vehicles) that are on road segments that are not connected to the host vehicle road segment. An example for that is the main road and an overpass geometry. The main road and the overpass that passes over it are not connected, and thus, they do not make a V2V (vehicle to vehicle) possible traffic hazard. Map database can provide this information that these two road segments are not connected (see also FIG. 16).

The advantages of our methods are very clear over what the current state-of-the-art is. Our methods optimally use the available processing power and available bandwidth on processing the data of the desired nodes, which are relevant or important.

They also help reducing the communication congestion problem.

Tracking the Heading Angle of the Pedestrian

Here, we describe embodiments for tracking the heading angle of the pedestrian system and method.

The purpose of this approach is to track the heading angle of the pedestrian using existing sensors integrated in to a smart phone device or other mobile devices, e.g., wearables or smart watches.

The system tries to use the following data when it is available:

a. GPS—GPS position—GPS speed—GPS heading
b. Compass heading
c. Three rotation measurements (pitch, yaw, roll)
d. Three acceleration measurements (down, longitudinal, lateral)

In general, when a pedestrian is moving, it is an easy task to track its positions, and therefore, its heading. However, when the pedestrian is stopped, but changing his direction, tracking the heading, as his intended direction of travel, becomes a more difficult job. (See FIG. 41.)

High level algorithm:

Step 1:

Calculate heading from GPS position:

$\psi_p = \text{arcTan}(\Delta E/\Delta N)$. (arc tan is the tan inverse function)

Figure 42:
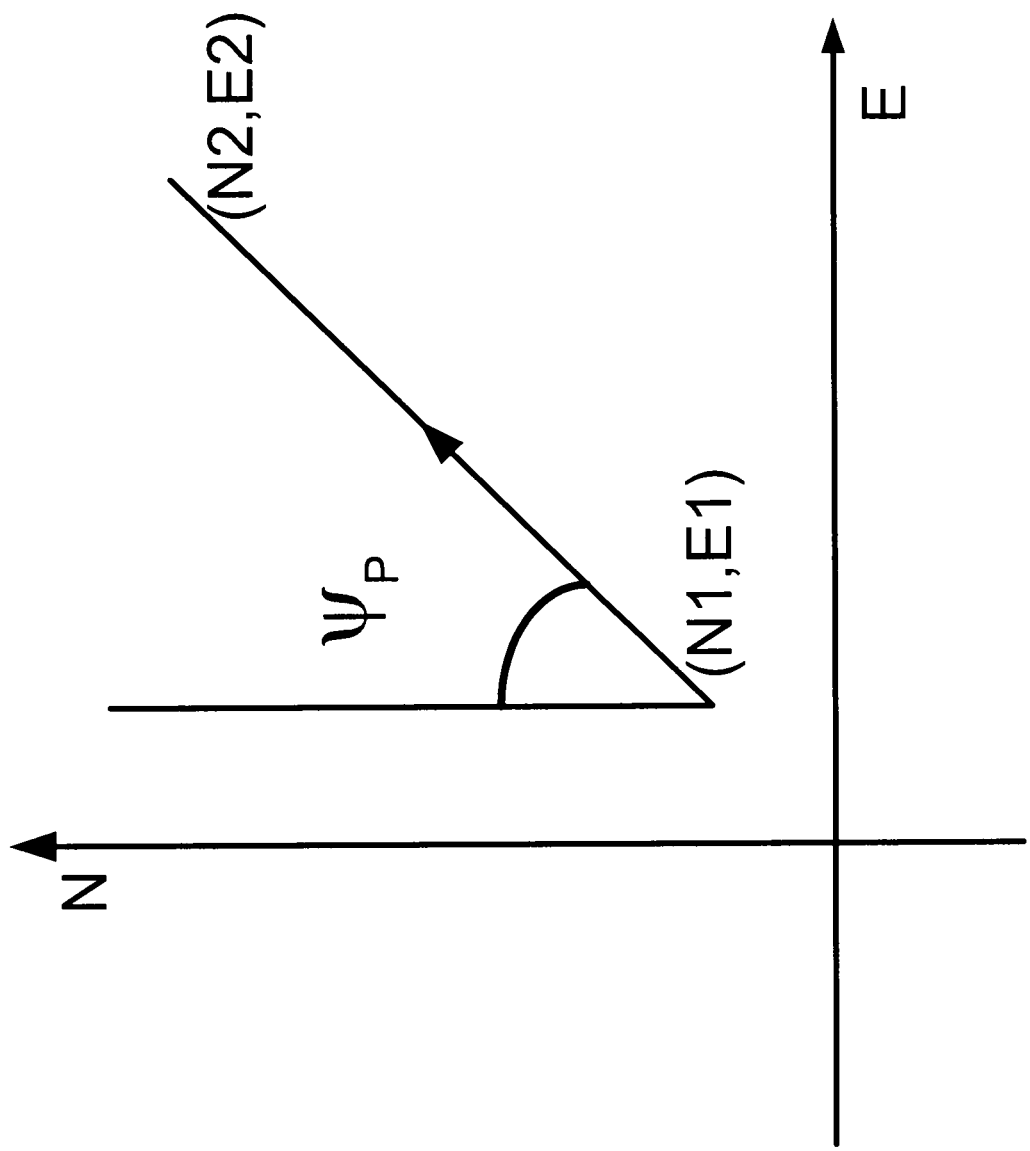
FIG. 42 is for one embodiment of the invention, for a system, for direction, for the angle with respect to the coordinate system, with N-E axes.

See FIG. 42.

To see a significance difference in the position from one time epoch to a later one, this equation may apply at a lower data rate.

Step 2:

Based on the heading measurement, $\psi_{GPS}$, and/or the calculated one, $\psi_p$, try to best-match the pedestrian walk with the intended intersection segment. This will be the initial high probability candidate (IC1). The second candidate is the one perpendicular to it (IC2). See FIG. 43.

Step 3:

Determine if the pedestrian stopped.

a. Detect a drop in speed. Watch the speed profile and look for a drop from a consistent profile. See FIG. 44.
b. Look for a centralized cloud of positions. See FIG. 45.
c. Watch for increase in longitudinal acceleration (−ve), after a consistent behavior. See FIG. 46.

At the end of Step 3, the pedestrian stop flag will either be set (value=1) or not changed at all (value=0).

Step 4:

If the stop flag is never set and the position of the pedestrian is within G=2 meter radius from the surveyed edge of the intersection, then IC1 is held as the intended driving path.

Step 5:

If StopFlag=1, then it is important to watch the behavior of the compass heading angle, $\psi_c$, before the stop and during the stop. See FIGS. 47 and 48. We are looking to detect a behavior like this.

We are trying to capture a turn maneuver by the pedestrian. Another way of doing it, if yaw rate signal is available, is to watch integration of the yaw rate for a window of T=1-2 sec. See FIGS. 49-50.

Step 6:

Offset the last $\psi_p$ and/or $\psi_{GPS}$ (before stop) by the value of $\Delta\psi_c$ or $\Delta\psi$(call it $\psi_p$ corrected). (See above.)

Step 7:

Repeat Step 3 with $\psi_p$ corrected.

Step 8:

Once the pedestrian starts walking again, check how the $\psi_p$-corrected is correlated with the new $\psi_p$.

FIGS. 51-54 show the embodiments of the systems of this invention.

Here are some examples: A method for safe crossing for pedestrians in a street or highway, said method comprising: a central computer receiving global positioning system location data for a pedestrian during a first time period from a remote location; said central computer calculating an angle for heading and a vector for direction of said pedestrian, using said global positioning system location data for said pedestrian during said first time period; said central computer predicting a first choice candidate for intended intersection segment for said pedestrian to cross, based on said angle for heading and said vector for said direction of said pedestrian; said central computer predicting a second choice candidate for intended intersection segment for said pedestrian to cross, based on said angle for heading and said vector for said direction of said pedestrian; wherein said first choice candidate for intended intersection segment for said pedestrian to cross is perpendicular to said second choice candidate for intended intersection segment for said pedestrian to cross; said central computer monitoring speed profile for said pedestrian.

If said central computer detects a drop from consistent range of said speed profile for said pedestrian, then said central computer determining that said pedestrian is stopping; said central computer determining cluster of positions for said pedestrian at rest status; said central computer monitoring acceleration profile for said pedestrian in 3 different dimensions; if said central computer detects a large negative drop from consistent range of said acceleration profile for said pedestrian, then said central computer determining that said pedestrian is stopping; said central computer receiving a flag value for rest status; said central computer receiving a radius value threshold distance; if said flag value for rest status is not true, and if distance between location of said pedestrian to an edge of an intersection for a street or highway is less than said radius value threshold distance, then said central computer selecting said first choice candidate for intended intersection segment for said pedestrian to cross.

If said flag value for rest status is true, then said central computer evaluating behavior of said angle for heading for said direction of said pedestrian, before and during a stop event; a computation module integrating yaw rate for said pedestrian, for a second time period, to get an integrated yaw rate; said central computer receiving said integrated yaw rate from said computation module; said central computer offsetting said angle for heading for said direction of said pedestrian by said integrated yaw rate, to get a corrected angle for heading for said direction of said pedestrian; said central computer determining if said pedestrian is stopping, using said corrected angle for heading for said direction of said pedestrian, if said central computer detects that said pedestrian is walking, said central computer evaluating how said corrected angle for heading for said direction of said pedestrian correlates with a recent value of said angle for heading for said direction of said pedestrian.

Other features are:
monitoring multiple people.
monitoring multiple cars.
monitoring multiple intersections.
warning multiple people.
warning multiple cars.
monitoring multiple global positioning values.
monitoring multiple global positioning devices.
communicating with multiple satellites.
communicating with multiple telephone companies.
communicating with multiple service providers.
connecting cars with pedestrians.
communicating with cars.
communicating with pedestrians.
communicating with cloud.
communicating with server farms.
communicating with police.
alarming police.
scanning intersections with more than 4 outlets or roads.
correcting position data by local devices positioned at intersections, based on interactions with cell phones of pedestrians nearby, to register and record the position, and then later, compare those with other data, e.g., by satellite or GPS or maps.

Here are other embodiments:

A method for positioning based on geofencing framework for a road vehicle navigation system for a vehicle, said method comprising: a central computer receiving vehicle states for said vehicle; said central computer receiving yaw rate bias; said central computer removing said yaw rate bias; a processor determining whether reference road exists; in case said reference road exists, said processor determining whether said reference road is valid; in case said reference road is valid, said processor determining whether a lane change is detected for said vehicle; in case said lane change is detected for said vehicle, performing retrospective integrations of speed and yaw rate for said vehicle; said processor determining whether a yaw rate error is small; in case said yaw rate error is small, forcing said vehicle's heading angle to road heading angle; said processor updating said vehicle states; said processor evaluating geofencing conditions; said processor determining whether said geofencing conditions are met; in case said geofencing conditions are met, applying geofencing for said vehicle; updating said vehicle's position data; and outputting said vehicle's position data to upper layer of said road vehicle navigation system for said vehicle.

Here are other embodiments:
said road vehicle navigation system works with or communicates with a global navigation satellite system.
said vehicle is interior to said reference road.
distance to a next intersection is greater than a first threshold.
said vehicle's speed is greater than a second threshold.
said method comprises: timely geofencing.
said method comprises: predicted geofencing.
said method comprises: determining incorrect position.
said method comprises: determining correct position.
said method comprises: determining lateral error.
said method comprises: determining reference path.
said method comprises: determining longitudinal error.
said method comprises: determining predicted path.
said method comprises: determining average value.
said method comprises: determining sensor temperature.
said method comprises: determining vibration or noise.
said method comprises: applying security layer for said road vehicle navigation system for said vehicle.
said method comprises: applying application layer for said road vehicle navigation system for said vehicle.
said method comprises: applying network layer for said road vehicle navigation system for said vehicle.
said method comprises: applying physical layer for said road vehicle navigation system for said vehicle.

Figure 41:
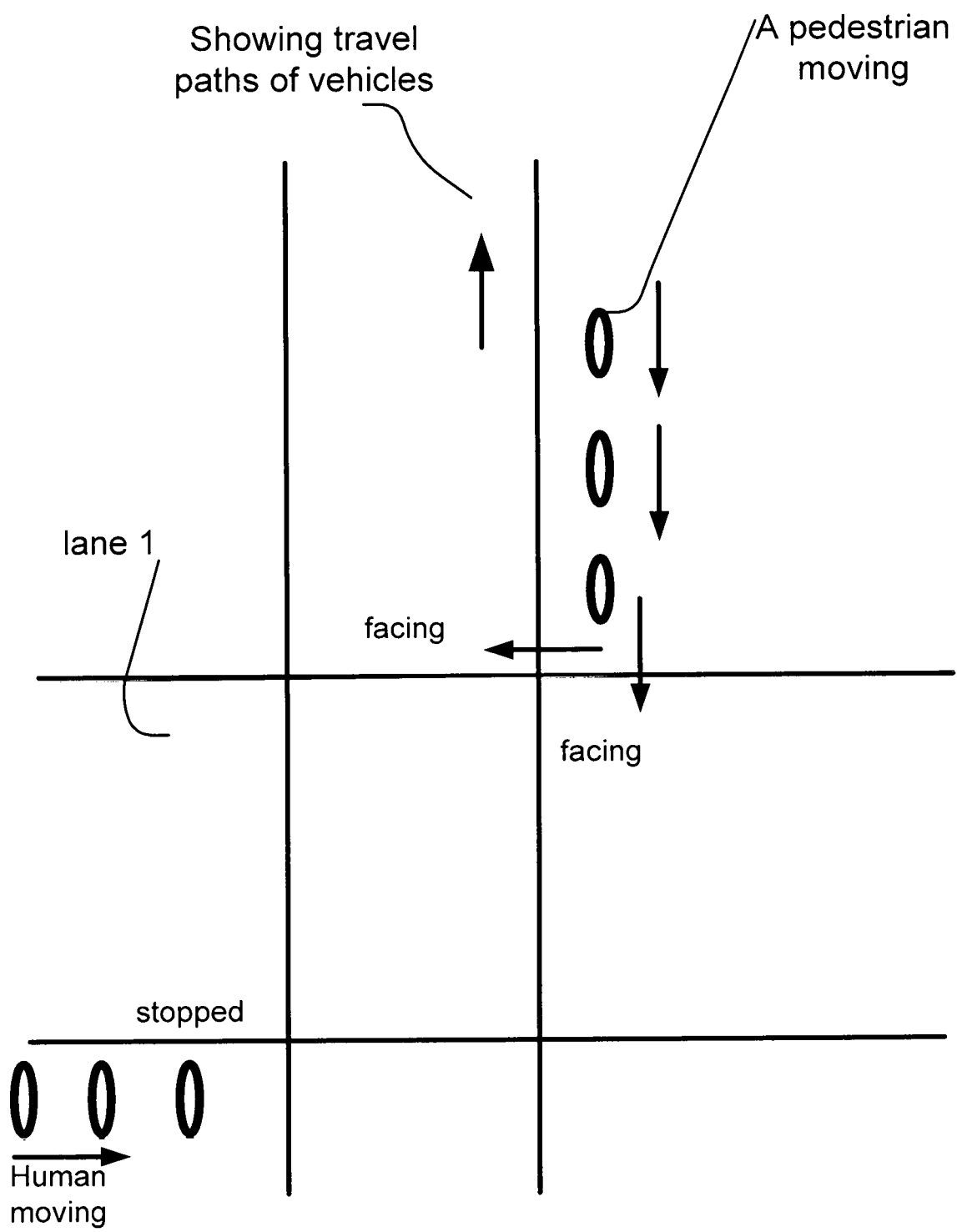
FIG. 41 is for one embodiment of the invention, for a system, for pedestrians moving at the intersection for a road.
Figure 43:
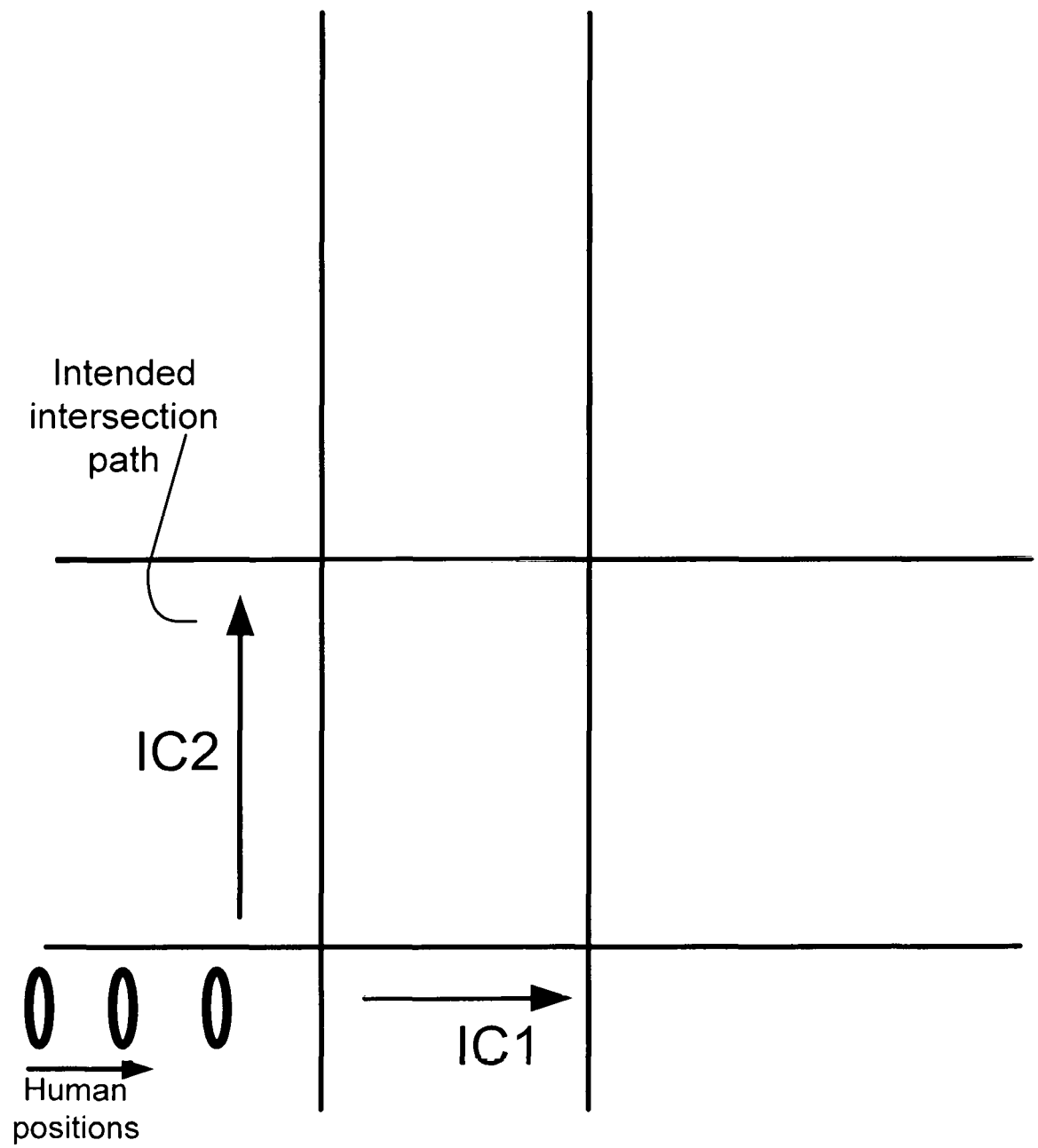
FIG. 43 is for one embodiment of the invention, for a system, for direction, for the intended intersection paths, for possibilities.

Here are some examples: FIG. 41 is for one embodiment of the invention, for a system, for pedestrians moving at the intersection for a road. FIG. 42 is for one embodiment of the invention, for a system, for direction, for the angle with respect to the coordinate system, with N-E axes. FIG. 43 is for one embodiment of the invention, for a system, for direction, for the intended intersection paths, for possibilities.

Figure 44:
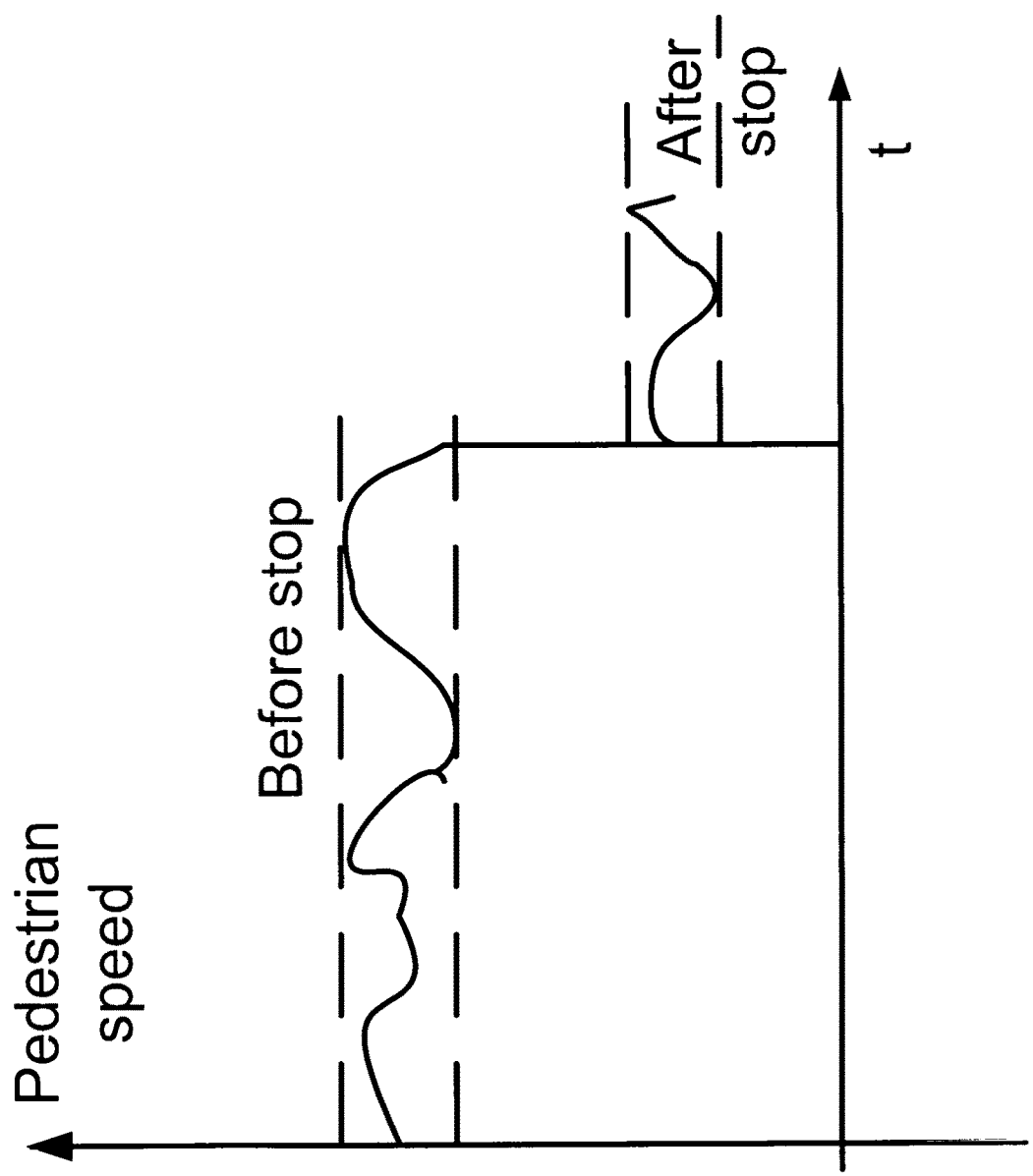
FIG. 44 is for one embodiment of the invention, for a system, for pedestrian speed, before and after the stop.
Figure 45:
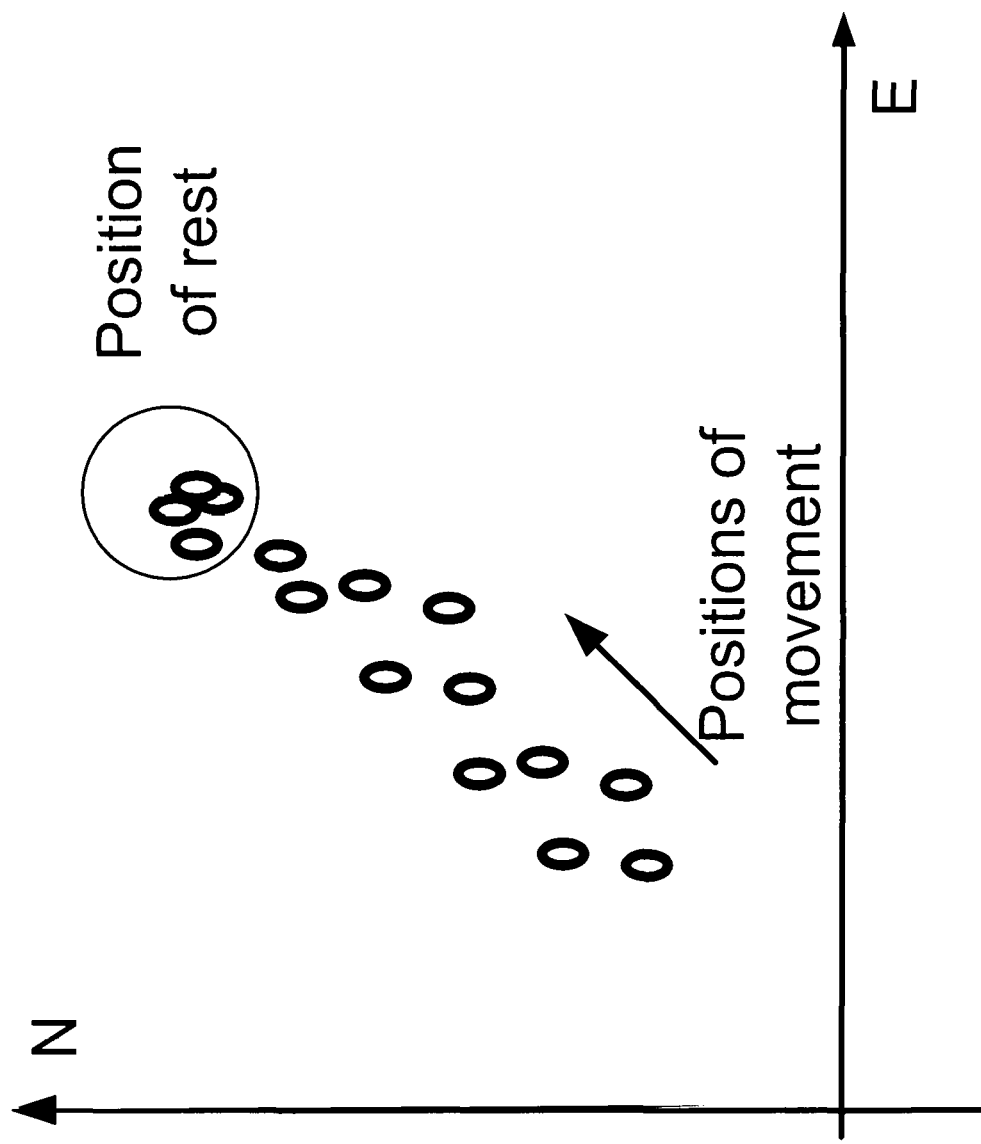
FIG. 45 is for one embodiment of the invention, for a system, for pedestrian movement, for positions, plus position at rest.
Figure 46:
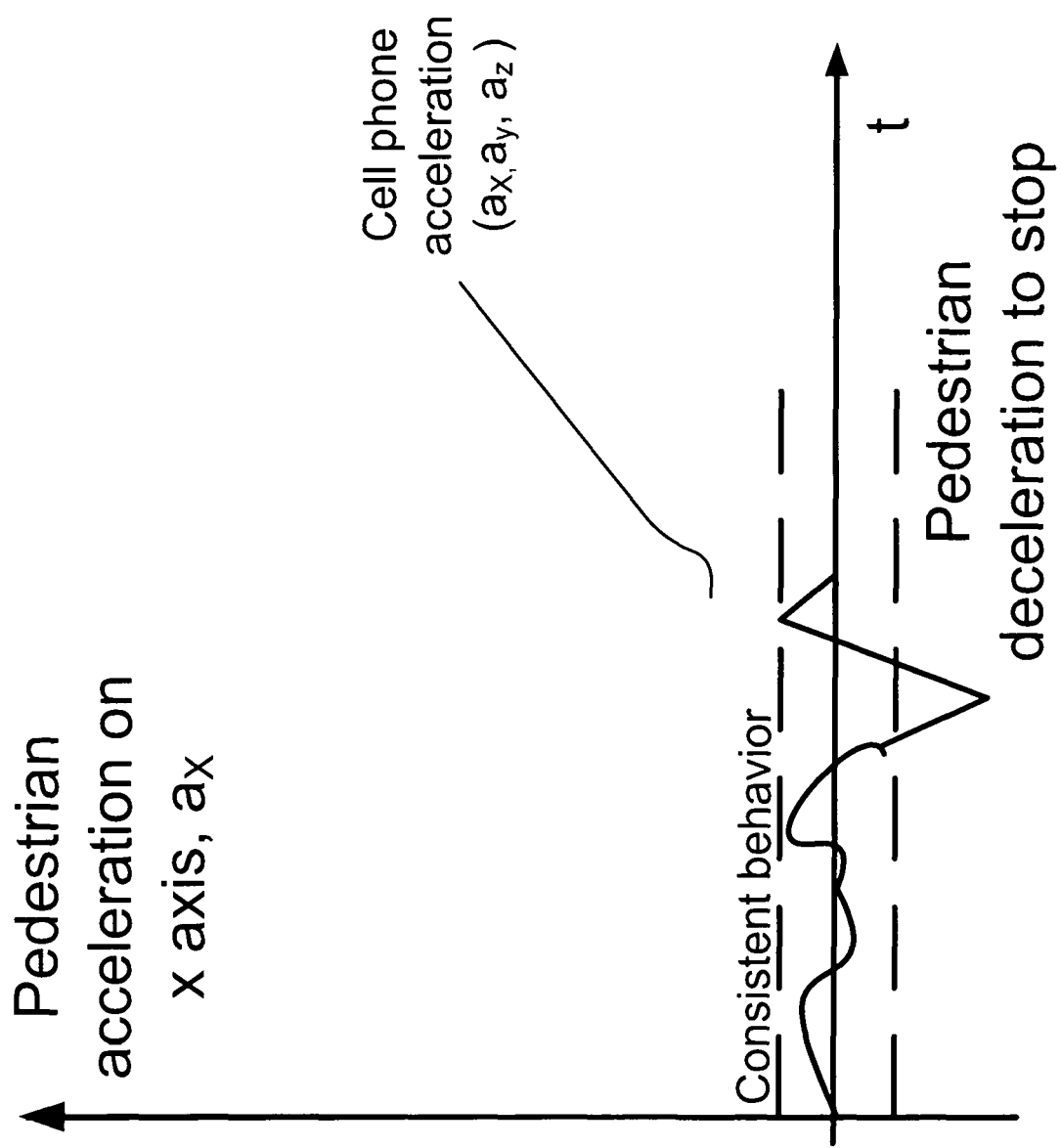
FIG. 46 is for one embodiment of the invention, for a system, for pedestrian acceleration, with consistent behavior, plus deceleration to stop.
Figure 47:
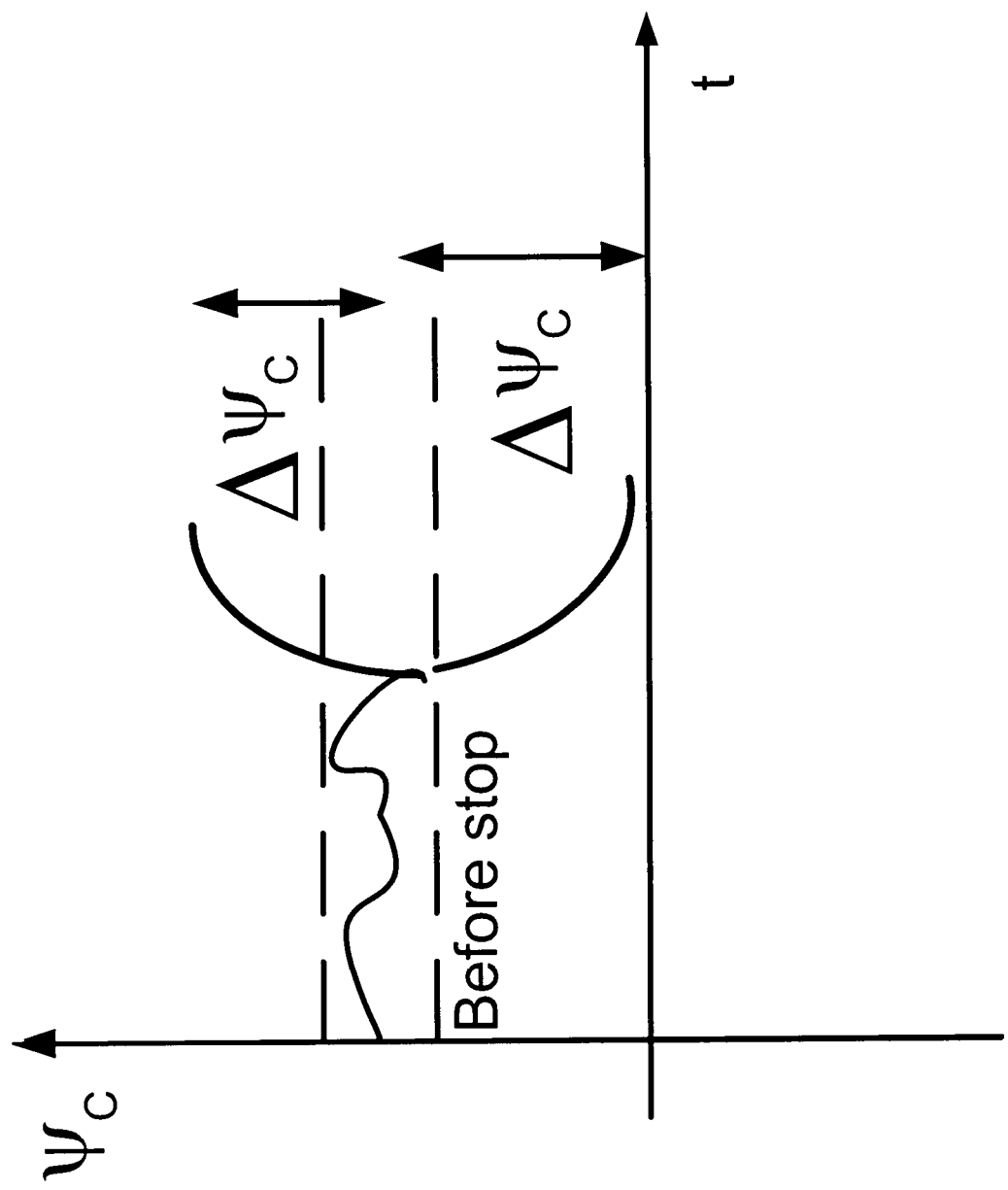
FIG. 47 is for one embodiment of the invention, for a system, for angle, before the stop, plus the delta angle, or the difference in angle.

FIG. 44 is for one embodiment of the invention, for a system, for pedestrian speed, before and after the stop. FIG. 45 is for one embodiment of the invention, for a system, for pedestrian movement, for positions, plus position at rest. FIG. 46 is for one embodiment of the invention, for a system, for pedestrian acceleration, with consistent behavior, plus deceleration to stop. FIG. 47 is for one embodiment of the invention, for a system, for angle, before the stop, plus the delta angle, or the difference in angle.

Figure 48:
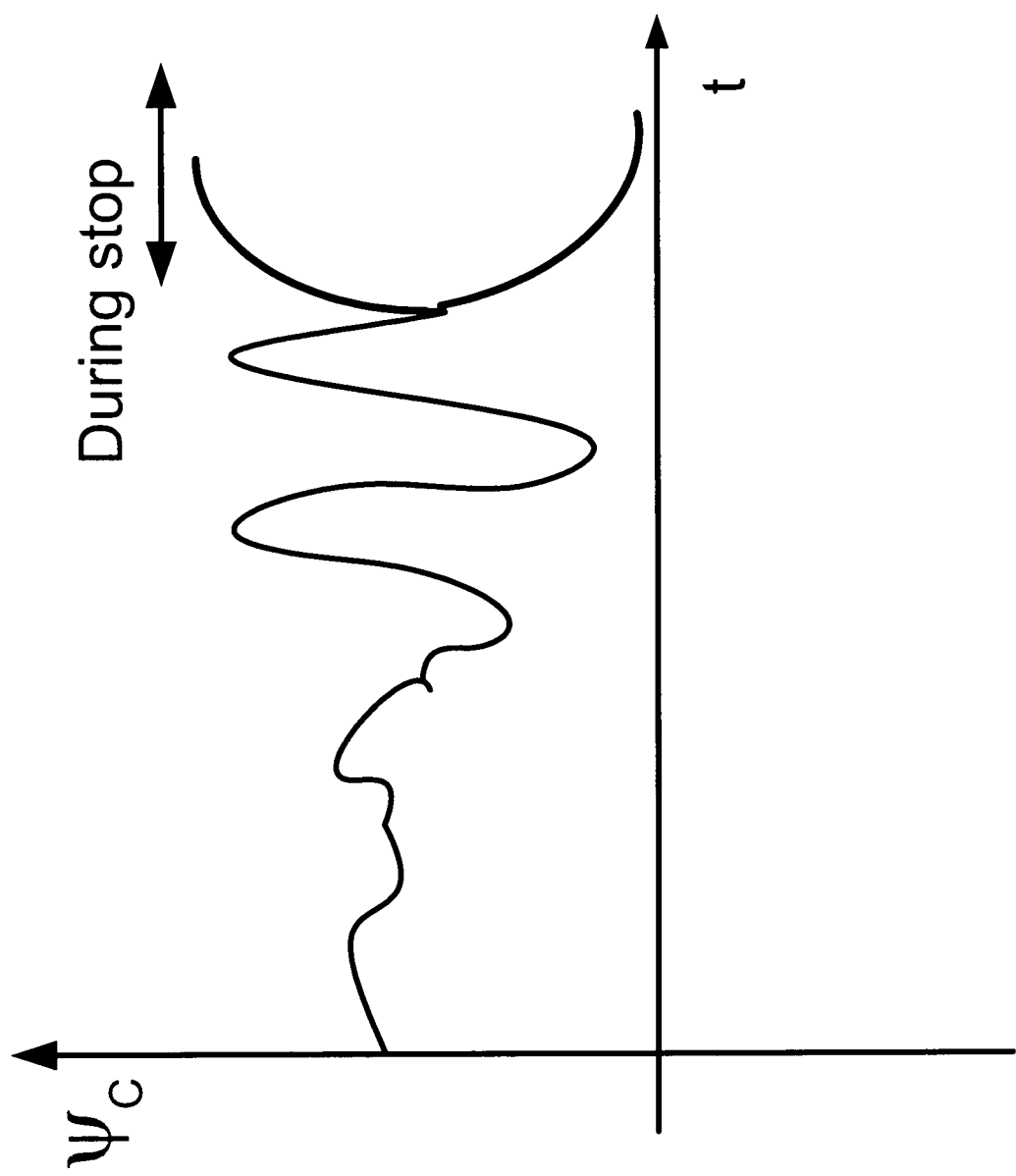
FIG. 48 is for one embodiment of the invention, for a system, for angle, during the stop.
Figure 49:
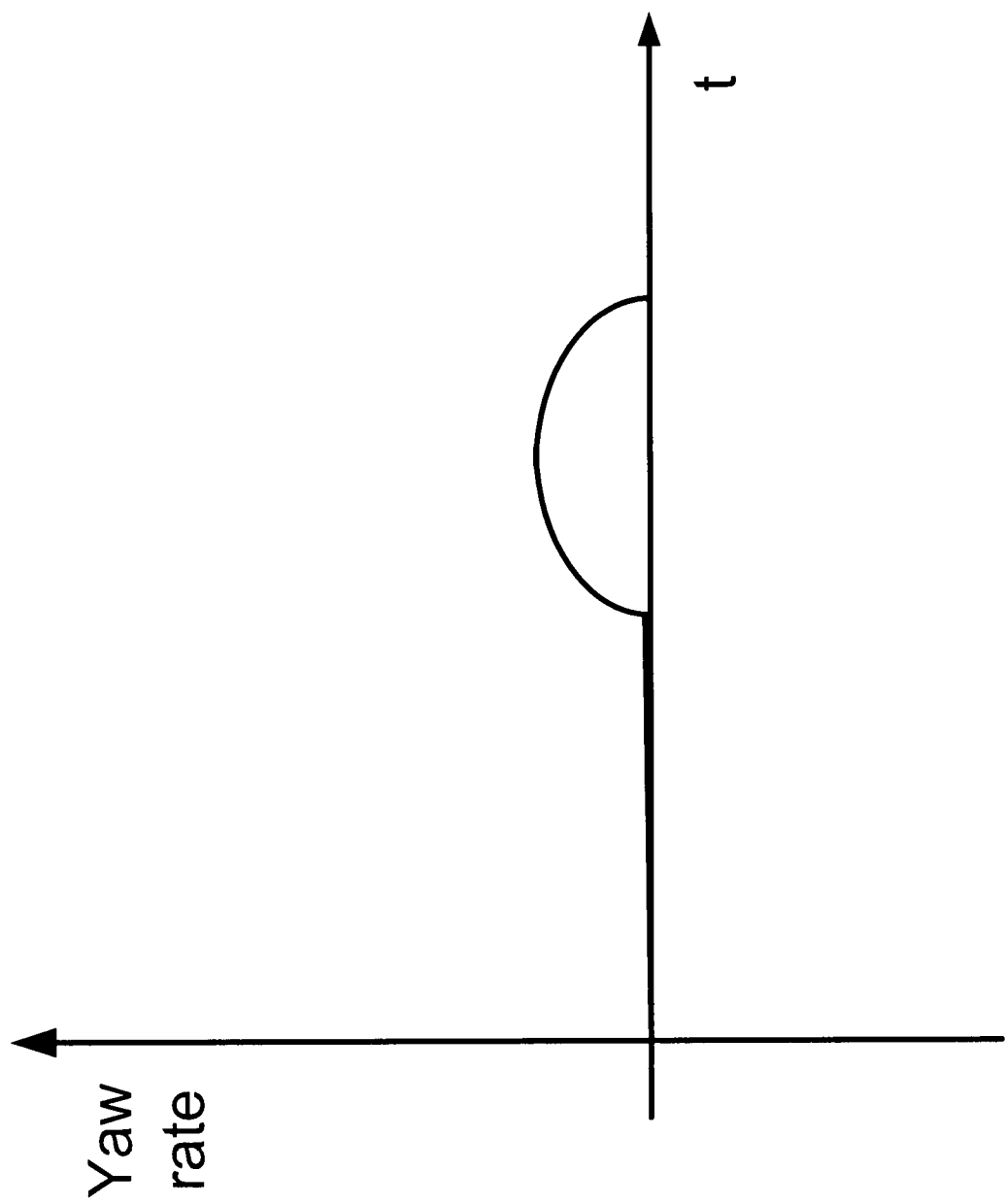
FIG. 49 is for one embodiment of the invention, for a system, for yaw rate.
Figure 50:
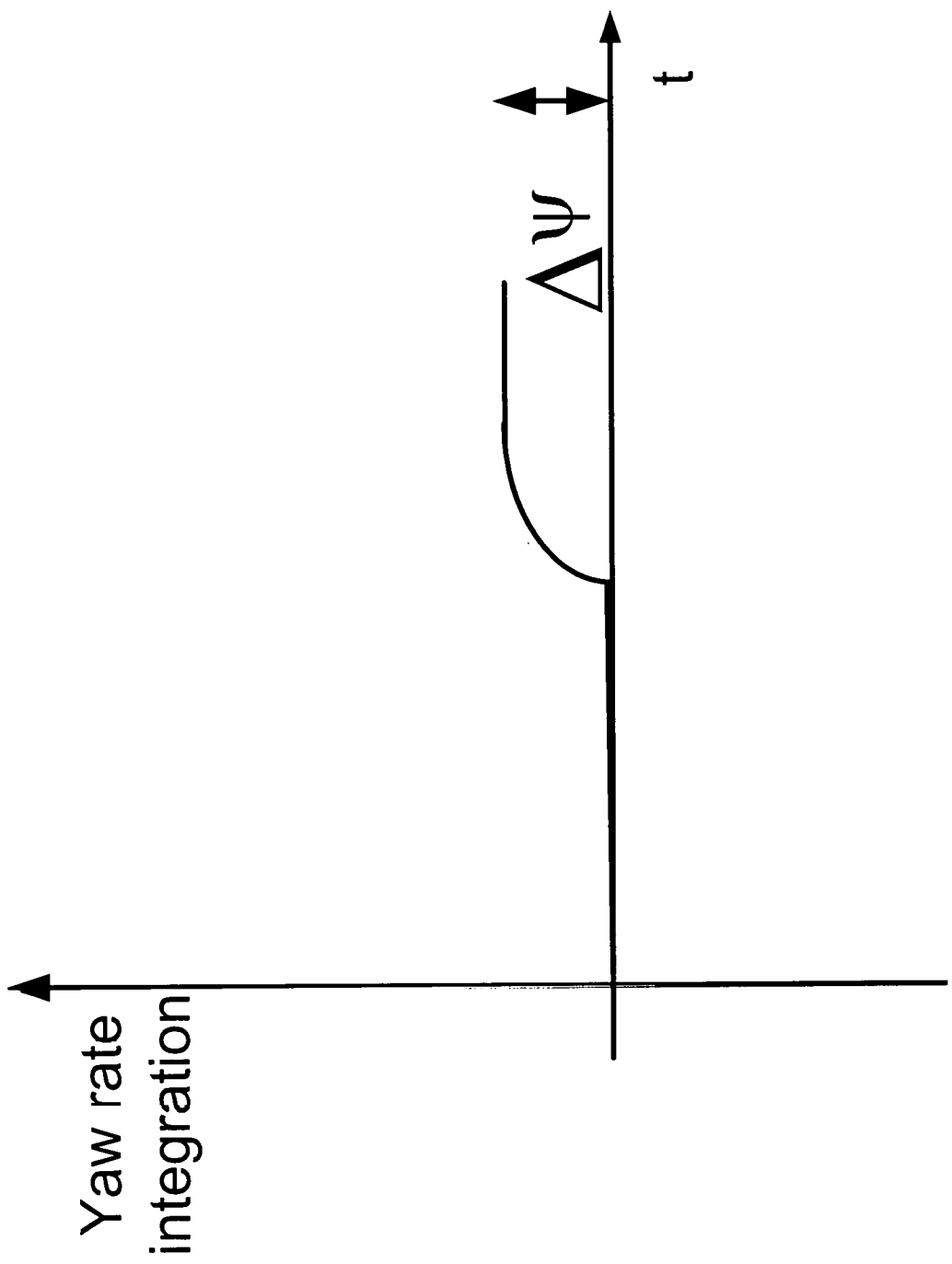
FIG. 50 is for one embodiment of the invention, for a system, for yaw rate integration.
Figure 51:
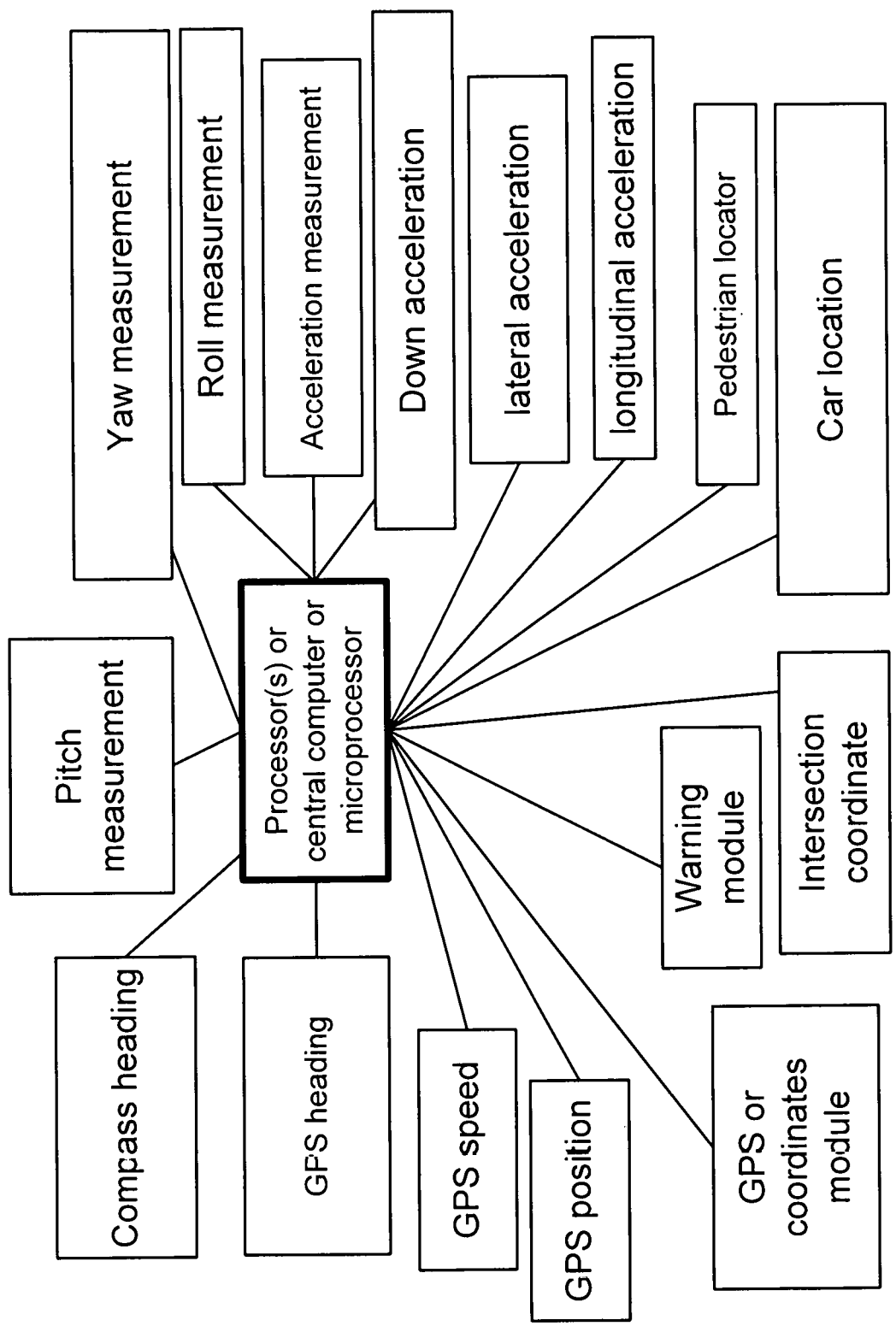
FIG. 51 is for one embodiment of the invention, for a system, for acceleration measurements.

FIG. 48 is for one embodiment of the invention, for a system, for angle, during the stop. FIG. 49 is for one embodiment of the invention, for a system, for yaw rate. FIG. 50 is for one embodiment of the invention, for a system, for yaw rate integration. FIG. 51 is for one embodiment of the invention, for a system, for acceleration measurements.

Figure 52:
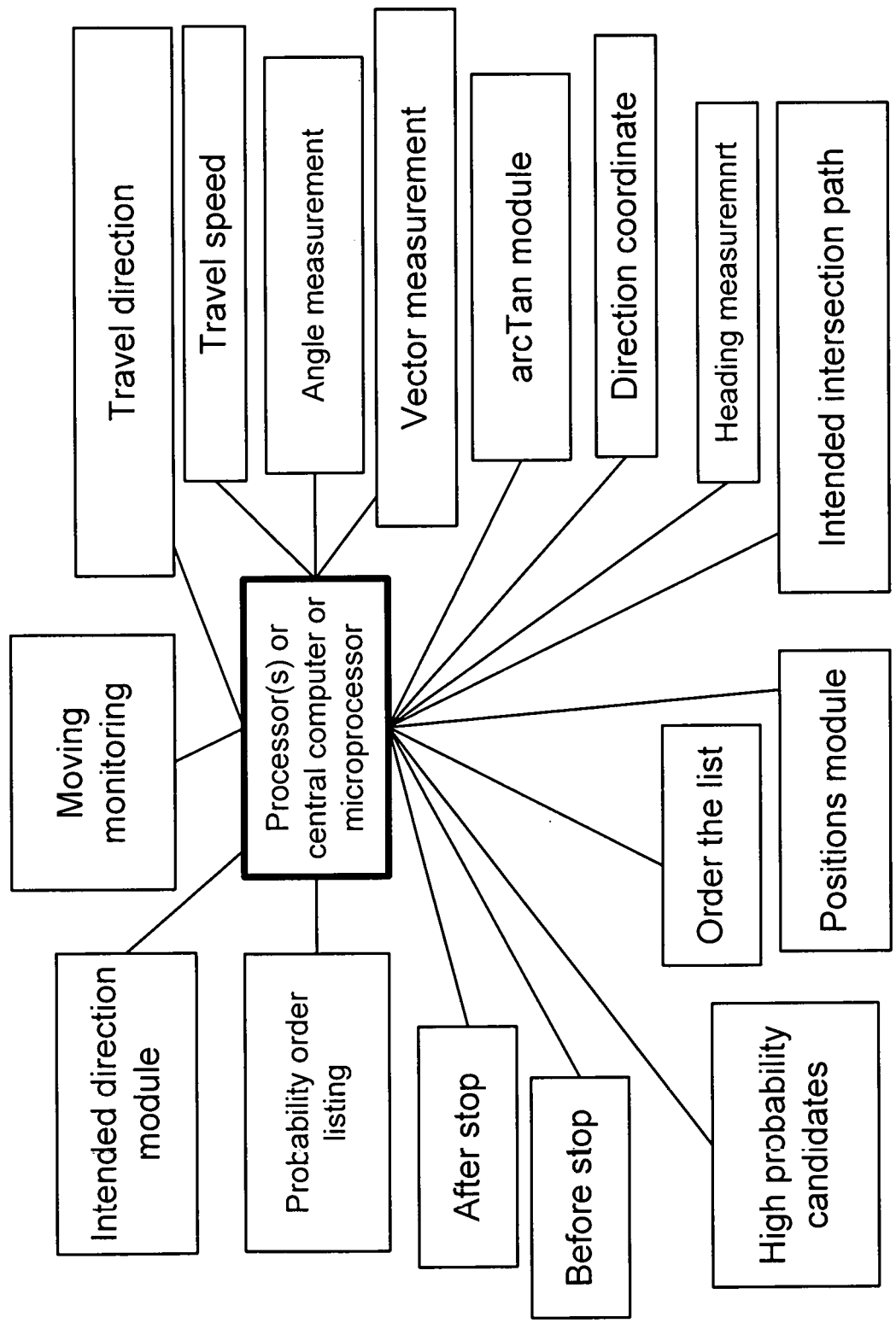
FIG. 52 is for one embodiment of the invention, for a system, for intended intersection paths.
Figure 53:
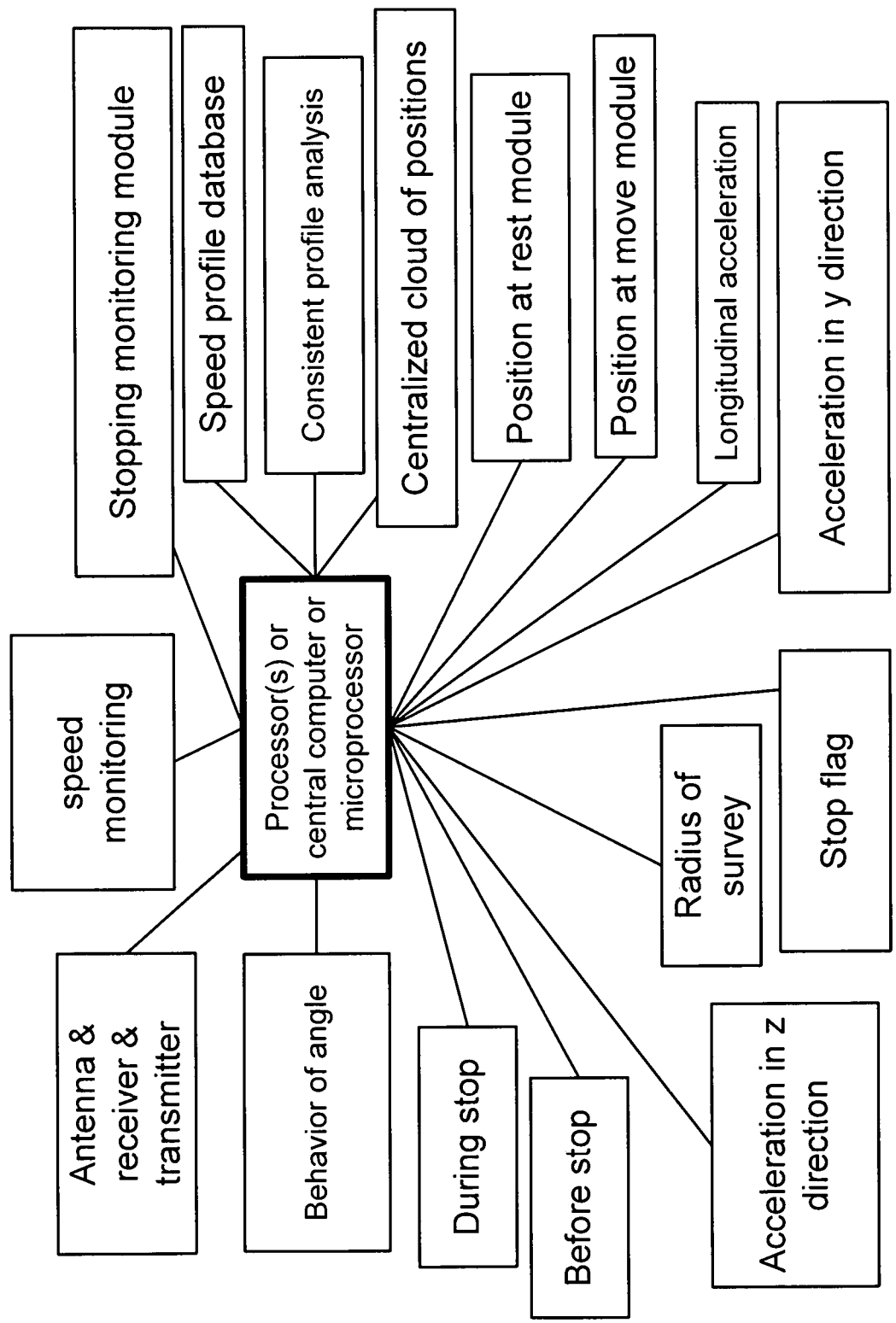
FIG. 53 is for one embodiment of the invention, for a system, for position at move and position at rest.
Figure 54:
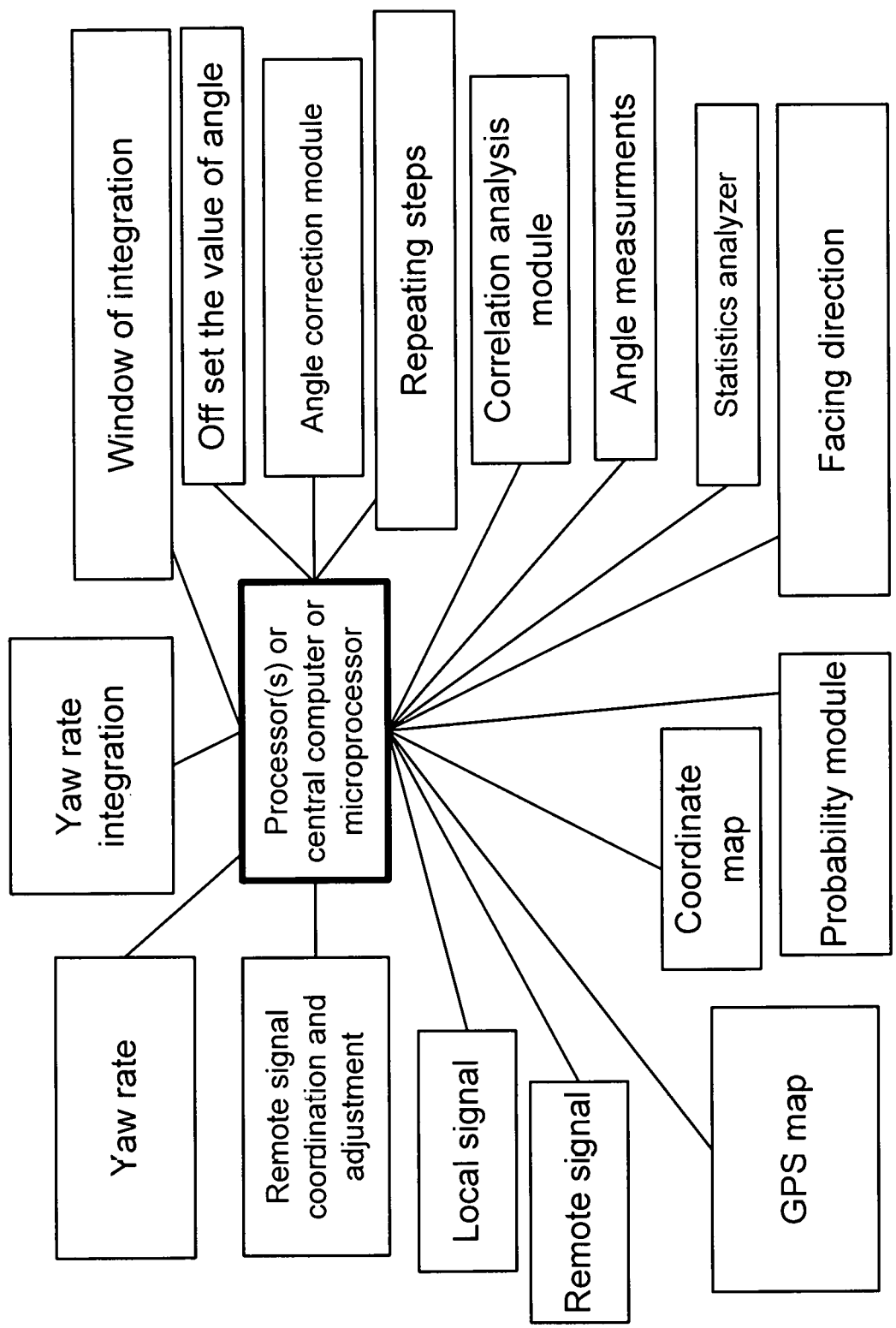
FIG. 54 is for one embodiment of the invention, for a system, for yaw rate and yaw rate integration.

FIG. 52 is for one embodiment of the invention, for a system, for intended intersection paths. FIG. 53 is for one embodiment of the invention, for a system, for position at move and position at rest. FIG. 54 is for one embodiment of the invention, for a system, for yaw rate and yaw rate integration.

Figure 55:
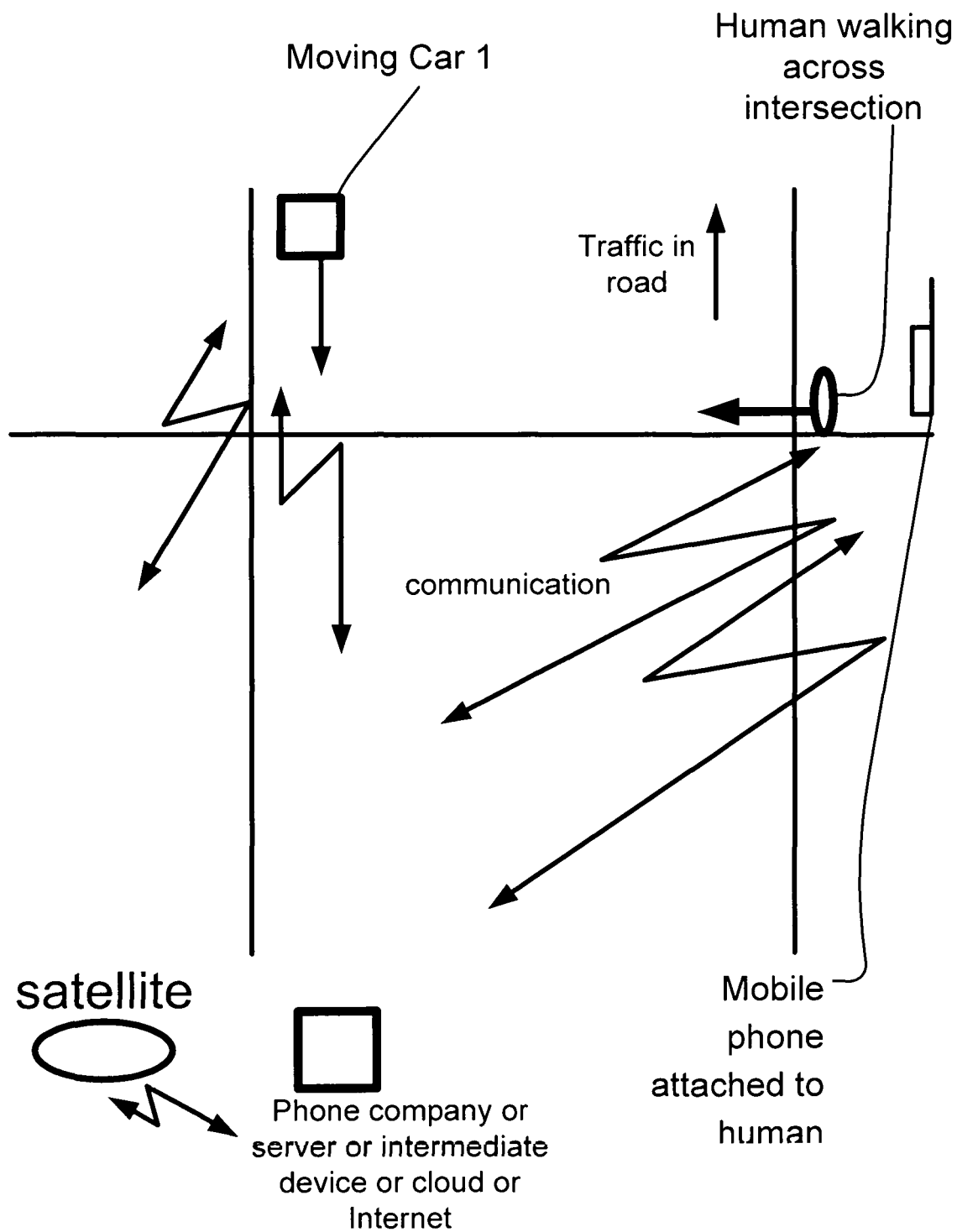
FIG. 55 is for one embodiment of the invention, for a system, for communications between and from telephone company and satellite, to/from person's mobile phone or device, as well as the moving car, to connect the car with the mobile device/phone/smart phone, for understanding the position(s) of the pedestrian(s) at the intersections for the roads, by the moving car, nearby.
Figure 56:
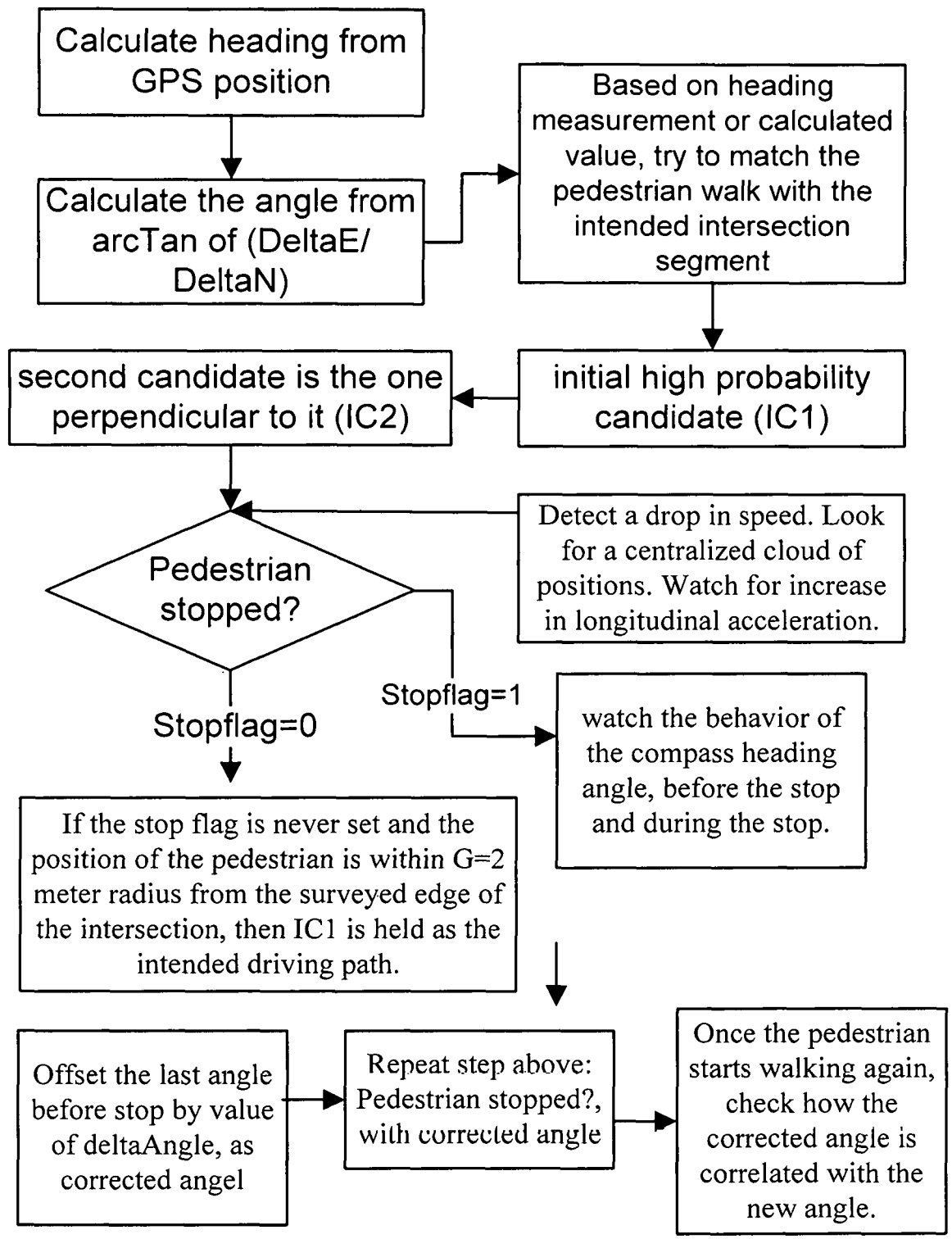
FIG. 56 is for one embodiment of the invention, for a method of implementation of tracking pedestrian heading angle using smart phones data for pedestrian safety applications.

FIG. 55 is for one embodiment of the invention, for a system, for communications between and from telephone company and satellite, to/from person's mobile phone or device, as well as the moving car, to connect the car with the mobile device/phone/smart phone, for understanding the position(s) of the pedestrian(s) at the intersections for the roads, by the moving car, nearby. FIG. 56 is for one embodiment of the invention, for a method of implementation of tracking pedestrian heading angle using smart phones data for pedestrian safety applications.

In this disclosure, any computing device, such as processor, microprocessor(s), computer, PC, pad, laptop, server, server farm, multi-cores, telephone, mobile device, smart glass, smart phone, computing system, tablet, or PDA can be used. The communication can be done by or using sound, laser, optical, magnetic, electromagnetic, wireless, wired, antenna, pulsed, encrypted, encoded, or combination of the above. The vehicles can be car, sedan, truck, bus, pickup truck, SUV, tractor, agricultural machinery, entertainment vehicles, motorcycle, bike, bicycle, hybrid, or the like. The roads can be one-lane county road, divided highway, boulevard, multi-lane road, one-way road, two-way road, or city street. Any variations of the above teachings are also intended to be covered by this patent application.

The invention claimed is:

1. A method for positioning based on geofencing framework for a road vehicle navigation system for a vehicle, said method implemented by one or more processors, said method comprising:

receiving vehicle states for said vehicle, said vehicle states including at least data of a position, a speed, a heading angle and a yaw rate of said vehicle, said yaw rate having a yaw rate bias;

removing said yaw rate bias of said yaw rate;

responsive to removing said yaw rate bias of said yaw rate, determining whether a reference road exists, said reference road providing data of at least a road heading angle and a road curvature;

in case said reference road exists, determining whether said existing reference road is valid;

in case said reference road does not exist or said existing reference road is invalid, searching for said reference road;

in case said reference road is found based on said search or said existing reference road is valid, determining whether a lane change is detected for said vehicle;

in case said lane change is detected for said vehicle, performing retrospective integrations of said speed and yaw rate for said vehicle;

determining a reference yaw rate based on said road curvature and said speed of said vehicle;

determining whether a yaw rate error between said yaw rate and said reference yaw rate is less than a yaw rate threshold;

in case said yaw rate error is less than said yaw rate threshold, forcing said heading angle of said vehicle to said road heading angle;

updating said vehicle states;

determining geofencing conditions of said position, speed, heading angle and yaw rate of said vehicle;

determining whether said geofencing conditions are met;

in case said geofencing conditions are met, applying geofencing to limit said position of said vehicle between road boundaries of said reference road;

updating said data of said vehicle's position; and outputting said data of said vehicle's position to an upper layer of said road vehicle navigation system for said vehicle.

2. The method for positioning based on geofencing framework for a road vehicle navigation system for a vehicle as recited in claim 1, wherein said road vehicle navigation system works with or communicates with a global navigation satellite system.

3. The method for positioning based on geofencing framework for a road vehicle navigation system for a vehicle as recited in claim 1, wherein said vehicle is interior to said reference road.

4. The method for positioning based on geofencing framework for a road vehicle navigation system for a vehicle as recited in claim 1, wherein a distance from said vehicle to a next intersection is greater than a first threshold.

5. The method for positioning based on geofencing framework for a road vehicle navigation system for a vehicle as recited in claim 1, wherein said vehicle's speed is greater than a second threshold.

6. The method for positioning based on geofencing framework for a road vehicle navigation system for a vehicle as recited in claim 1, wherein applying geofencing comprises: timely geofencing.

7. The method for positioning based on geofencing framework for a road vehicle navigation system for a vehicle as recited in claim 1, wherein applying geofencing comprises: predicted geofencing.

8. The method for positioning based on geofencing framework for a road vehicle navigation system for a vehicle as recited in claim 1, wherein said method comprises: determining an incorrect position of said vehicle and correcting the determined position for said vehicle based on reducing a lateral error.

9. The method for positioning based on geofencing framework for a road vehicle navigation system for a vehicle as recited in claim 1, wherein in case said reference road does not exist or said existing reference road is invalid, said search for said reference road comprises:

determining candidate reference roads where said vehicle's position is interior to end points of said candidate reference roads;

determining, from said candidate reference roads, a candidate reference road satisfying a heading error below a threshold; and adjusting an order of said end points to be consistent with a travel direction of said vehicle.

10. The method for positioning based on geofencing framework for a road vehicle navigation system for a vehicle as recited in claim 1, wherein said method comprises: determining a lateral error for said vehicle.

11. The method for positioning based on geofencing framework for a road vehicle navigation system for a vehicle as recited in claim 1, wherein said method comprises: in case said reference road is not found based on said search, outputting said data of said vehicle's position to said upper layer of said road vehicle navigation system for said vehicle.

12. The method for positioning based on geofencing framework for a road vehicle navigation system for a vehicle as recited in claim 1, wherein said method comprises: determining a longitudinal error for said vehicle.

13. The method for positioning based on geofencing framework for a road vehicle navigation system for a vehicle as recited in claim 1, wherein said method comprises: determining a predicted position for said vehicle based on at least one of lateral correction and longitudinal correction.

14. The method for positioning based on geofencing framework for a road vehicle navigation system for a vehicle as recited in claim 1, wherein said method comprises: determining an average value of said yaw rate bias within a moving time window, and correcting said yaw rate bias based on said determined average value.

15. The method for positioning based on geofencing framework for a road vehicle navigation system for a vehicle as recited in claim 1, wherein said method comprises: determining a sensor temperature, and determining said yaw rate bias that varies with said sensor temperature.

16. The method for positioning based on geofencing framework for a road vehicle navigation system for a vehicle as recited in claim 1, wherein said method comprises: determining vibration or noise for removing said yaw rate bias.

17. The method for positioning based on geofencing framework for a road vehicle navigation system for a vehicle as recited in claim 1, wherein said method comprises: applying a security layer for said road vehicle navigation system for said vehicle.

18. The method for positioning based on geofencing framework for a road vehicle navigation system for a vehicle as recited in claim 1, wherein said method comprises: applying an application layer for said road vehicle navigation system for said vehicle.

19. The method for positioning based on geofencing framework for a road vehicle navigation system for a vehicle as recited in claim 1, wherein said method comprises: applying a network layer for said road vehicle navigation system for said vehicle.

20. The method for positioning based on geofencing framework for a road vehicle navigation system for a vehicle as recited in claim 1, wherein said method comprises: applying a physical layer for said road vehicle navigation system for said vehicle.

\* \* \* \* \*